(12) United States Patent
Kimura et al.

(10) Patent No.: US 7,021,540 B2
(45) Date of Patent: Apr. 4, 2006

(54) STORAGE MEDIUM MOUNTING/DISMOUNTING MECHANISM AND INFORMATION PROCESSING APPARATUS

(75) Inventors: Koji Kimura, Tokyo (JP); Hideaki Kajihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 10/618,598

(22) Filed: Jul. 15, 2003

(65) Prior Publication Data
US 2004/0022023 A1 Feb. 5, 2004

(30) Foreign Application Priority Data

Jul. 30, 2002 (JP) .............................. 2002-220948
Mar. 13, 2003 (JP) .............................. 2003-068210

(51) Int. Cl.
*G06K 7/06* (2006.01)

(52) U.S. Cl. ....................... 235/441; 235/492; 235/486
(58) Field of Classification Search ................ 235/441, 235/475, 479, 486, 492; 439/928.1, 945; 206/706, 710
See application file for complete search history.

(56) References Cited

U.S. PATENT DOCUMENTS

| | | | | |
|---|---|---|---|---|
| 3,638,233 A | * | 1/1972 | Futter ........................... 346/82 |
| 4,539,670 A | * | 9/1985 | Inaba et al. ................... 369/194 |
| 5,578,811 A | * | 11/1996 | Suzuki ........................ 235/479 |
| 5,660,568 A | * | 8/1997 | Moshayedi ............... 439/938.1 |
| 5,679,945 A | * | 10/1997 | Renner et al. ............... 235/492 |
| 5,721,717 A | * | 2/1998 | Obata et al. ............. 369/44.27 |
| 5,889,649 A | * | 3/1999 | Nabetani et al. ......... 439/928.1 |
| 5,986,891 A | * | 11/1999 | Sugimoto .................... 361/737 |
| 6,219,256 B1 | * | 4/2001 | Wu ............................. 439/945 |
| 6,272,091 B1 | * | 8/2001 | Ikari et al. ................... 720/720 |
| 6,332,578 B1 | * | 12/2001 | Niwata et al. ............... 235/486 |
| 6,374,315 B1 | * | 4/2002 | Okada et al. ................. 710/62 |
| 6,457,647 B1 | * | 10/2002 | Kurihashi et al. .......... 235/486 |
| 6,510,026 B1 | * | 1/2003 | Hashimoto et al. ......... 360/133 |
| 6,570,767 B1 | * | 5/2003 | Vapaakoski et al. ........ 361/737 |
| 6,634,562 B1 | * | 10/2003 | Noro et al. .................. 235/492 |
| 6,643,125 B1 | * | 11/2003 | Nabetani et al. ............ 439/159 |
| 6,663,398 B1 | * | 12/2003 | Shimada et al. .............. 439/64 |

FOREIGN PATENT DOCUMENTS

JP 7-239923 9/1995

* cited by examiner

*Primary Examiner*—Uyen-Chau N. Le
(74) *Attorney, Agent, or Firm*—Fitzpatrick, Cella, Harper & Scinto

(57) ABSTRACT

A storage medium can be mounted at and dismounted from an information processing apparatus without having to dismount a storage medium adapter from the information processing apparatus, and one of the storage medium and the storage medium adapter can be selectively ejected, while providing an improvement of operating performance and the like. When the storage medium is ejected from the storage medium adapter, a first conveying roller rotates 90° counterclockwise by the forward rotation of a driving motor, and due to an arc portion contacting the storage medium, the storage medium is ejected by the first conveying roller and a first driven roller. When the storage medium adapter is ejected from a socket, a second conveying roller rotates 180° counterclockwise by the backward rotation of the driving motor, and due to an arc portion contacting the storage medium, the storage medium adapter is ejected by the second conveying roller and a second driven roller.

20 Claims, 40 Drawing Sheets

STORAGE MEDIUM MOUNTING/DISMOUNTING MECHANISM AND INFORMATION PROCESSING APPARATUS

BACKGROUND OF THE INVENTION

1. Field of the Invention

The present invention relates to a storage medium mounting/dismounting mechanism and an information processing apparatus suitable for a storage medium which is mountable at and dismountable from a storage medium adapter and which stored electronic data in the interior thereof is made to be automatically mountable at and dismountable from an information processing apparatus via a storage medium adapter.

2. Description of Related Arts

In recent years, a movement of unification of interfaces for various storage medium has been active. In accordance with the movement of unifying the interfaces, the standard of the PCMCIA (Personal Computer Memory Card International Association) generalized among the interfaces had been announced. In accordance therewith, various information processing apparatuses (for example, computers and the like) corresponding to the PCMCIA standard have been on the market. On the other hand, as electronics at which a dedicated and small storage medium is provided, for example, there are an electronic note, an electronic camera, and the like. As a mechanism accommodating a storage medium of electronics of this kind, a storage medium adapter which is based upon the above-described standard and which can access to a computer in accordance with the specification of the PCMCIA card exists.

A conventional art is structured such that a storage medium is attached to a storage medium adapter, and the storage medium adapter is inserted in an information processing apparatus, and when the storage medium is exchanged, after the storage medium adapter together with the storage medium is ejected from the information processing apparatus, the storage medium is dismounted from the storage medium adapter. That is, when another storage medium is attempted to use after the information processing apparatus has read electronic data stored in the storage medium, or conversely, after the electronic data has been written from the information processing apparatus to the storage medium, there is troublesome that after the storage medium adapter is dismounted from the information processing apparatus and the storage medium is exchanged, and a storage medium is mounted at the storage medium adapter again, the storage medium adapter must be inserted into the information processing apparatus.

In order to improve the operating performance in mounting/dismounting of a storage medium adapter with respect to an information processing apparatus and mounting/dismounting of a storage medium with respect to the storage medium adapter as described above, for example, as shown in Japanese Patent Application Laid-Open (JP-A) No. 7-239923, a method is proposed in which the only storage medium can be manually ejected in a state in which the storage medium is mounted at the information processing apparatus via the storage medium adapter.

However, in the above-described conventional art, there have been problems as follows. When the storage medium adapter is inserted into the information processing apparatus, the manipulator carries out the inserting operation directly by hands. Thus, there has been the concern that contact failure of an electric connection between a connector unit of a storage medium and a connector unit of a storage medium adapter arises, or there has been the concern that unprepared load is applied to the connector units, and the connector units are broken. Therefore, there has been the problem that not only the reliability of the connectors is lost, but also the reliability of the connectors even between the connector unit of the storage medium adapter and the connector unit of the information processing apparatus is lost.

Further, in a case of the proposal in the above-described JP-A No. 7-239923 (corresponding U.S. Pat. No. 5,889, 649), a dedicated storage medium adapter which is special to some extent is required.

Further, there has been concern that the storage medium is dismounted from the information processing apparatus by a careless operation while the information processing apparatus is reading the electronic data stored in the storage medium, or conversely, while the electronic data is written from the information processing apparatus to the storage medium.

Further, there is a device in which a compact type dedicated socket is equipped with an information processing apparatus only for the small storage medium as described above, and a storage medium can be inserted/pulled via the dedicated socket. However, in this case, a general-purposed storage medium based upon the PCMCIA standard which can be generally used for the same socket cannot be used, there is no extendable performance in using the information processing apparatus, the performance of facility deteriorates.

SUMMARY OF THE INVENTION

The present invention has been invented in consideration of the above-described points, and an object of the present invention is to provide a storage medium mounting/dismounting mechanism and an information processing apparatus which can realize that contact failure of an electric connection between a connector unit of the storage medium and a connector unit of the storage medium adapter does not arise, and the reliability of the connectors is not lost, or the like, in a structure in which a storage medium is mounted/dismounted with respect to the information processing apparatus via a storage medium adapter.

Moreover, the present invention has been invented in consideration of the above-described problems, and an object of the present invention is to provide a storage medium mounting/dismounting mechanism and an information processing apparatus which can carry out mounting/dismounting of the storage medium with respect to the information processing apparatus without the storage medium adapter being dismounted from the information processing apparatus, and which can selectively eject one of the storage medium and the storage medium adapter, and which can realize the improvement of the operating performance or the like.

In order to achieve the above-described objects, the present invention provides a storage medium mounting/dismounting mechanism for mounting a removable storage medium adapter in which a storage medium is mounted, the storage medium mounting/dismounting mechanism comprising: automatic mounting/dismounting means for automatically ejecting selectively the storage medium from the storage medium adapter, and for automatically mounting the storage medium at the storage medium adapter, in a state in which the storage medium adapter is mounted.

Further, the present invention provides a storage medium mounting/dismounting mechanism for mounting a removable storage medium adapter in which a storage medium is mounted, the storage medium mounting/dismounting mechanism comprising: automatic mounting/dismounting means for automatically ejecting selectively the storage medium from the storage medium adapter, and for automatically mounting the storage medium at the storage medium adapter, in a state of the storage medium adapter being mounted, and for locking the storage medium adapter at the time of the automatic ejection or at the time of the automatic mounting.

Further, the present invention provides a storage medium mounting/dismounting mechanism for mounting a removable storage medium adapter in which a storage medium is mounted, the storage medium mounting/dismounting mechanism comprising: adapter sensing means for sensing the presence/absence of mounting of the storage medium adapter; and automatic mounting/dismounting means for automatically ejecting selectively the storage medium from the storage medium adapter, and for automatically mounting the storage medium at the storage medium adapter after the mounting of the storage medium adapter is sensed by the adapter sensing means.

Further, the present invention provides an information processing apparatus which comprises the storage medium mounting/dismounting mechanism, the information processing apparatus comprising: control means for carrying out an electric power supply for a storage medium mounted at the storage medium adapter which is mounted at the storage medium mounting/dismounting mechanism or the card type storage medium mounted at the storage medium mounting/dismounting mechanism, and for carrying out writing and reading of data on and from the storage medium or the card type storage medium.

Further, the present invention provides a storage medium mounting/dismounting mechanism comprising: mounting means in which a storage medium adapter in which a storage medium is accommodated so as to be mountable/dismountable is accommodated so as to be mountable/dismountable; and ejecting means for selectively ejecting one or both of the storage medium and the storage medium adapter in a state in which the storage medium adapter is mounted at the mounting means.

BRIEF DESCRIPTION OF THE DRAWINGS

FIG. 15A shows a PCMCIA card, and FIG. 15B shows a state in which the storage medium has been mounted at the storage medium adapter, and FIG. 15C shows a state in which the storage medium has been dismounted from the storage medium adapter.

DESCRIPTION OF THE PREFERRED EMBODIMENTS

Hereinafter, an embodiment of the present invention will be described with reference to the drawings.

In the embodiment of the present invention, an information processing apparatus and an auto loading mechanism will be described with reference to FIG. 1 to FIG. 16. First, broad structures of an information processing apparatus which accommodates a storage medium adapter so as to be mountable and dismountable and which carries out reading and writing of electronic data with respect to a storage medium, the storage medium storing the electronic data, and the storage medium adapter accommodating the storage medium as to be attachable and detachable will be described with reference to FIG. 13 to FIG. 15.

<Structure of Information Processing Apparatus>

Figure 13:
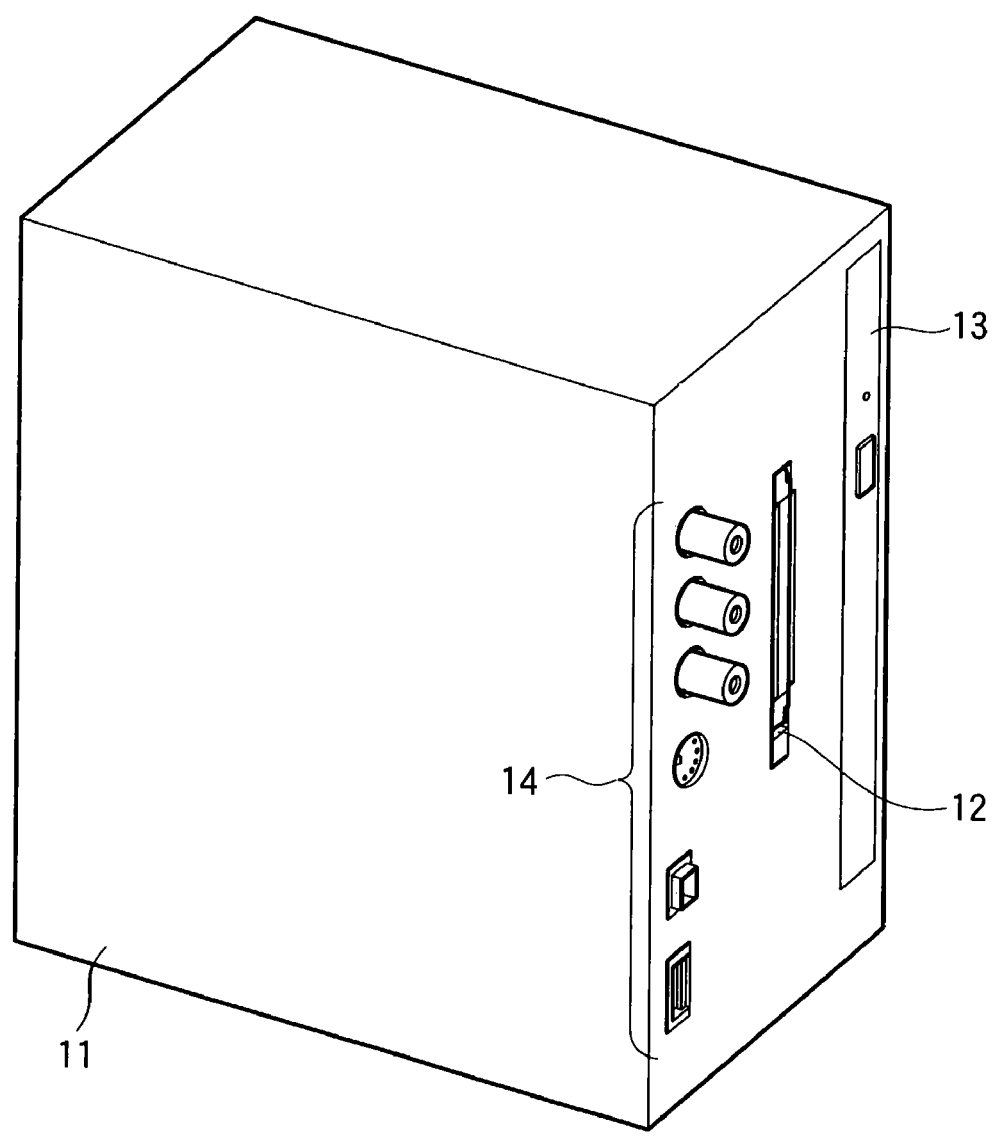
FIG. 13 is a perspective view showing the information processing apparatus.

FIG. 13 is a perspective view showing the exterior view of the information processing apparatus. Reference numeral 11 in the drawing is a computer apparatus or an electronic data base apparatus which is the information processing apparatus, and the information processing apparatus has a storage medium maintaining portion in order for a storage medium based upon the PCMCIA standard to be able to be inserted into and pulled out of an opening portion 12. Moreover, the information processing apparatus 11 has an another storage medium maintaining portion 13 maintaining an another type of storage medium (a compact disc or the like), and a various connectors jack portion 14 for sending electronic data to other equipment and receiving electronic data from the other equipment.

Figure 14:
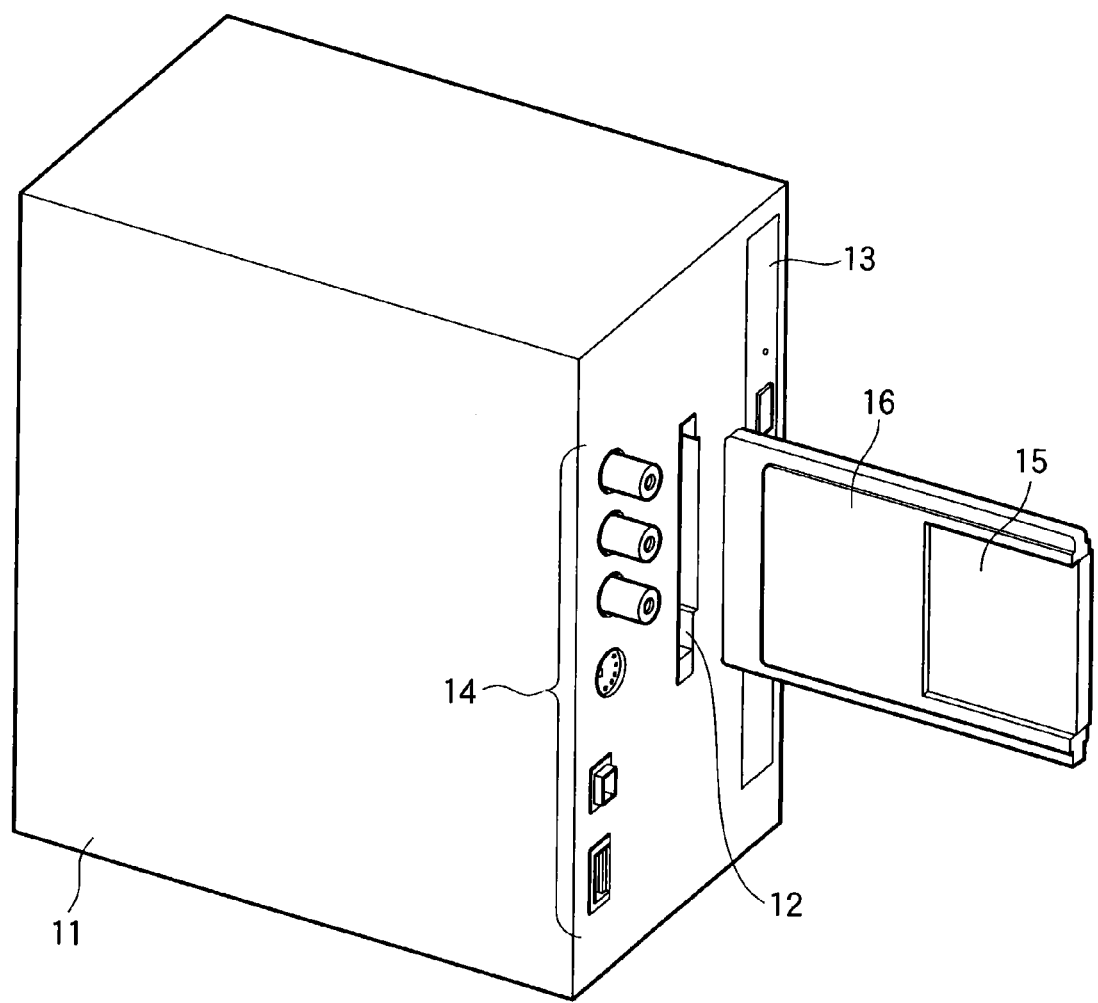
FIG. 14 is a perspective view showing the information processing apparatus and the storage medium.

FIG. 14 is a perspective view showing the exterior view of the information processing apparatus and the storage medium. Reference numeral 15 in the drawing shows the storage medium in which the electronic data stored by various types of electronics such as an electronic notebook, an electronic camera, or the like are made to be processed or stored. Reference numeral 16 shows a storage medium adapter which makes the storage medium 15 be able to be inserted into and pulled out of a computer apparatus or an electronic data base apparatus which is the information processing apparatus. 11, and which converts the storage medium 15 into being based upon the PCMCIA standard. In this FIG. 14, a state is shown in which the storage medium 15 in a state of being mounted at and accommodated in the storage medium adapter 16 is pulled out of the opening portion 12 of the information processing apparatus 11. Note that the storage medium 15 and the storage medium adapter 16 respectively have connector units (unillustrated) for electrically connecting to the both.

Figure 16:
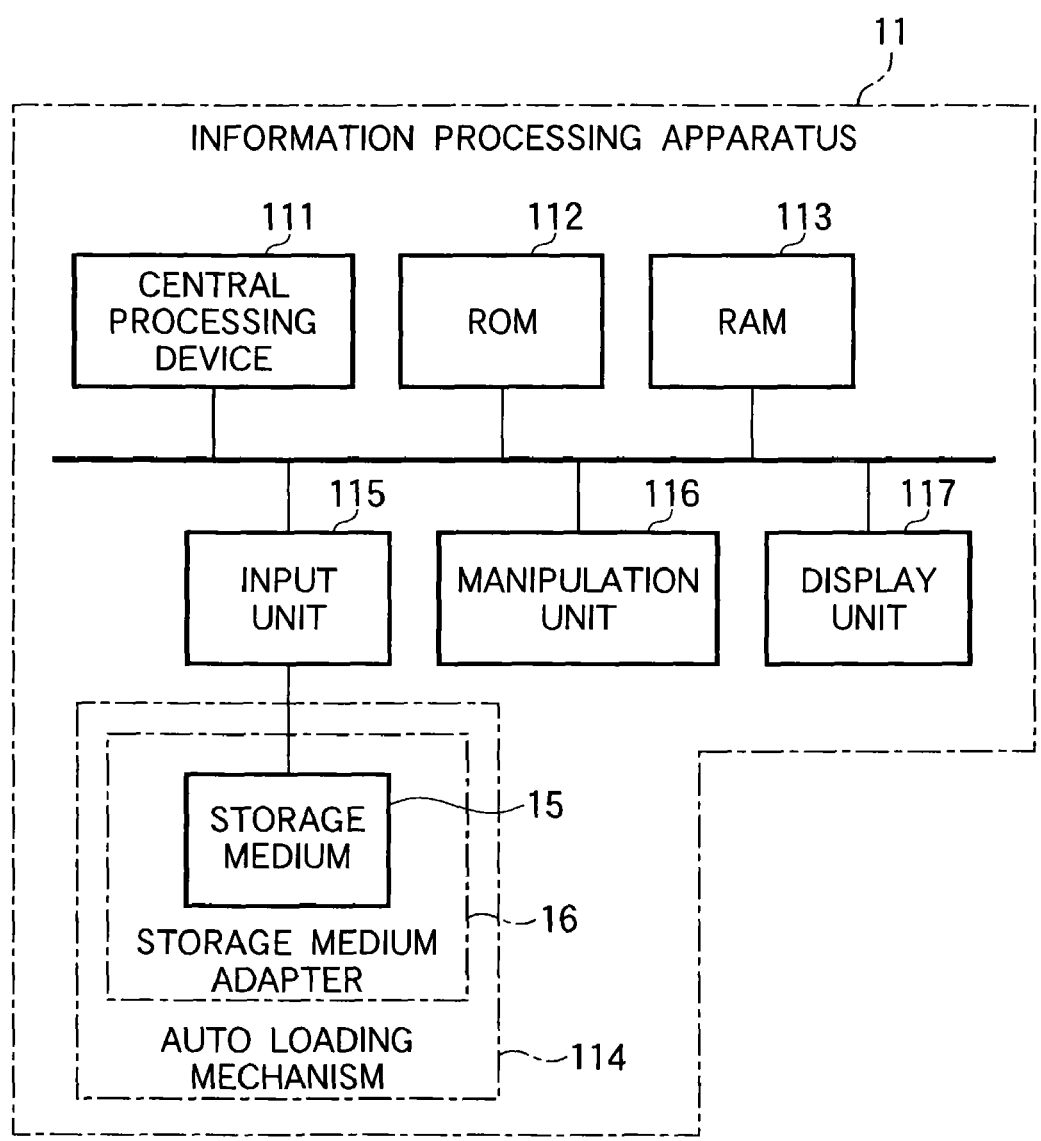
FIG. 16 is a schematic block diagram showing an electric structure of the information processing apparatus.

FIG. 16 is a schematic block diagram showing an electrical (electric?) structure of the information processing apparatus 11. The information processing apparatus 11 has a central processing device 111 managing control of the respective portions of the information processing apparatus, a ROM 112 accommodating programs which the central processing device 111 executes and fixed data, a RAM 113 used as a work area and a temporary storage region of the central processing device 111, an auto loading mechanism 114 in which the storage medium adapter 16 (or a PCMCIA card) is accommodated so as to be freely mounted and dismounted, an input/output unit 115 carrying out supplying of electric power and the input/output of data with respect to the storage medium 15 (or the PCMCIA card) via an electric substrate of the auto loading mechanism 114, an manipulation unit 116 such as a keyboard, a pointing device, or the like, and a display unit 117 such as a display or the like.

The storage medium adapter 16 (or the PCMCIA card) is accommodated in the auto loading mechanism 114 of the information processing apparatus 11 so as to be freely mounted and dismounted. The central processing device 111 of the information processing apparatus 11 controls operations of the auto loading mechanism 114, and carries out supplying of electric power and electrical control with respect to the storage medium 15 (or the PCMCIA card), and writing onto and reading from the storage medium 15 (or the PCMCIA card).

It is possible to instruct an automatic ejecting operation of the storage medium 15 from the storage medium adapter 16 mounted at a socket of the auto loading mechanism 114 (or an automatic ejecting operation of the PCMCIA card from the socket) from the manipulation unit 116 (a keyboard or a pointing device). That is, in the present embodiment, usually, there is no need for a manipulator to operate an eject lever equipped with the auto loading mechanism and which will be described later.

The central processing device 111 carries out the automatic ejecting operation by using the auto loading mechanism 114 based on the aforementioned instruction serving as an external input from the manipulation unit 116. Further, when an insertion of the storage medium 15 into the storage medium adapter 16 mounted at the socket of the auto loading mechanism by the manipulator (or an insertion of the PCMCIA card into the socket by the manipulator) is sensed by a first micro switch which will be described later, the central processing device 111 carries out the automatic mounting operation by the auto loading mechanism 114.

<Structures of Storage Medium and Storage Medium Adapter>

Figure 15A:
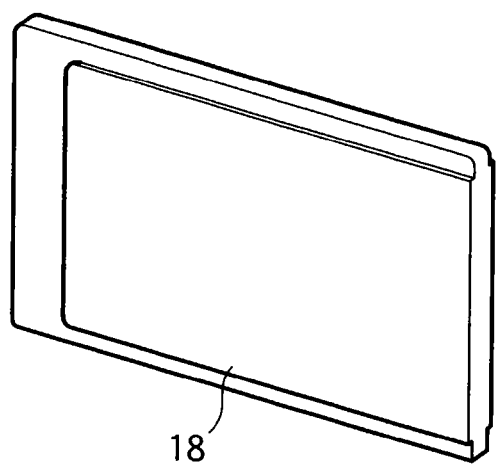
FIGS. 15A, 15B, and 15C are perspective views showing the storage medium and the storage medium adapter.
Figure 15B:
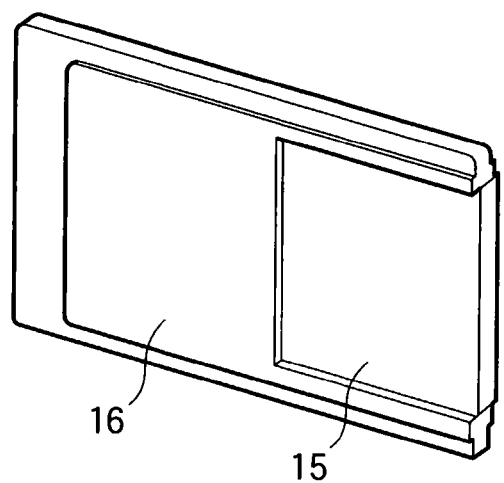
Figure 15C:
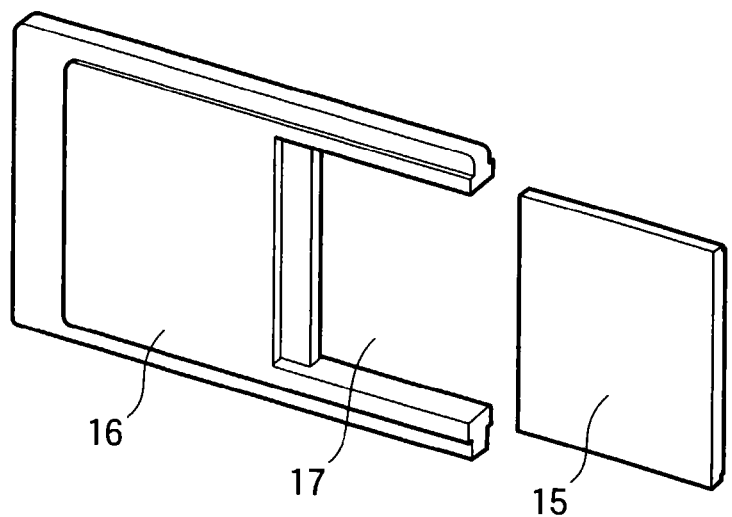

FIG. 15 are perspective views showing the exterior views of the storage medium and the storage medium adapter. Reference numeral 18 in the drawing is the PCMCIA card based upon the PCMCIA standard (FIG. 15A). The storage medium adapter 16 has an opening accommodating portion 17 accommodating the storage medium 15 so as to be mountable and dismountable (FIG. 15C), and the specification dimension of the storage medium adapter 16 is the same specification dimension as that of the PCMCIA card (for example, a short side is 54.0 mm and a long side is 85.6 mm). In the present embodiment, any of the storage medium adapter 16 accommodating the storage medium 15 and the PCMCIA card can be used as an external storage medium of the information processing apparatus 11, and any of the storage medium adapter 16 and the PCMCIA card can be mounted at a socket 41 (refer to FIG. 5) of the auto loading mechanism which will be described later.

Here, there are various types as a storage medium. However, an example of the relationship of a Compact Flash (registered trademark) Card (hereinafter, a CF card) and a Compact Flash (registered trademark) Card Adapter (hereinafter, a CF card adapter) will be described. As the CF cards, two types of Type I (the thickness is 3.3 mm) in which a value of a dimension in the thickness direction of the plane plate shape thereof is less than a value of a dimension of the thickness of the plane plate shape of the PCMCIA card and Type II (the thickness is 5.0 mm) in which a value of the dimension in the thickness direction of the plane plate shape thereof is the same as the value of the dimension of the thickness of the plane plate shape of the PCMCIA card have been generally used. In these Type I and Type II, the specification dimensions other than the thickness (the short side is 36.4 mm, the long side is 42.5 mm), and in particular, the dimensions of the portions contacting the CF card adapter are the same.

However, Type I is located so as to be near to one surface side of the plane plate shape of the CF card adapter in the thickness direction in accordance with a connecting position of a connector. However, there is no trouble in the insertion/pulling operation with respect to the information processing apparatus 11. That is, it can be understood that, if the specification in the state in which the storage medium 15 is mounted at the storage medium adapter 16 (FIG. 15B) is made not to project from the specification of the PCMCIA card, it is possible for Type I to be inserted into and pulled out of the opening portion 12 of the storage medium maintaining portion based upon the PCMCIA standard.

<Structure of Auto Loading Mechanism>

Figure 1:
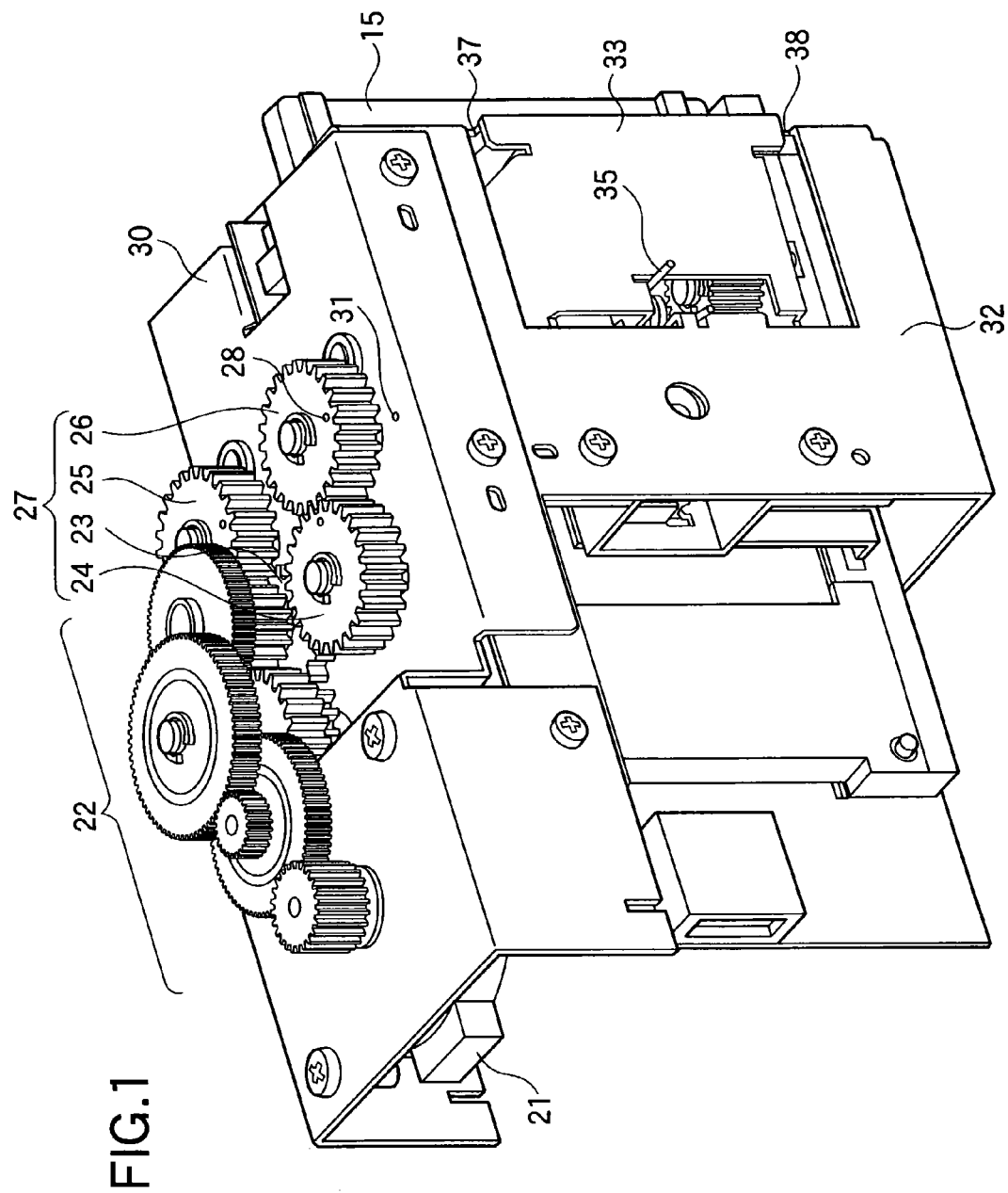
FIG. 1 is a perspective view in which the left side top face side of an auto loading mechanism equipped with an information processing apparatus relating to an embodiment of the present invention is viewed from the slightly rear side.
Figure 2:
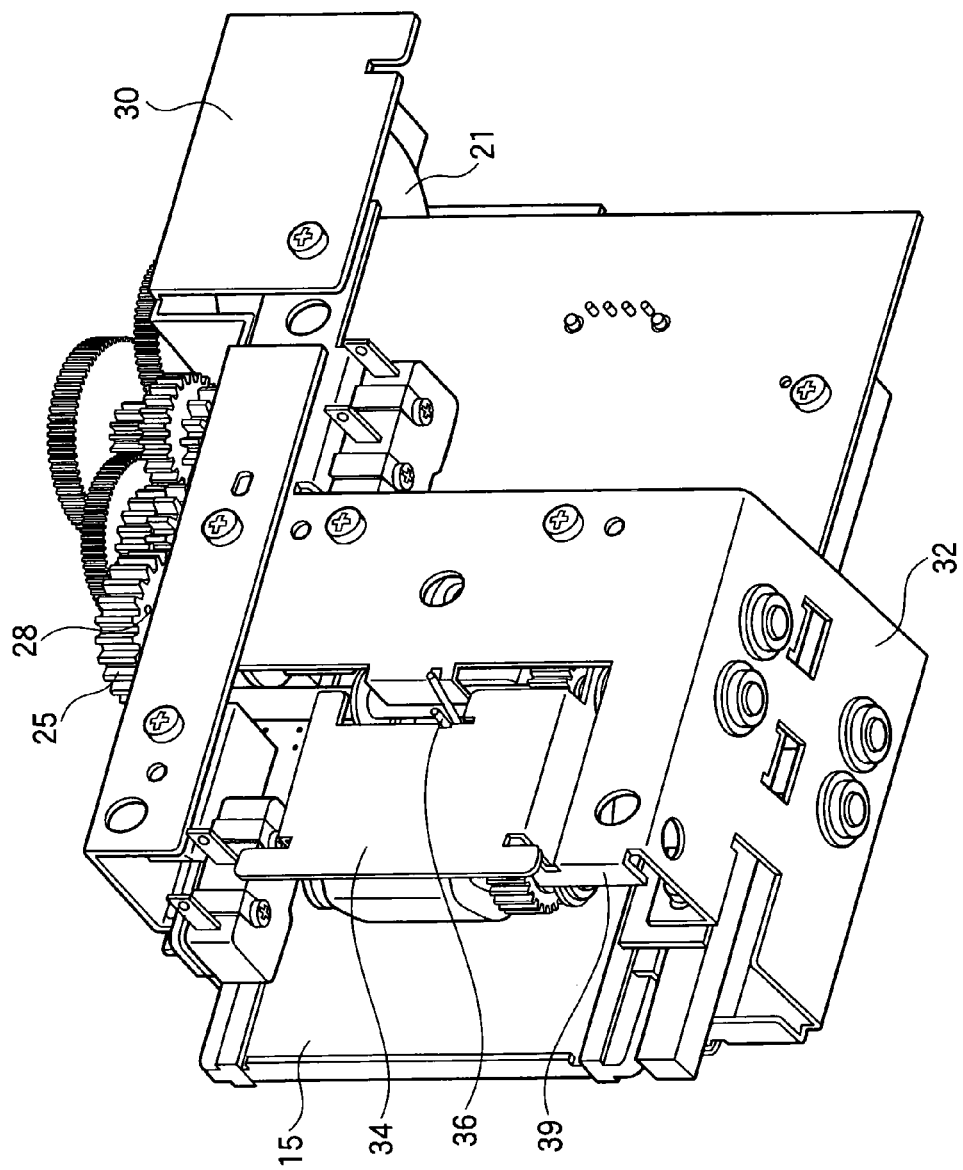
FIG. 2 is a perspective view in which the right side bottom face side of the auto loading mechanism is viewed from the slightly front side.
Figure 3:
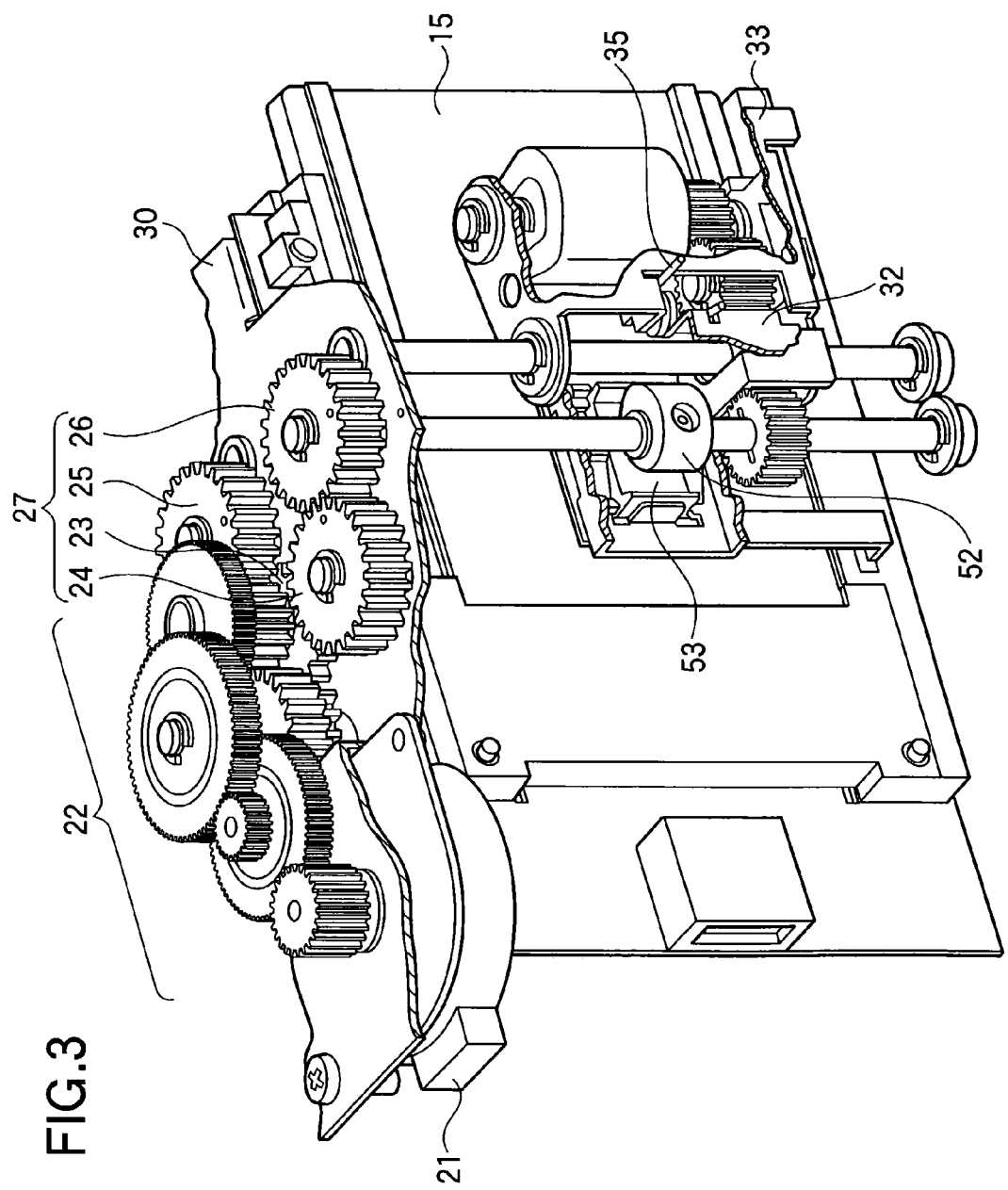
FIG. 3 is a perspective view showing a state in which a sheet metal in FIG. 1 is omitted and a part of the sheet metal is cut away.
Figure 4:
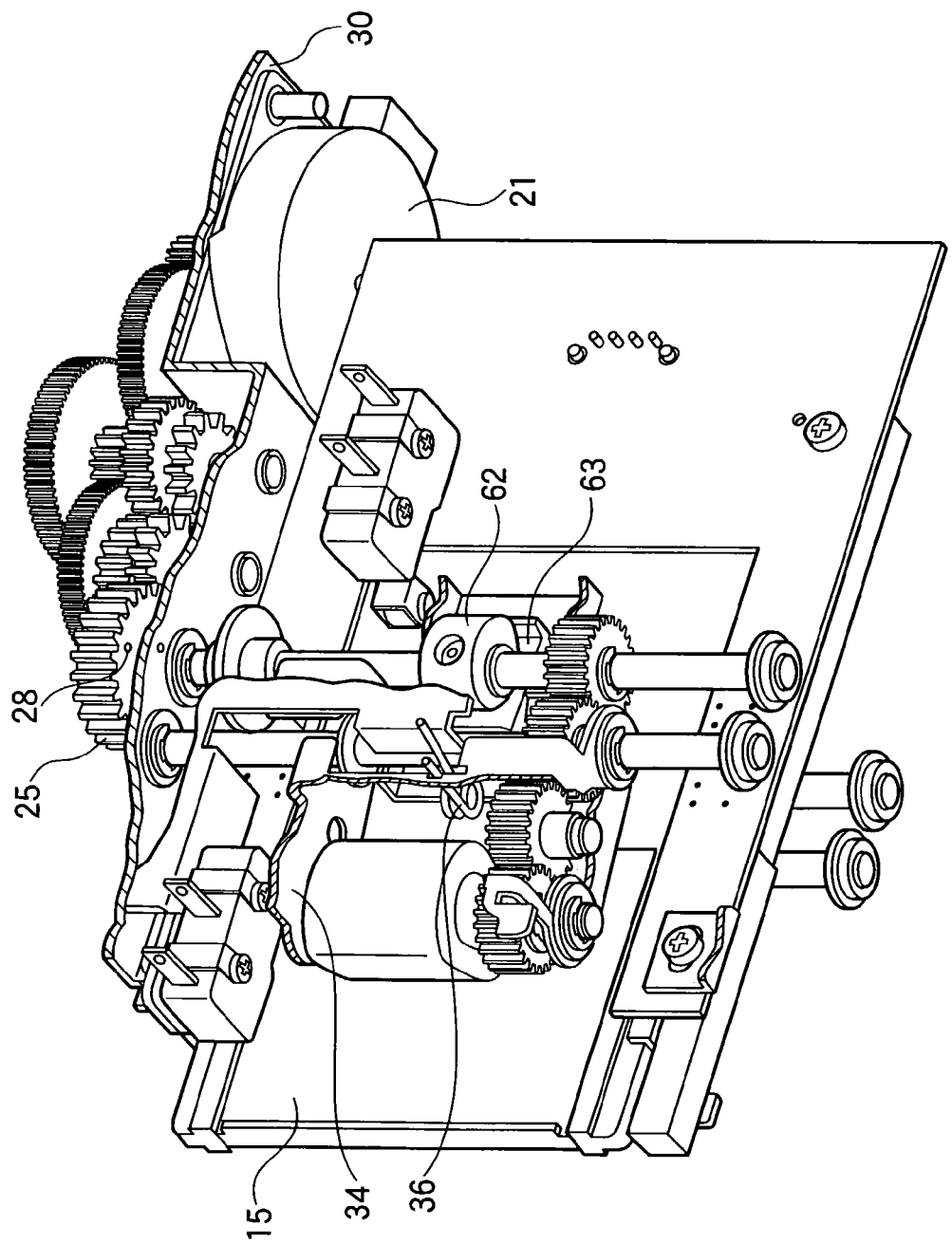
FIG. 4 is a perspective view showing a state in which a sheet metal in FIG. 2 is omitted and a part of the sheet metal is cut away.

FIG. 1 to FIG. 4 are perspective views showing the states in which the portion of the auto loading mechanism equipped with the information processing apparatus 11 is pulled out of the information processing apparatus 11. FIG. 1 is the perspective view in which the left side top surface side of the auto loading mechanism is viewed from the slightly rear side, and FIG. 2 is the perspective view in which the right side bottom surface side of the auto loading mechanism is viewed from the slightly front side. FIG. 3 is the perspective view showing a state in which a sheet metal of FIG. 1 is omitted and one portion of the sheet metal is cut away, and FIG. 4 is the perspective view showing a state in which a sheet metal of FIG. 2 is omitted and one portion of the sheet metal is cut away.

Reference numeral 21 in the drawing is a driving motor serving as a driving source in the auto loading mechanism, and can rotate forward or backward. Reference numeral 22 is a speed reducing gear train serving as a transmission speed reducing mechanism, and transmits driving force by reducing the driving force of the driving motor 21 to an appropriate speed by the speed reducing gear train 22. A gear 23 and a gear 24 are a diverging gear train 27 serving as a diverging transmission mechanism which makes and transmits the driving force diverge in a gear 25 direction and a gear 26 direction.

The same parts are used in order for the numbers of the gears of the gear 25 and the gear 26 to be the same, and positioning holes 28 are respectively provided as markers at the gear 25 and the gear 26 in order to discover the phase positions. In accordance therewith, because the gear 25 and the gear 26 have rotations at the same speed, and are relayed with the gear 24 at the time of diverging the driving force at the diverging gear train 27, the gear 25 and the gear 26 are in the relationship in which the rotation directions thereof are inverse. Here, the parts of the gear 23 and the gear 24 may be the same as those of the gear 25 and the gear 26.

Reference numeral 30 is a driving sheet metal supporting the above-described driving motor 21, speed reducing gear train 22 serving as a transmission speed reducing mechanism, and diverging gear train 27 serving as a transmission diverging mechanism. Positioning holes 31 for adjusting the phase positions are provided at the driving sheet metal 30 respectively corresponding to the respective gears of the gear 25 and the gear 26, and the assembly operation can be simply carried out at the target phase positions due to the positioning holes 28 of the gear 25 and the gear 26 being overlapped with the respective positioning holes 31.

Reference numeral 32 is a frame sheet metal which is a frame body of the auto loading mechanism. Reference numeral 33 is a first rocking sheet metal provided so as to be freely rotated as will be described later, and in the same way, reference numeral 34 is a second rocking sheet metal provided so as to be freely rotated as will be described later. The first rocking sheet metal 33 and the second rocking sheet metal 34 face one another at the positions so as to hold the storage medium 15 therebetween. Reference numeral 35 is a first rocking torsion spring energizing the first rocking sheet metal 33 to the storage medium 15 side, and is provided between the frame sheet metal 32 and the first rocking sheet metal 33. In the same way, reference numeral 36 is a second rocking torsion spring energizing the second rocking sheet metal 34 to the storage medium 15 side, and is provided between the frame sheet metal 32 and the second rocking sheet metal 34.

Reference numerals 37 and 38 are rocking sheet metal regulating portions which regulate rotation of the first rocking sheet metal 33 energized by the first rocking torsion spring 35, and which are provided at the frame sheet metal 32. In the same way, reference numeral 39 is a rocking sheet metal regulating portion which regulates rotation of the second rocking sheet metal 34 energized by the second rocking torsion spring 36, a and which is provided at the frame sheet metal 32. In accordance therewith, the first rocking sheet metal 33 and the second rocking sheet metal 34 are maintained at the positions contacting the respective sheet metal regulating portions, i.e., so as to be in a state of having a constant distance from the storage medium 15.

Figure 5:
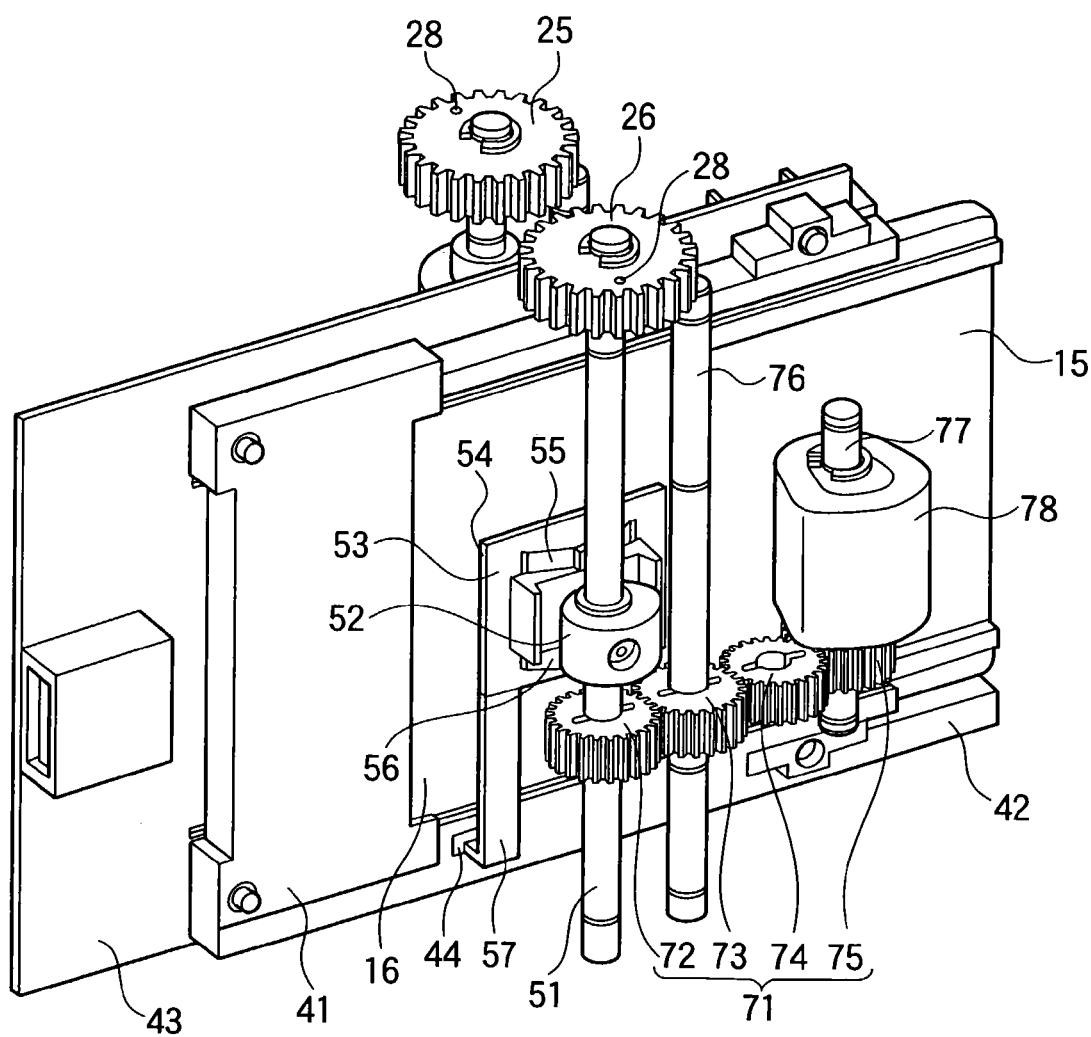
FIG. 5 is a perspective view showing a state in which a storage medium is mounted at the auto loading mechanism.
Figure 10:
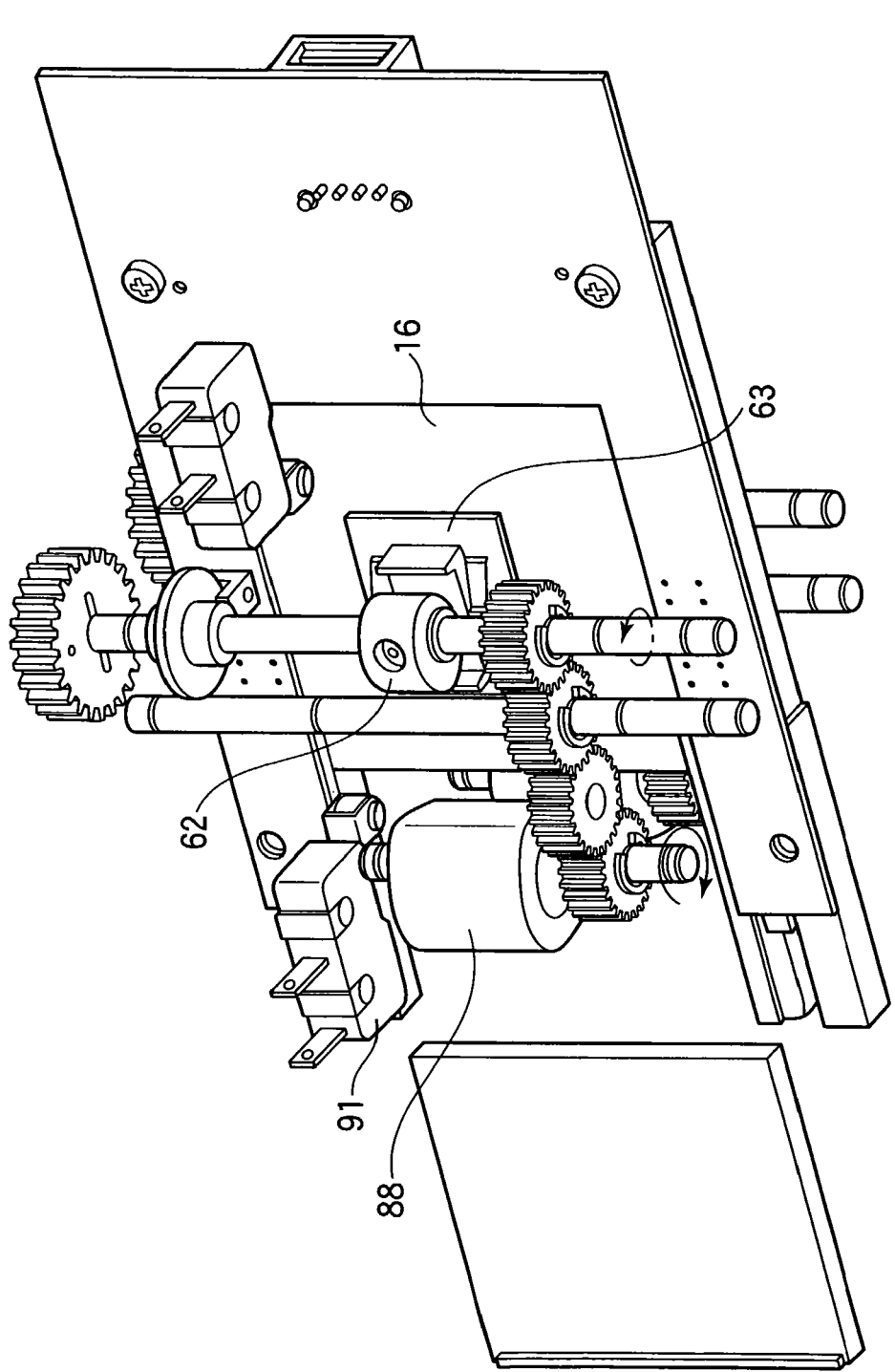
FIG. 10 is a perspective view showing a state in which there is no storage medium at the auto loading mechanism.
Figure 11:
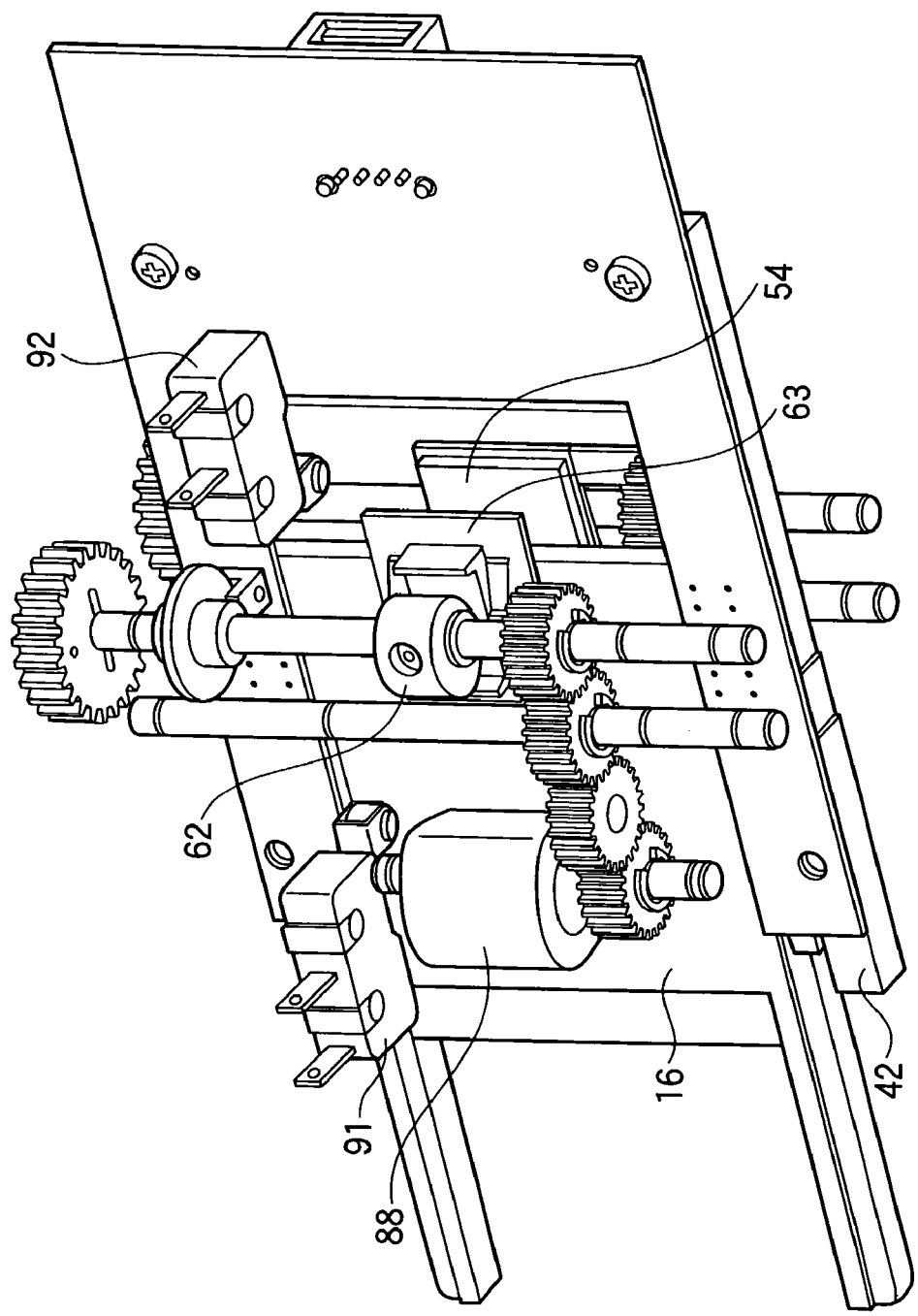
FIG. 11 is a perspective view showing a state in which a storage medium adapter is ejected from the auto loading mechanism.
Figure 12:
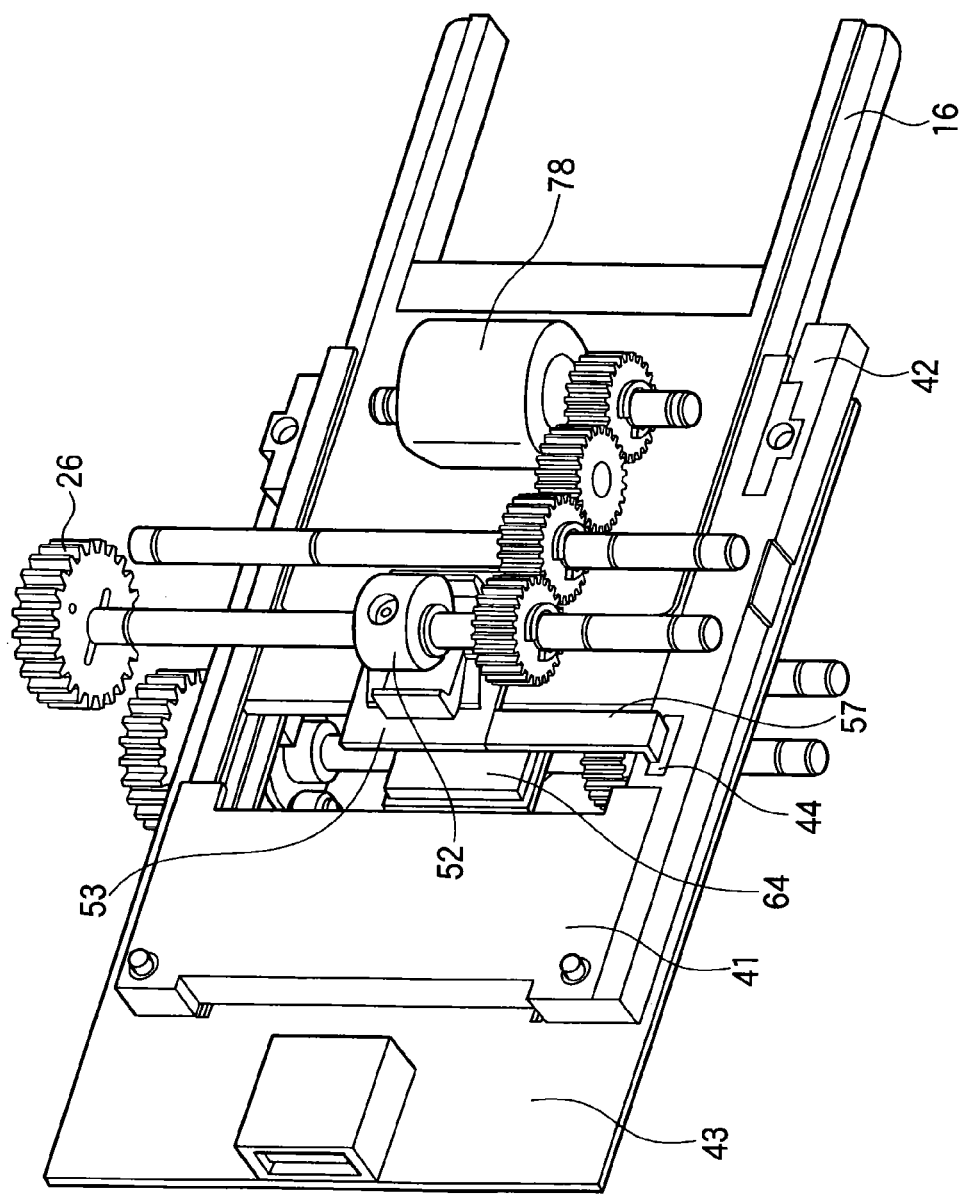
FIG. 12 is a perspective view showing a state in which a storage medium adapter is ejected from the auto loading mechanism.

FIG. 5 to FIG. 12 are perspective views showing an internal structure of the auto loading mechanism. FIG. 5 is the perspective view in which top face at the left side of the auto loading mechanism is viewed from the slightly rear side, and FIG. 6 to FIG. 11 are the perspective views in which bottom face at the right side of the auto loading mechanism is viewed from the slightly rear side, and FIG. 12 is the perspective view in which bottom face at the left side of the auto loading mechanism is viewed from the slightly rear side. FIG. 5 to FIG. 12 are the views respectively showing the perspective operation states of the auto loading mechanism.

Note that the following parts are omitted in order for the internal structure of the auto loading mechanism to be easily understood. The omitted parts are the driving sheet metal 30, the frame sheet metal 32, the first rocking sheet metal 33, the second rocking sheet metal 34, the first rocking torsion spring 35, the second rocking torsion spring 36, the driving motor 21, the speed reducing gear train 22, the transmission diverging gear train 27, and screws, shafts, bearings, E rings, and the like, which are attached thereto. In accordance therewith, in FIG. 5 to FIG. 12, the respective internal structure parts of the auto loading mechanism seem to be floated in the air. However, the respective internal structure parts are respectively fixed on or attached to the above-described omitted parts so as to be freely rotated.

Reference numeral 41 is a general-purpose socket structured such that the storage medium adapter 16 or the PCMCIA card can be mounted thereat. Reference numeral 42 is an eject lever in which the manipulator can manually eject the storage medium adapter 16 or the PCMCIA card from the socket 41, and the distal end portion of the eject lever 42 is set so as to be positioned at the opening portion 12 of the information processing apparatus 11. Reference numeral 43 is an electric substrate attached to the socket 41, and is positioned at and fixed on the driving sheet metal 30 and the frame sheet metal 32 along with the socket 41. The electric wiring from the electric substrate 43 to the interior of the information processing apparatus 11 is omitted.

Reference numeral 51 is a first pressure cam shaft to which the gear 26 is attached. Reference numeral 52 is a sector form first pressure cam attached to the first pressure cam shaft 51. The gear 26, the first pressure cam shaft 51, and the first pressure cam 52 are integrally attached to the driving sheet metal 30 and the frame sheet metal 32 via the bearing so as to be freely rotated. Reference numeral 53 is a first pressure rubber platform provided so as to freely move rectilinearly and reciprocally in the direction of the storage medium adapter 16. Reference numeral 54 is an elastic body first pressure rubber attached at the storage medium adapter 16 side of the first pressure rubber platform 53.

Reference numerals 55 and 56 are first pressure rubber platform returning plate springs which are attached to the first pressure rubber platform 53, and which energize the first pressure rubber platform 53 in the direction of being separated from the storage medium adapter 16 by contacting and acting on one portion of the frame sheet metal 32. A position of the first pressure rubber platform 53 energized by the first pressure rubber platform returning plate springs 55 and 56 is regulated by contacting the sector form first pressure cam 52, and the first pressure rubber platform 53 rectilinearly and reciprocally moves in the longitudinal direction (inserting/pulling direction) of the storage medium adapter 16 by a difference in the dimensions between the top dead center radius (semi-major axis) and the bottom dead center radius (semi-minor axis) in the direction of the radius of the sector form by rotation of the first pressure cam 52.

In the same way, reference numeral 61 is a second pressure cam shaft to which the gear 25 is attached. Reference numeral 62 is a sector form second pressure cam attached to the second pressure cam shaft 61. The gear 25, the second pressure cam shaft 61, and the second pressure cam 62 are integrally attached to the driving sheet metal 30 and the frame sheet metal 32 via the bearing so as to be freely rotated. Reference numeral 63 is a second pressure rubber platform provided so as to freely move rectilinearly and reciprocally in the direction of the storage medium adapter 16. Reference numeral 64 is an elastic body second pressure rubber attached at the storage medium adapter 16 side of the second pressure rubber platform 63.

Reference numerals 65 and 66 are second pressure rubber platform returning plate springs which are attached to the second pressure rubber platform 63, and which energize the second pressure rubber platform 63 in the direction of being separated from the storage medium adapter 16 by contacting and acting on one portion of the frame sheet metal 32. The position of the second pressure rubber platform 63 energized by the second pressure rubber platform returning plate springs 65 and 66 is regulated by contacting the sector form first pressure cam 52, and the second pressure rubber platform 63 rectilinearly and reciprocally moves in the direction of the storage medium adapter 16 by a difference in the dimensions between the top dead center radius (semi-major axis) and the bottom dead center radius (semi-minor axis) in the direction of the radius of the sector form by rotation of the second pressure cam 62.

The first pressure cam 52 and the second pressure cam 62, and the first pressure rubber platform 53 and the second pressure rubber platform 63 are symmetrically disposed at the positions sandwiching the storage medium adapter 16. The first pressure rubber platform 53 and the second pressure rubber platform 63 rectilinearly move and hold the storage medium adapter 16 therebetween at the positions of the top dead center radiuses of the first pressure cam 52 and the second pressure cam 62, and by firmly pressuring the storage medium adapter 16 down due to the first pressure rubber 54 and the second pressure rubber 64 being compressed, it is possible for the storage medium adapter 16 to be fixed so as not to move at the time of mounting/dismounting operation of the storage medium 15.

Further, at the positions of the bottom dead center radiuses of the first pressure cam 52 and the second pressure cam 62, the first pressure rubber platform 53 and the second pressure rubber platform 63 withdraw to positions where the first pressure rubber 54 and the second pressure rubber 64 are certainly separated from the storage medium adapter 16 by the first pressure rubber platform returning springs 55, 56, and the second pressure rubber platform returning springs 65, 66. In accordance therewith, there is no case in which the first pressure rubber platform 53 and the second pressure rubber platform 63 interfere at the time of mounting/dismounting operation of the storage medium adapter 16 with respect to the information processing apparatus 11.

Reference numeral 57 is a lock member attached to the first pressure rubber platform 53. Reference numeral 44 is a locking hole provided at the socket 41 such that the distal end portion of the lock member 57 is engaged into at the time of moving of the lock member 57. When the manipulator manually presses the eject lever 42, the back end portion of the eject lever 42 slide-moves at the interior of the socket 41, and closes the locking hole 44 by being overlapped with the locking hole 44. When the first pressure rubber platform 53 and the lock member 57 move to the storage medium adapter 16 side so as to be interlocked one another, the distal end portion of the lock member 57 is engaged with the locking hole 44, and because the back end portion of the eject lever 42 interferes at the time of sliding, the manipulator cannot press the eject lever 42.

Reference numeral 71 is a first transmission gear train transmitting the driving force of the first pressure cam shaft 51, and the same parts are used in order for the numbers of teeth of the gear 72 and the gear 75 to be the same, and in order for the rotations of the gear the gear 72 and the gear 75 to be at the same speed. The present structure is simplified due to all gears of the first transmission gear train 71 being made to be the same. A gear 72 is attached to the first pressure cam shaft 51. Reference numeral 76 serves as a shaft relaying driving force, and is a first rotation center shaft mechanism equipped the rotation center of the first rocking sheet metal 33, and a gear 73 is attached thereto. The first rotation center shaft 76 and the gear 73 are integrally attached to the driving sheet metal 30 and the frame sheet metal 32 via the bearing so as to be freely rotated. Further, it may be structured such that the first rotation center shaft 76 is fixed and the gear 73 is attached so as to be freely rotated.

The first rocking sheet metal 33 is attached to the first rocking rotation center shaft 76 via the bearing so as to be freely rotated, and a gear 74 is attached to the first rocking sheet metal 33 so as to be freely rotated. Even if the first rocking sheet metal 33 rotates, a space between the gear 73 and the gear 74 is maintained to be constant, and transmission of the driving force is carried out.

Reference numeral 77 is a first conveying roller shaft to which the gear 75 is attached, and the first conveying roller shaft 77 is attached to the first rocking sheet metal 33 via the bearing. Reference numeral 78 is a sector form first conveying roller attached to the first conveying roller shaft 77. The gear 75, the first conveying roller shaft 77, and the first conveying roller 78 are integrally rotated freely.

The first conveying roller 78 can carry out conveyance (movement to the ejecting direction or the mounting direction) of the storage medium 15 due to the peripheral arc shaped elastic body portion of the sector form contacting the storage medium 15, and an optimum pressure is applied in the direction of the thickness of the storage medium 15 by the rotation of the first rocking sheet metal 33 and the first rocking torsion spring 35. Further, the portion of the semiminor axis of the first conveying roller 78 is structured so as not to contact at the time of mounting/dismounting of the storage medium 15 and the storage medium adapter 16 by the rotation of the first rocking sheet metal 33 and the rocking sheet metal regulating portions 37 and 38. Moreover, the first conveying roller 78 rotates at the same speed as the first pressure cam 52 by the first transmission gear train 71.

In the same way, reference numeral 81 is a second transmission gear train transmitting the driving force of the second pressure cam shaft 61, and the same parts are used in order for the numbers of teeth of a gear 82 and a gear 85 to be the same, and in order for the rotations of the gear 82 and the gear 85 to be at the same speed. The present structure is simplified due to all gears of the second transmission gear train 81 being made to be the same. The gear 82 is attached to the second pressure cam shaft 61. Reference numeral 86 serves as a shaft relaying driving force, and is a second rotation center shaft which is the rotation center of the second rocking sheet metal 34, and a gear 83 is attached thereto. The second rotation center shaft 86 and the gear 83 are integrally attached to the driving sheet metal 30 and the frame sheet metal 32 via the bearing so as to be freely rotated. Further, it may be structured such that the second rotation center shaft 86 is fixed and the gear 83 is attached so as to be freely rotated.

The second rocking sheet metal 34 is attached to the second rocking rotation center shaft 86 via the bearing so as to be freely rotated. A gear 84 is attached to the second rocking sheet metal 34 so as to be freely rotated. Even if the second rocking sheet metal 34 rotates, a space between the gear 83 and the gear 84 is maintained to be constant, and transmission of the driving force is carried out.

Reference numeral 87 is a second conveying roller shaft to which the gear 85 is attached, and the second conveying roller shaft 87 is attached to the second rocking sheet metal 34 via the bearing. Reference numeral 88 is a sector form second conveying roller attached to the second conveying roller shaft 87. The gear 85, the second conveying roller shaft 87, and the second conveying roller 88 are integrally rotated freely.

The second conveying roller 88 can carry out conveyance (movement to the ejecting direction or to the mounting direction) of the storage medium 15 due to the peripheral arc shaped elastic body portion of the sector form contacting the storage medium 15, and an optimum pressure is applied in the direction of the thickness of the storage medium 15 by rotation of the second rocking sheet metal 34 and the second rocking torsion spring 36. Further, the portion of the semiminor axis of the second conveying roller 88 is structured so as not to contact at the time of mounting/dismounting of the storage medium 15 and the storage medium adapter 16 by rotation of the second rocking sheet metal 34 and the rocking sheet metal regulating portion 39. Moreover, the second conveying roller 88 rotates at the same speed as the second pressure cam 62 by the second transmission gear train 81.

Reference numeral 91 is a first micro switch serving as sensing means for sensing the presence/absence of mounting of the storage medium 15 with respect to the storage medium adapter 16 (or the presence/absence of mounting of the PCMCIA card with respect to the socket 41). Reference numeral 92 is a second micro switch serving as sensing means for sensing the presence/absence of mounting of the storage medium adapter 16 with respect to the socket 41 (or the presence/absence of mounting of the PCMCIA card with respect to the socket 41). If both of the first micro switch 91 and the second micro switch 92 are turned off, it can be understood that anything is not mounted at the socket 41.

When the only storage medium adapter 16 is mounted as a unit at the information processing apparatus 11, when the storage medium adapter 16 is inserted from the opening portion 12, the first micro switch 91 is turned on. Thereafter, due to the storage medium adapter 16 going toward the inside in accordance with the aforementioned inserting operation, at the position where the storage medium adapter 16 is mounted at the socket 41, because the first micro switch 91 is turned off and the second micro switch 92 is turned on at the opening accommodating portion 17 at which the storage medium 15 can be mounted, it is sensed that the storage medium adapter 16 is certainly mounted.

Further, when the only storage medium adapter 16 is ejected as a unit from the information processing apparatus 11, because turn-on and turn-off of the first micro switch 91 are carried out after the second micro switch 92 is turned off, it is sensed that the storage medium adapter 16 is certainly ejected.

When the second micro switch 92 is in a state of being turned on, the presence/absence of the storage medium 15 is sensed due to the first micro switch 91 being turned on/off, and inserting operation and ejecting operation of the storage medium 15 are selectively carried out by the auto loading mechanism.

Even after turn-on and turn-off of the first micro switch 91 are carried out, if the second micro switch 92 is in a state of being turned off as is, it is judged that the storage medium adapter 16 is not mounted at the information processing apparatus 11, and operation of the auto loading mechanism is not carried out.

When the first micro switch 91 is turned on, and the second micro switch 92 is turned on immediately after the first micro switch 91 is in this state as is, the information processing apparatus 11 judges that the storage medium adapter 16 at which the storage medium 15 is mounted or the PCMCIA card is inserted, and the operation of the auto loading mechanism is not carried out. However, it can be judged whether it is the storage medium 15 or the PCMCIA card by carrying out access operations such as reading and writing of electronic data by the information processing apparatus 11, and ejecting operation and inserting operation of the storage medium 15 by the auto loading mechanism are selectively carried out after the access processing of the electronic data.

When turn-on/turn-off of the second micro switch 92 are carried out in a state in which the first micro switch 91 is turned off, because there is no possibility of the PCMCIA card or the combination of the storage medium 15 and the storage medium adapter 16, not only operation of the auto loading mechanism is not carried out, but also access processing to electronic data is not carried out.

Reference numeral 93 is a sensor flag which is attached to the second pressure cam shaft 61 and which is for sensing a rotation position of the second pressure cam 62, and the phase is adjusted to the central position of the bottom dead center radius (semi-minor axis) of the second pressure cam 62, and a notch is provided thereat. Reference numeral 94 is a photo interrupter serving as means for sensing a rotation position of the sensor flag 93, and is provided on the electric substrate 43. The photo interrupter 94 detects the rotation positions of the second pressure cam 62 and the second conveying roller 88 to which the driving force is relayed and transmitted, and the rotation positions of the first pressure cam 52 whose phase is adjusted at the time of assembly and the first conveying roller 78 to which the driving force is relayed and transmitted in the same way. Note that the sensor flag 93 can be structured so as to be provided at the second rotation center shaft 86 and used.

Here, the arc width of the sector form and the phase relationship of the first pressure cam 52 and the first conveying roller 78, and the second pressure cam 62 and the second conveying roller 88 will be described.

A rotation direction angle of the sector form arc portion of the first pressure cam 52 is greater than a rotation direction angle of the sector form arc portion of the first conveying roller 78, and the phases of the central position of the arc portion of the first pressure cam 52 and the central position of the arc portion of the first conveying roller 78 are adjusted at the position where the arc portions are directed to the direction of being perpendicularly separated from the plate surface of the storage medium 15.

In the same way, a rotation direction angle of the sector form arc portion of the second pressure cam 62 is greater than a rotation direction angle of the sector form arc portion of the second conveying roller 88, and the phases of the central position of the arc portion of the second pressure cam 62 and the central position of the arc portion of the second conveying roller 88 are adjusted at the position where the arc portions are directed to the direction of being perpendicularly separated from the plate surface of the storage medium 15.

Moreover, the phases of the first pressure cam 52 and the second pressure cam 62, and the phases of the first conveying roller 78 and the second conveying roller 88 are respectively adjusted at the positions where they face one another with the storage medium 15 and the storage medium adapter 16 being provided therebetween.

<Ejecting Operation of Storage Medium>

Next, operation of ejecting the storage medium 15 by the auto loading mechanism of the information processing apparatus 11 will be successively described. Note that operations of the respective members structuring the auto loading mechanism can be understood in accordance with the above description, and operations of the members facing one another with the storage medium 15 and the storage medium adapter 16 (or the PCMCIA card) being provided therebetween are the symmetrical operations.

Figure 6:
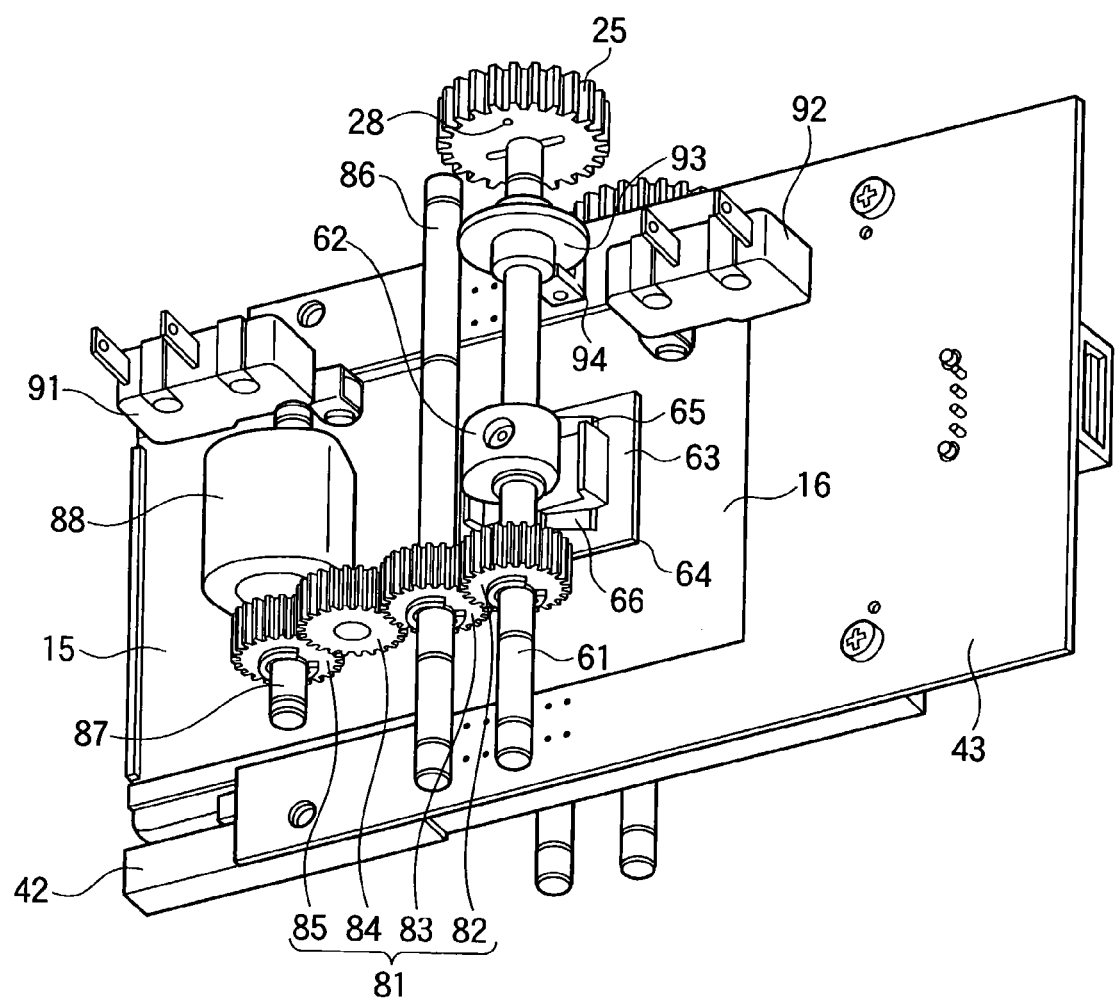
FIG. 6 is a perspective view showing a state in which a storage medium is mounted at the auto loading mechanism.

In FIG. 5 and FIG. 6, the storage medium adapter 16 in which the storage medium 15 is accommodated is mounted at the socket 41, and it is in a state in which the central processing device 111 of the information processing apparatus 11 does not access to the storage medium 15. Therefore, if the manipulator carries out operation of the eject lever 42, it is possible for the storage medium adapter 16 to be ejected. Cases in which it is possible for the storage medium adapter 16 to be ejected are standby positions 0° of the second pressure cam 62 and the second conveying roller 88, and in the same way, the cases are standby positions 0° of the first pressure cam 52 and the first conveying roller 78.

Figure 7:
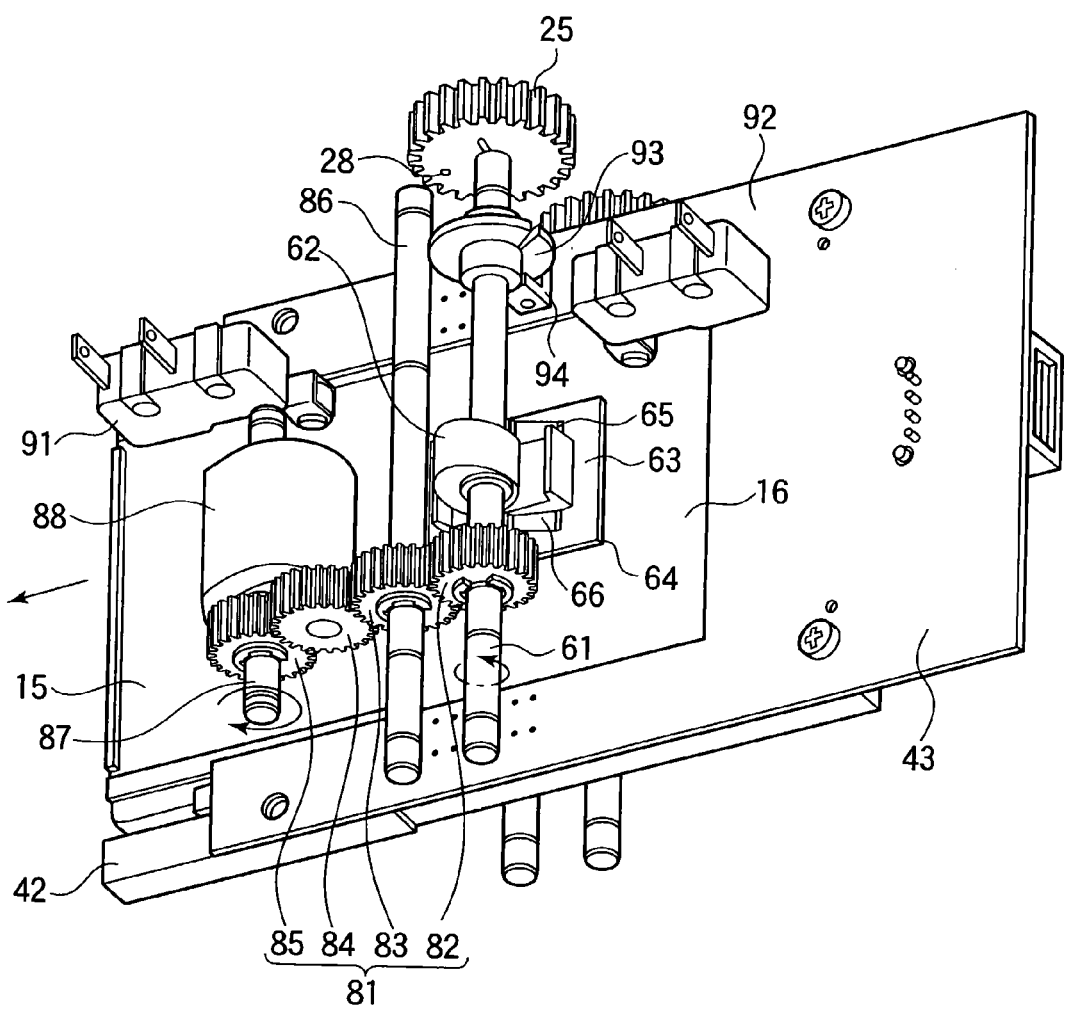
FIG. 7 is a perspective view showing a state of preparing for ejecting the storage medium at the auto loading mechanism.

FIG. 7 shows a state in which the storage medium adapter 16 is pressed down so as not to move as a preparation when the storage medium 15 is ejected from the storage medium adapter 16. The second pressure cam 62 rotates 90° counterclockwise in the drawing by the forward rotation of the driving motor 21, and the second pressure rubber platform 63 moves in the direction of the storage medium 15, and the second pressure rubber platform 63 and the first pressure rubber platform 53 hold the storage medium adapter 16 therebetween. At this time, the second conveying roller 88 rotates 90° clockwise in the drawing. However, the sector form arc portion thereof does not contact the storage medium 15 yet. In accordance therewith, the storage medium adapter 16 is certainly held so as to be sandwiched between the second pressure rubber platform 63 and the first pressure rubber platform 53 before the ejecting operation of the storage medium 15. Further, there is no case in which the eject lever 42 is carelessly operated by the interference with the lock member 57.

Figure 8:
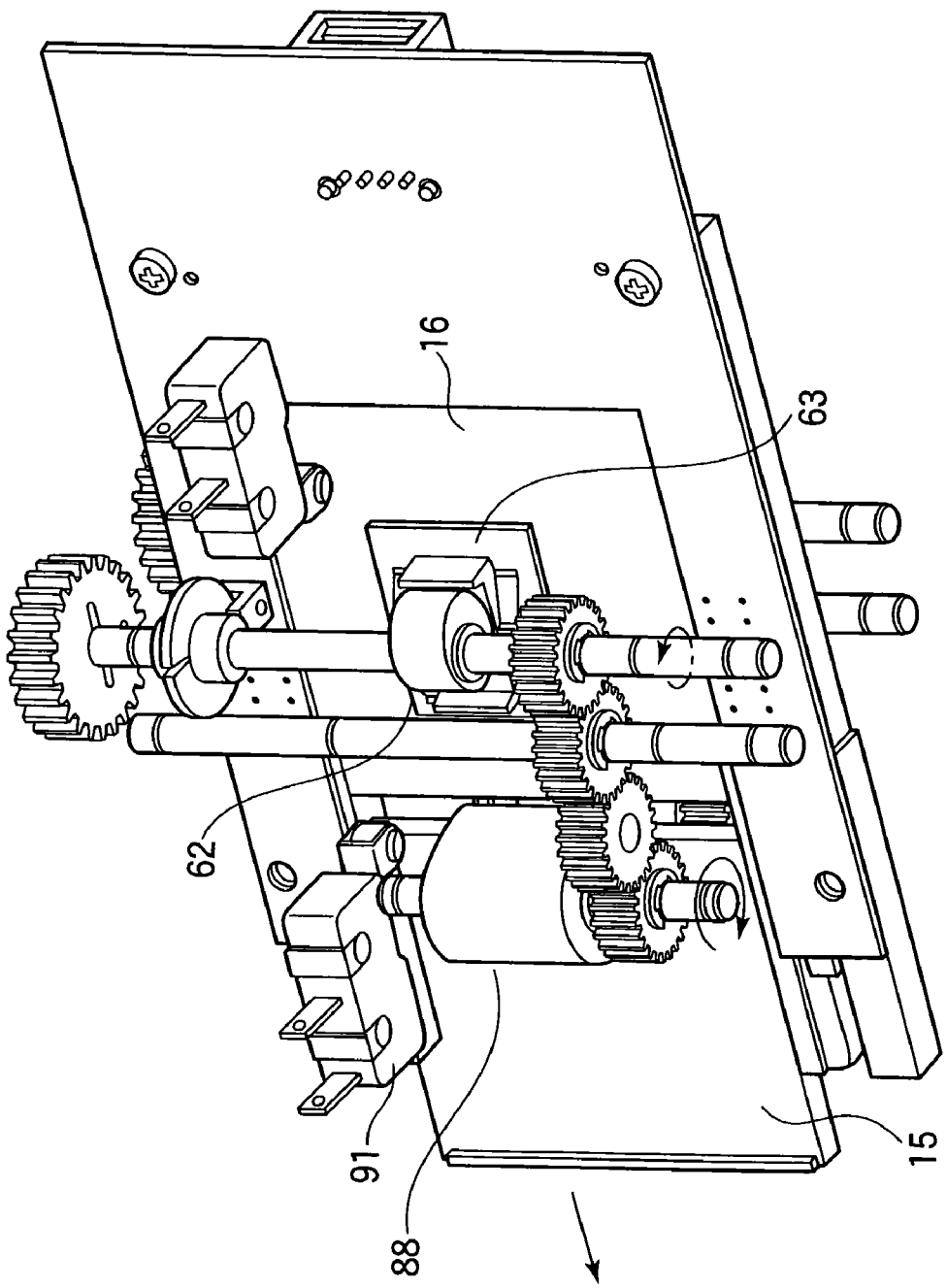
FIG. 8 is a perspective view showing a state in which the storage medium is ejected at the auto loading mechanism.

FIG. 8 shows a state in which the storage medium 15 is ejected from the storage medium adapter 16. When the manipulator instructs an automatic ejection of the storage medium 15 from the storage medium adapter 16 by the manipulation unit 116, the auto loading mechanism starts the automatic ejecting operation. That is, the second pressure cam 62 rotates 180° counterclockwise in the drawing, and the second pressure rubber platform 63 and the first pressure rubber platform 53 continue to hold the storage medium adapter 16 therebetween. At this time, the second conveying roller 88 makes the storage medium 15 being ejected along with the first conveying roller 78 by rotating 180° clockwise in the drawing.

Figure 9:
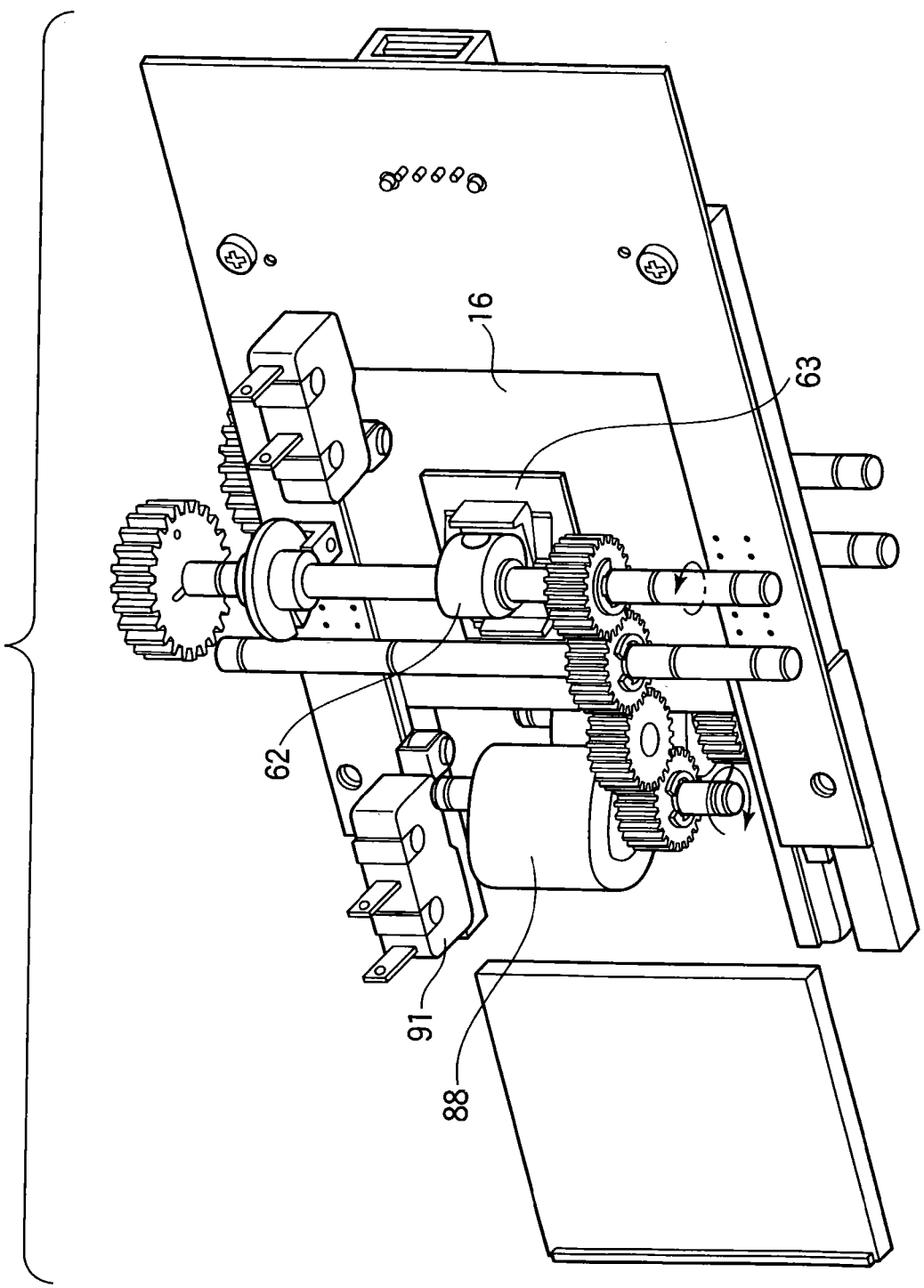
FIG. 9 is a perspective view showing a state in which the storage medium has been ejected at the auto loading mechanism.

FIG. 9 shows a state in which the storage medium 15 has been ejected from the storage medium adapter 16. The second pressure cam 62 rotates 270° counterclockwise in the drawing, the second pressure rubber platform 63 and the first pressure rubber platform 53 continue to hold the storage medium adapter 16 therebetween. At this time, the second conveying roller 88 rotates 270° clockwise in the drawing, and the sector form arc portion thereof is already separated from the storage medium 15, and the first micro switch 91 is turned off, and it can be sensed that the storage medium 15 has been ejected.

FIG. 10 shows a state in which, after the storage medium 15 has been ejected from the storage medium adapter 16, and another insertion of the storage medium 15 into the storage medium adapter 16 is waited for. The second pressure cam 62 rotates 360° counterclockwise in the drawing, the second pressure rubber platform 63 is separated from the storage medium adapter 16, and the second conveying roller 88 returns to the original standby position by rotating 360° clockwise in the drawing.

FIG. 11 and FIG. 12 show states in which the storage medium adapter 16 is ejected from the socket 41. The storage medium adapter 16 can be ejected from the socket 41 due to the manipulator manipulating the eject lever 42.

<Mounting Operation of Storage Medium>

Next, operation in which the storage medium 15 is mounted by the auto loading mechanism will be simply described. As described above, at the time of the preparatory state in which the storage medium adapter 16 is accommodated in the auto loading mechanism of the information processing apparatus 11 and the storage medium 15 can be mounted at the storage medium adapter 16, when it is sensed by the first micro switch 91 that the storage medium 15 is inserted in (an area sensed by the first micro switch 91 of) the storage medium adapter 16 by the manipulator, the auto loading mechanism starts the automatic mounting operation. That is, the driving motor 21 rotates backward, and in the same way, by inversely following the progress of the ejecting operation of the storage medium 15 described above, i.e., by shifting the operation states from FIG. 12 to FIG. 5, operation of mounting the storage medium 15 is carried out.

Here, operation of the auto loading mechanism while the central processing device 111 of the information processing apparatus 11 is reading the electronic data stored in the storage medium 15, or inversely, while the electronic data is written from the central processing device 111 of the information processing apparatus 11 to the storage medium 15, will be described further in detail.

Before the central processing device 111 of the information processing apparatus 11 starts to access to the storage medium 15, the auto loading mechanism is in the states of FIG. 5 and FIG. 6 described above (the states in which the storage medium adapter 16 can be ejected by operation of the eject lever 42), and is maintained to be in the state of FIG. 7 described above (the state in which the storage medium adapter 16 is held so as to be sandwiched between the first pressure rubber platform 53 and the second pressure rubber platform 63, and the state in which the eject lever 42 cannot be operated) while the information processing apparatus 11 is accessing to the storage medium 15. After the central processing device 111 of the information processing apparatus 11 completed the access to the storage medium 15, the auto loading mechanism returns to the states of the FIG. 5 and FIG. 6 described above (the states in which the storage medium adapter 16 can be ejected by operation of the eject lever 42).

When the central processing device 111 of the information processing apparatus 11 starts to access to the storage medium 15, first, the driving motor 21 rotates forward, and the second pressure rubber platform 63 and the first pressure rubber platform 53 hold the storage medium adapter 16 therebetween. Further, the second pressure cam 62 is maintained to be in a state of being rotated 90° counterclockwise, and the first pressure cam 52 is maintained to be in a state of being rotated 90° clockwise. At this time, detent members which stop the second pressure cam shaft 61 and the second pressure cam shaft 51 may be provided in order for the second pressure cam 62 and the first pressure cam 52 to be not rotated. Moreover, a clutch mechanism or the like may be provided at the second pressure cam shaft 61, the second pressure cam shaft 51, or the like. Further, as described above, the ejecting operation of the storage medium adapter 16 cannot be carried out. Further, the central processing device 111 of the information processing apparatus 11 carries out an access operation to the storage medium 15.

When the central processing device 111 of the information processing apparatus 11 completed the access to the storage medium 15, next, the driving motor 21 rotates backward, and the second pressure rubber platform 63 and the first pressure rubber platform 53 withdraw from the storage medium adapter 16. Further, the second pressure cam 62 and the first pressure cam 52 rotate and return from the positions of being respectively rotated 90° to the standby positions 0°. During these serial operations, the second conveying roller 88 and the first conveying roller 78 move reciprocally between the standby positions 0° and the positions of being rotated 90°. However, because the sector form arc portions thereof do not contact the storage medium 15, there is no effect on the-operation in which the central processing device 111 of the information processing apparatus 11 accesses to the storage medium 15.

Next, the details of an auto ejecting mechanism which the information processing apparatus 11 has will be described.

Figure 17:
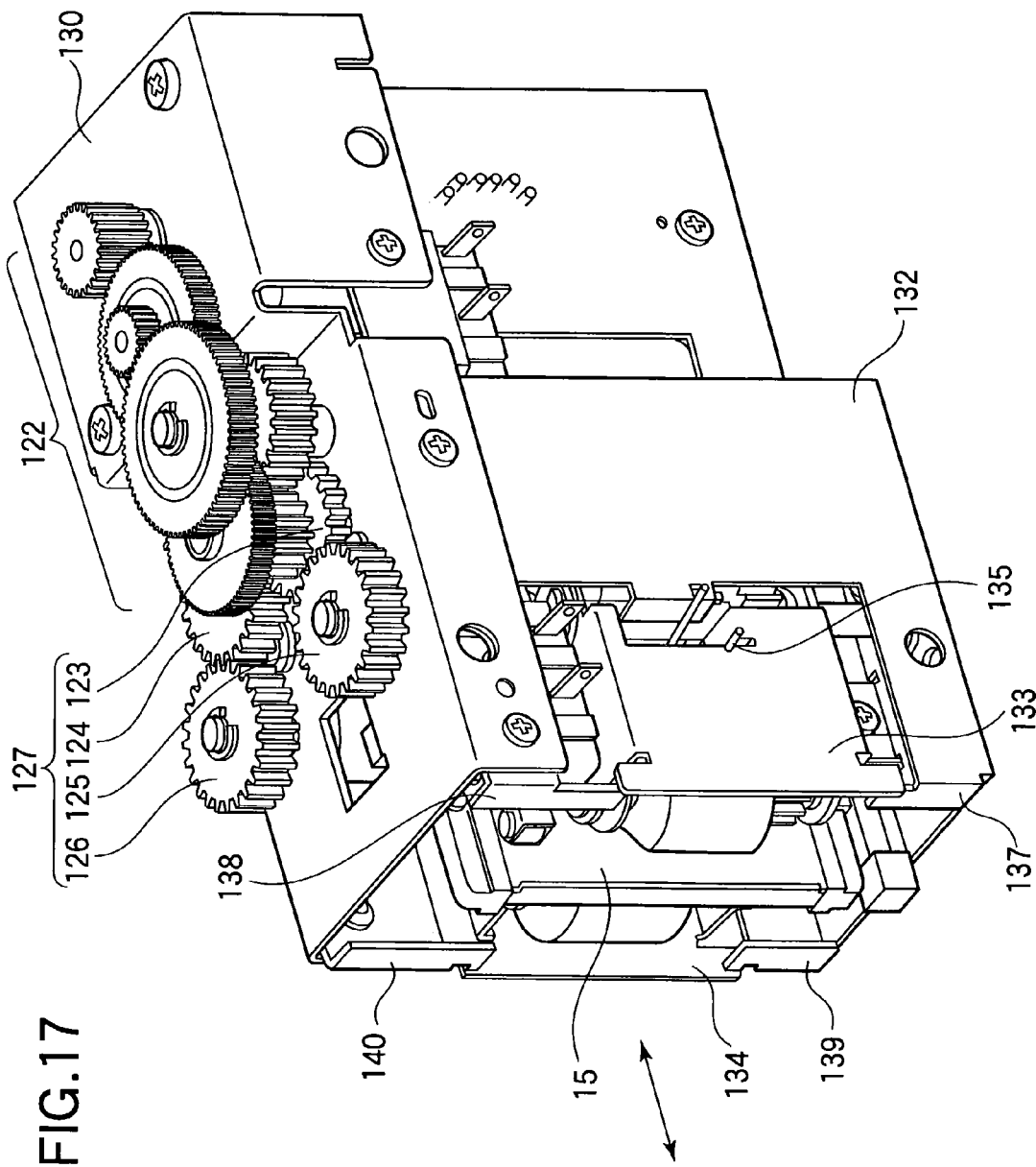
FIG. 17 is a perspective view showing a case in which an auto ejecting mechanism relating to the embodiment of the present invention is viewed obliquely from the upper right direction toward the front thereof.
Figure 18:
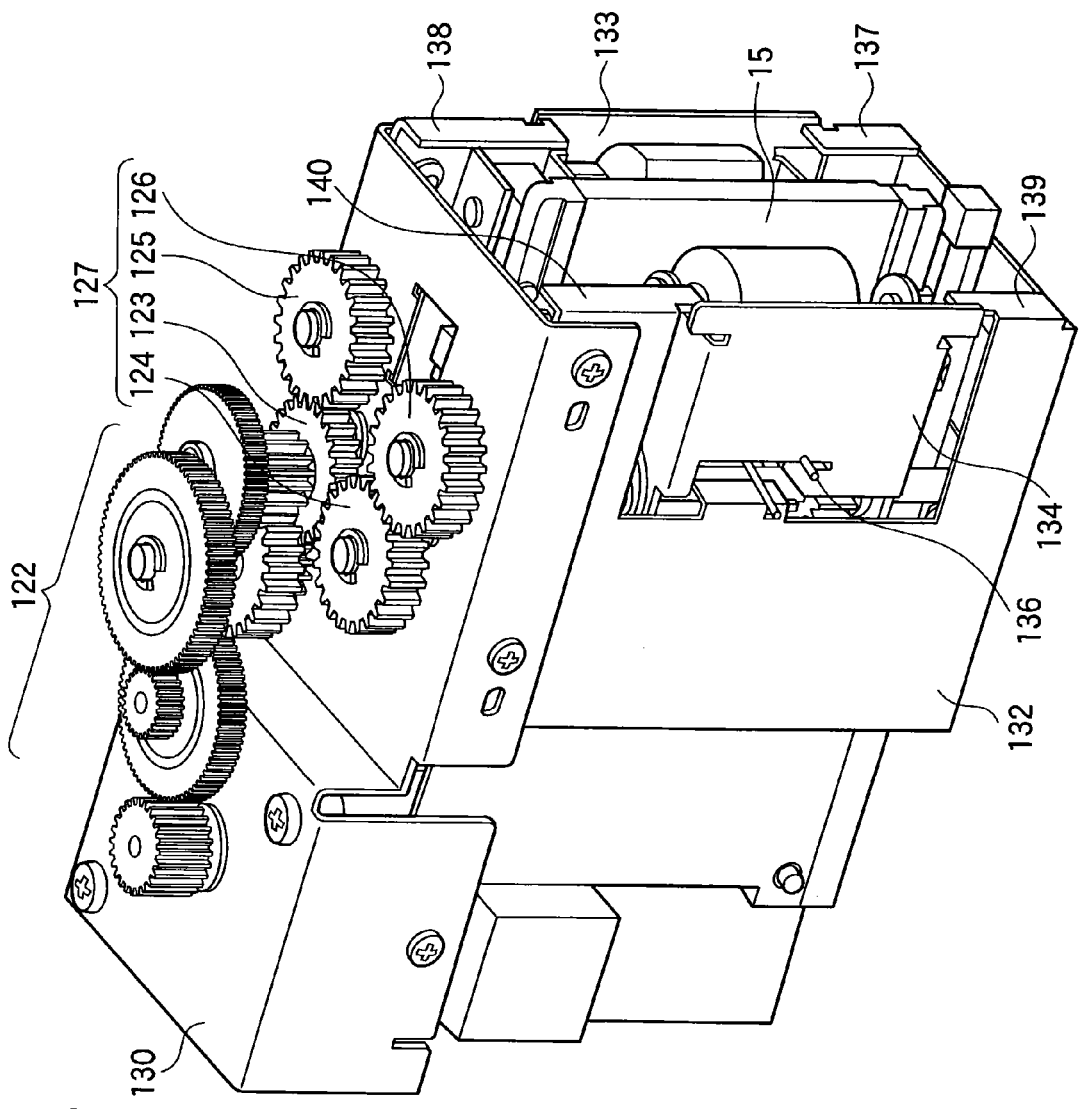
FIG. 18 is a perspective view showing a case in which the auto ejecting mechanism is viewed obliquely from the upper left direction toward the front thereof.
Figure 19:
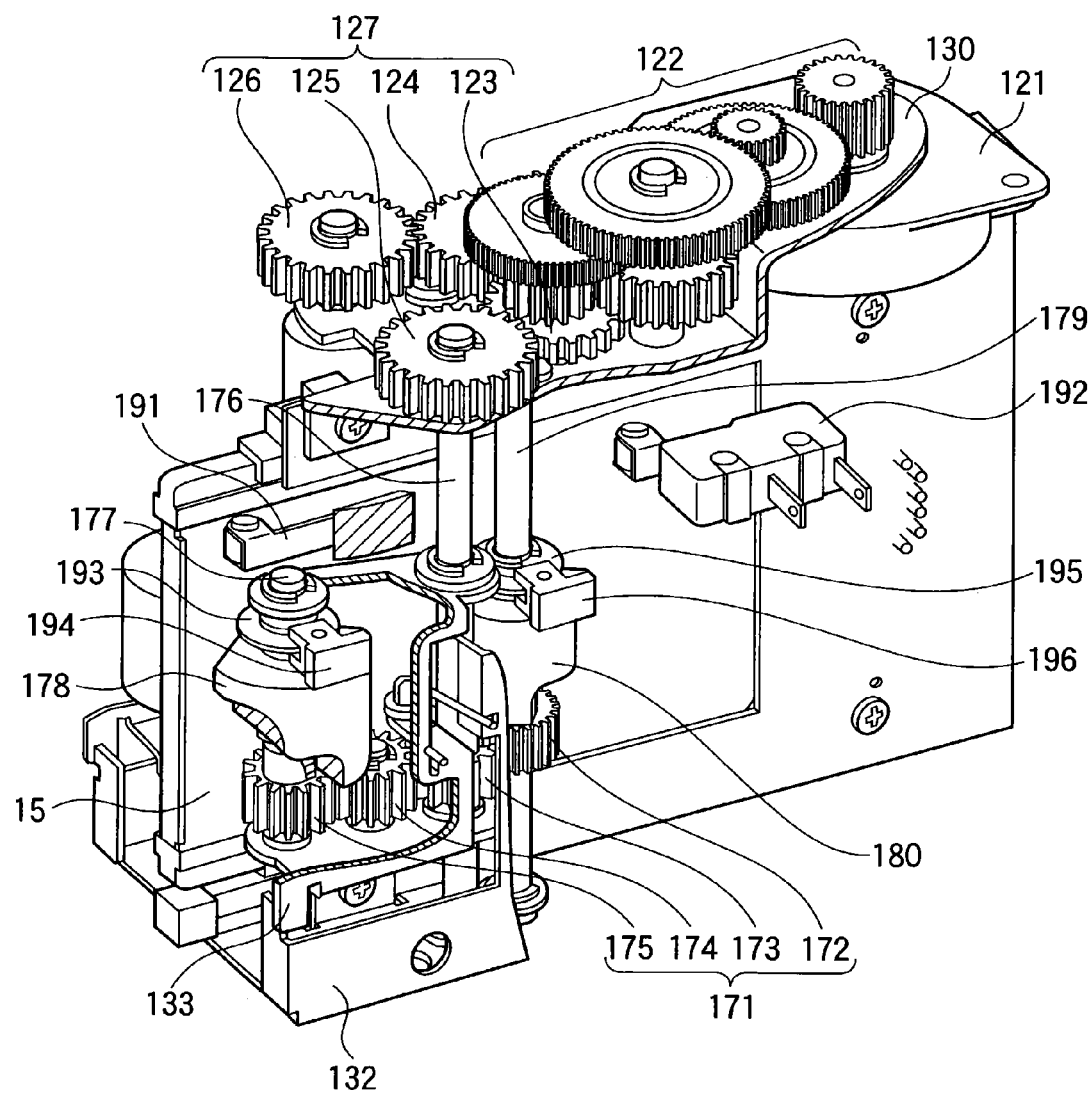
FIG. 19 is a perspective view showing a case in which an internal structure of the auto ejecting mechanism is viewed obliquely from the upper right direction toward the front thereof.
Figure 20:
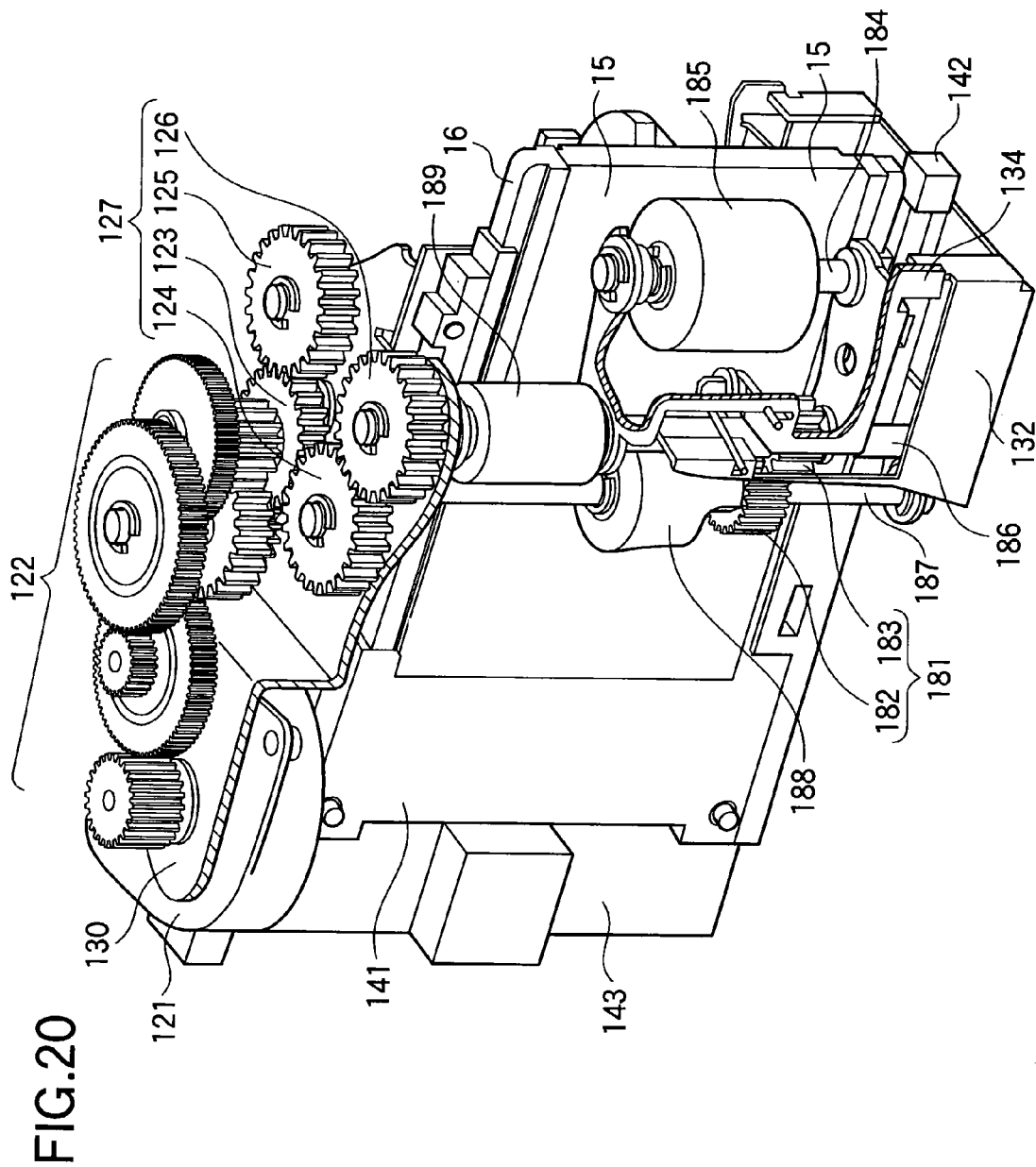
FIG. 20 is a perspective view showing a case in which the internal structure of the auto ejecting mechanism is viewed obliquely from the upper left direction toward the front thereof.

FIG. 17 to FIG. 20 are perspective views showing that a portion of the auto ejecting mechanism is pulled out of the information processing apparatus 11. FIG. 17 is a view when the auto ejecting mechanism is viewed obliquely from the right direction toward the front thereof, and FIG. 18 is a view when the auto ejecting mechanism is viewed obliquely from the upper left direction toward the front thereof. FIG. 19 is a view in which one portion of a chassis is eliminated in order to show the internal structure of FIG. 1, and FIG. 20 is a view in which one portion of the chassis is eliminated in order to show the internal structure of FIG. 18. Note that the front side of the auto ejecting mechanism is the arrow direction side of FIG. 17, which the storage medium 15 is inserted into and pulled out.

Reference numeral 121 shown in FIG. 19 and FIG. 20 is a driving motor serving as a driving source of the auto ejecting mechanism, and can rotate forward or can rotate backward. Reference numeral 122 shown in FIG. 17 to FIG. 20 is a speed reducing gear train serving as a transmission speed reducing mechanism, and the driving force is transmitted by reducing a rotational speed which is the driving force of the driving motor 121 to the optimum rotational speed by this speed reducing gear train 22.

Reference numeral 127 shown in FIG. 17 to FIG. 20 is a diverging gear train serving as a diverging transmission mechanism which diverges and transmits the driving force in the direction of a gear 125 and the direction of a gear 126 by a gear 123 and a gear 124. Because the driving force is transmitted to the gear 126 by being relayed with the gear 124 when the driving force is diverged by the diverging gear train 127, the rotation direction of the gear 126 and the rotation direction of the gear 125 are in the relationship of being opposite to one another. The present structure is simplified due to all gears of the gears 123 to 126 of the diverging gear train 127 being made to be the same.

Reference numeral 130 shown in FIG. 17 to FIG. 20 is a driving sheet metal supporting the above-described driving motor 121, speed reducing gear train 122 serving as a transmission speed reducing mechanism, and diverging gear train 127 serving as a transmission diverging mechanism. Reference numeral 132 is a frame sheet metal which is a frame body of the auto ejecting mechanism. Reference numeral 133 is a first rocking sheet metal provided so as to be freely rotated as will be described later. In the same way, reference numeral 134 is a second rocking sheet metal provided so as to be freely rotated as will be described later. The first rocking sheet metal 133 and the second rocking sheet metal 134 are in a positional relationship of being faced one another so as to sandwich the storage medium 15 therebetween.

Reference numeral 135 shown in FIG. 17 is a first rocking torsion spring energizing the first rocking sheet metal 133 to the storage medium 15 side, and is provided between the frame sheet metal 132 and the first rocking sheet metal 133. In the same way, reference numeral 136 shown in FIG. 18 is a second rocking torsion spring energizing the second rocking sheet metal 134 to the storage medium 15 side, and is provided between the frame sheet metal 132 and the second rocking sheet metal 134.

Reference numeral 137 and 138 shown in FIG. 17 and FIG. 18 are for regulating rotation of the first rocking sheet metal 133 energized by the first rocking torsion spring 135, and are rocking sheet metal regulating portions provided at the frame sheet metal 132. In the same way, reference numerals 139 and 140 shown in FIG. 17 and FIG. 18 are for regulating rotation of the second rocking sheet metal 134 energized by the second rocking torsion spring 136, and are rocking sheet metal regulating portions provided at the frame sheet metal 132. In accordance therewith, the first rocking sheet metal 133 and the second rocking sheet metal 134 are respectively maintained at the positions contacting the rocking sheet metal regulating portions 137 and 138, and the rocking sheet metal regulating portions 139 and 140, i.e., so as to be in a state of having a constant distance from the storage medium 15.

FIG. 21 to FIG. 35 are perspective views showing an internal structure of the auto ejecting mechanism. FIG. 21 to FIG. 33 are the views in which the internal structure of the auto ejecting mechanism is viewed obliquely from the upper right direction toward the front thereof, and FIG. 34 to FIG. 35 are the views in which the internal structure of the auto ejecting mechanism is viewed obliquely from the upper left direction toward the front thereof, and FIG. 21 to FIG. 35 are the views respectively showing the respective operation states of the auto ejecting mechanism.

In FIG. 21 to FIG. 35, the following parts are omitted in order for the internal structure of the auto ejecting mechanism to be easily understood. The omitted parts are the driving sheet metal 130, the frame sheet metal 132, the first rocking sheet metal 133, the second rocking sheet metal 134, the first rocking torsion spring 135, the second rocking torsion spring 136, the driving motor 121, the speed reducing gear train 122, the transmission diverging gear train 127, and screws, shafts, bearings, E rings, and the like which are attached thereto. In accordance with the omission of these parts, in FIG. 21 to FIG. 35, respective parts structuring the interior of the auto ejecting mechanism seem to be floated in the air. However, the respective parts are respectively fixed on the omitted parts or attached to the omitted parts so as to be freely rotated. Note that, the following description will be described appropriately with reference to FIG. 17 to FIG. 20 in addition to FIG. 21 to FIG. 35.

Figure 34:
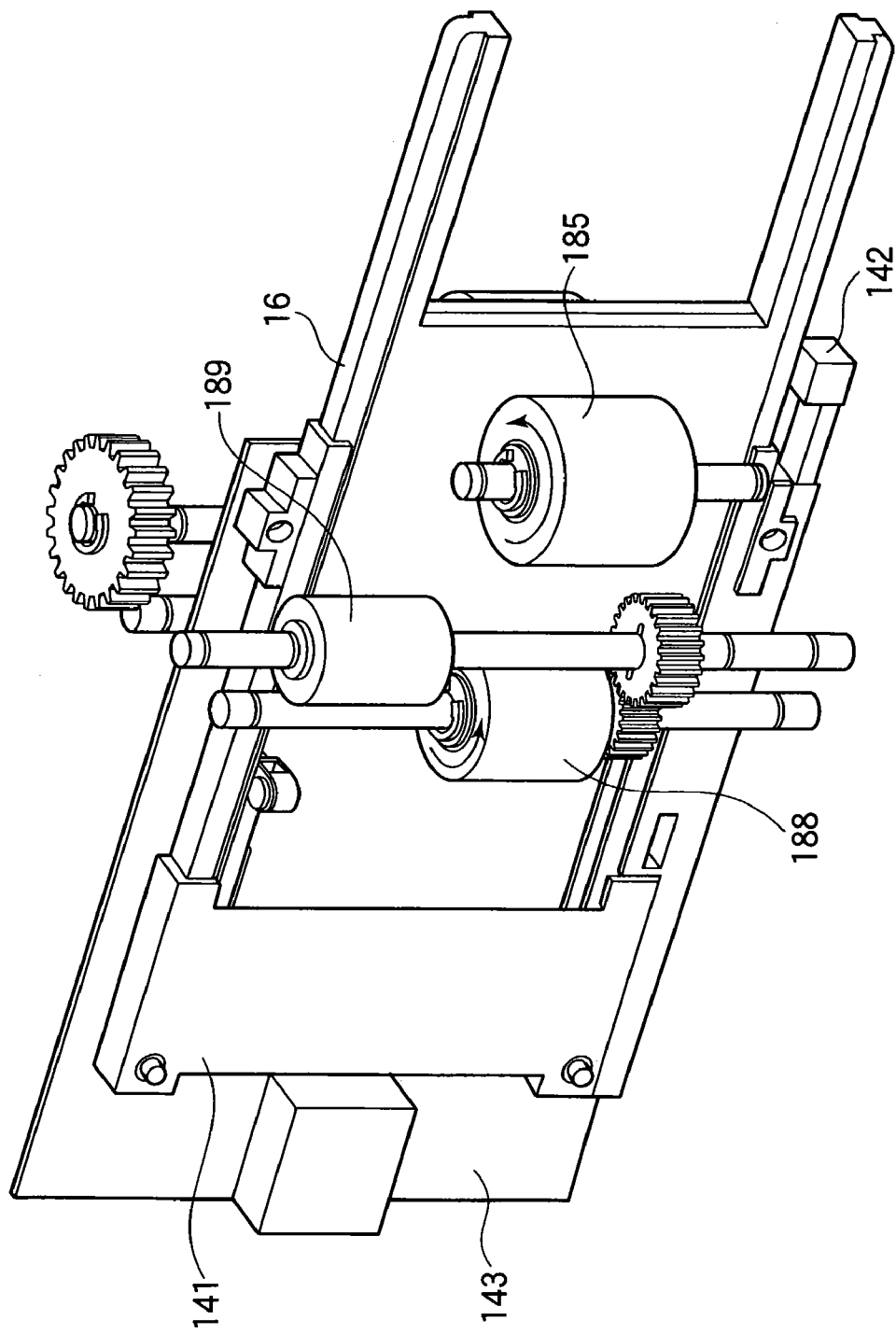
FIG. 34 is a perspective view showing a state in which the storage medium adapter is mounted at the socket.
Figure 35:
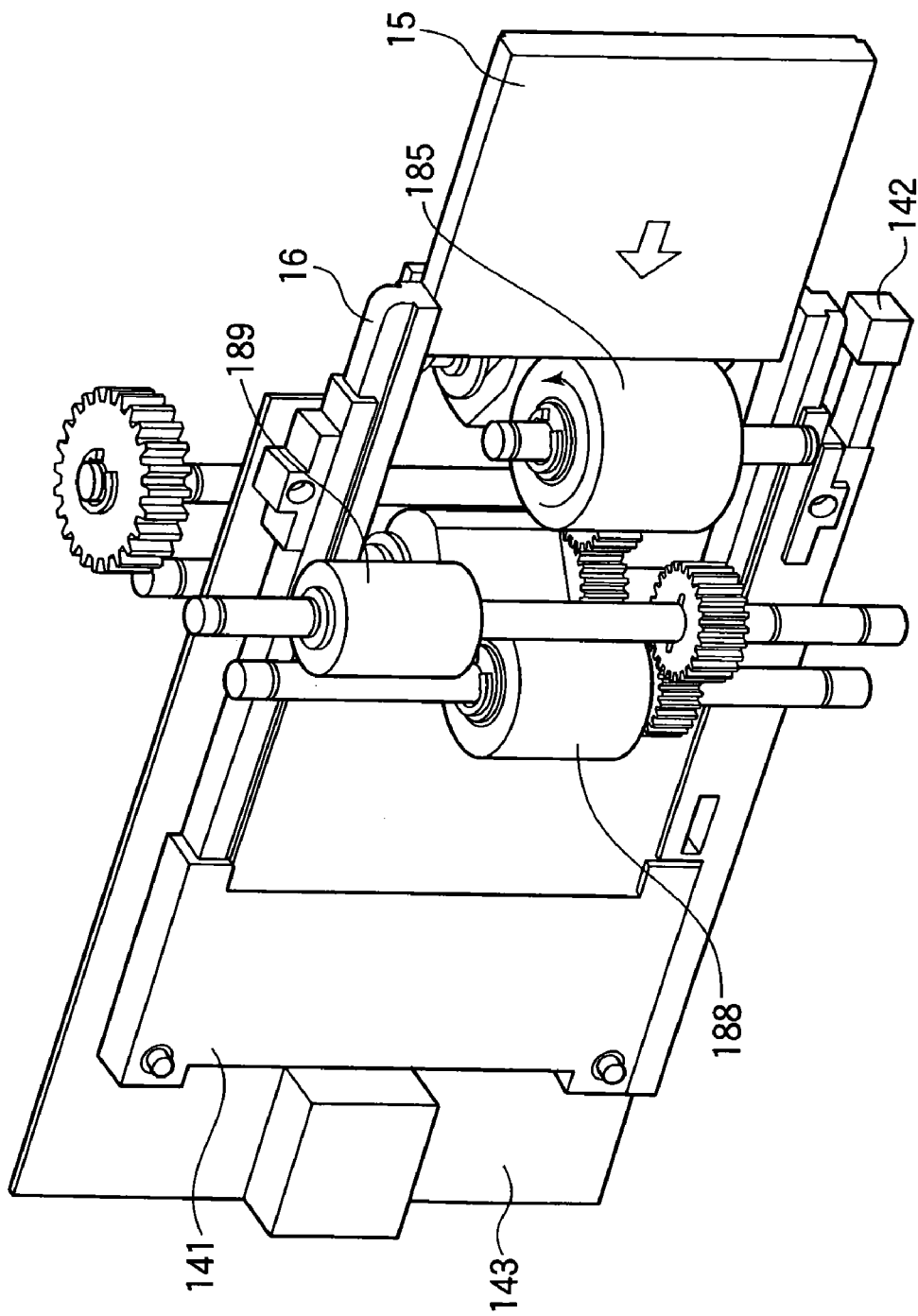
FIG. 35 is a perspective view showing a state in which the storage medium is mounted at the storage medium adapter.

Reference numeral 141 shown in FIG. 34 and FIG. 35 is a general purpose socket structured at which the storage medium adapter 16 or the PCMCIA card can be mounted. Reference numeral 142 is an eject lever in which the manipulator can manually eject the storage medium adapter 16 or the PCMCIA card from the socket 141, and the distal end portion of the eject lever 142 is structured so as to be positioned at the opening portion 12 of the information processing apparatus 11. Reference numeral 143 is an electric substrate disposed so as to be attached to the socket 141, and the electric substrate 143 is positioned at and fixed on the driving sheet metal 130 and the frame sheet metal 132 along with the socket 141. The electric wiring from the electric substrate 143 to the interior of the information processing apparatus 11 is omitted.

Reference numeral 176 shown in FIG. 19 and FIG. 20 to FIG. 33 serves as a shaft in which the gear 125 is attached to the top end portion thereof and which relays driving force, and is a first rotation center shaft which is the rotation center of the first rocking sheet metal 133. Further, a gear 173 is attached to the bottom end portion of the first rotation center shaft 176. The first rotation center shaft 176, the gear 125, and the gear 173 are integrally attached respectively to the driving sheet metal 130 and the frame sheet metal 132 via the bearing so as to be freely rotated.

Reference numeral 171 shown in FIG. 19 is a first transmission gear train transmitting the driving force of the first pressure cam shaft 176. The present structure is simplified due to all gears of gears 172 to 175 of the first transmission gear train 171 being made to be the same. The first rocking sheet metal 133 is attached to the first rocking rotation center shaft 176 via the bearing so as to be freely rotated, and the gear 174 is attached to the first rocking sheet metal 133 so as to be freely rotated. Even if the first rocking sheet metal 133 rotates, a space between the gear 173 and the gear 174 is maintained to be constant, and transmission of the driving force is carried out.

Reference numeral 177 shown in FIG. 3 is a first conveying roller shaft to which the gear 175 is attached, and the first conveying roller shaft 177 is attached to the first rocking sheet metal 133 via the bearing. Reference numeral 178 is a first conveying roller whose cross-sectional shape is a sector form and which is attached to the first conveying roller shaft 177. The first conveying roller 178 includes a one-way clutch (for example, a spring clutch) transmitting the only rotational driving force in a given direction of the gear 175. The gear 175 and the first conveying roller shaft 178 are integrally rotated freely. Here, the given direction is a counterclockwise direction when the auto ejecting mechanism is viewed from the upper side direction, and when the first rotation center shaft 176 rotates counterclockwise, the driving force is transmitted to the first conveying roller 178.

The first conveying roller 178 shown in FIG. 21 to FIG. 33 has a shape of a sector form in which a peripheral portion thereof is formed from an arc shaped portion (portion of the semi-major axis) and a portion including a straight line (portion of the semi-minor axis). It is possible for the storage medium 15 to be conveyed in the mounting/dismounting direction with respect to the auto ejecting mechanism due to the arc shaped elastic body portion of the first conveying roller 178 contacting the storage medium 15, and an optimum pressure is applied in the direction of the thickness of the storage medium 15 by rotation of the first rocking sheet metal 133 and the action of the first rocking torsion spring 135. Therefore, it is possible to correspond to plural types of storage medium 15 whose thickness are different.

Further, when the portion of the semi-minor axis of the first conveying roller 178 directs to the storage medium 15 side, the first conveying roller 178 is structured so as not to contact the storage medium 15 and the storage medium adapter 16 at the time of mounting/dismounting of the storage medium 15 and the storage medium adapter 16 with respect to the auto ejecting mechanism by rotation of the first rocking sheet metal 133 and the actions of rocking sheet metal regulating portions 137 and 138.

Reference numeral 179 shown in FIG. 19 is a second conveying roller shaft to which the gear 172 is attached. Reference numeral 180 is a sector form second conveying roller attached to the second conveying roller shaft 179. The second conveying roller 180 includes a one-way clutch transmitting the only rotational driving force in a given direction of the gear 172. The gear 172 and the second conveying roller shaft 180 are integrally rotated freely. Here, the given direction is a counterclockwise direction when the auto ejecting mechanism is viewed from the upper side, and when the first rotation center shaft 176 rotates clockwise, the driving force is transmitted to the second conveying roller 180.

The second conveying roller 180 shown in FIG. 21 to FIG. 33 has a shape of a sector form in which the peripheral portion thereof is formed from an arc shaped portion (portion of the semi-major axis) and a portion including a straight line (portion of the semi-minor axis). Due to the arc shaped elastic body portion of the second conveying roller 180 contacting the storage medium adapter 16, it is possible for the storage medium adapter 16 to be conveyed in the mounting/dismounting direction with respect to the auto ejecting mechanism. When the portion of the semi-minor axis of the first conveying roller 180 directs to the storage medium adapter 16 side, the second conveying roller 180 does not contact the storage medium adapter 16 at the time of mounting/dismounting of the storage medium adapter 16 with respect to the auto ejecting mechanism.

On the other hand, reference numeral 186 shown in FIG. 20 serves as a shaft in which a gear 126 is attached to the top end portion thereof and which relays driving force, and is a second rotation center shaft which is the rotation center of the second rocking sheet metal 134. Further, a gear 183 is attached to the bottom end portion of the second rotation center shaft 186. The second rotation center shaft 186 is, with the gear 126 and the gear 183 being integrated, attached to the driving sheet metal 130 and the frame sheet metal 132 via the bearing so as to be freely rotated. Reference numeral 181 is a second transmission gear train transmitting the driving force of the second pressure cam shaft 186. The present structure is simplified due to the numbers of the teeth of a gear 182 and the 183 of the second transmission gear train 181 being made to be the same. The second rocking sheet metal 134 is attached to the second rocking rotation center shaft 186 via the bearing so as to be freely rotated.

Reference numeral 184 shown in FIG. 20 is a first driven roller shaft provided so as to be freely rotated, and the first driven roller shaft 184 is attached to the second rocking sheet metal 134 via the bearing so as to be freely rotated. Reference numeral 185 is a cylindrical first driven roller which is attached to the first driven roller shaft 184 and which is provided at the position facing the first conveying roller 178 (refer to FIG. 19) so as to sandwich the storage medium 15.

The elastic body portion of the periphery of the first driven roller 185 contact the storage medium 15, and due to the first driven roller 185 rotating in accordance with the mounting/dismounting direction (moving direction) at the time of mounting/dismounting of the storage medium 15 and the storage medium adapter 16 with respect to the auto ejecting mechanism, it is possible for the storage medium 15 and the storage medium adapter 16 to be conveyed in the mounting/dismounting direction. Further, an optimum pressure is applied in the direction of the thickness of the storage medium 15 by rotation of the second rocking sheet metal 134 and the action of the second rocking torsion spring 136. Therefore, it is possible to correspond to plural types of storage medium 15 whose thickness are different.

Further, the first driven roller 185 is regulated so as not to rotate than necessary toward the first conveying roller 178 side by rotation of the first rocking sheet metal 134 and the actions of the rocking sheet metal regulating portions 139 and 140. Due to the storage medium 15 being held between the first conveying roller 178 and the first driven roller 185, the storage medium 15 and the storage medium adapter 16 can be conveyed in the mounting/dismounting direction.

Reference numeral 187 shown in FIG. 4 is a second driven roller shaft to which the gear 182 is attached. Reference numeral 188 is a cylindrical shaped second driven roller which is attached to the second driven roller shaft 187, and which is provided at the position facing the second conveying roller 178 (refer to FIG. 19) so as to provide the storage medium adapter 16 therebetween. The second driven roller 188 includes a one-way clutch transmitting the only rotational driving force in a given direction of the gear 182. The gear 182 and the second conveying roller shaft 188 are integrally rotated freely. Here, the given direction is a counterclockwise direction when the auto ejecting mechanism is viewed from the upper side, and when the second rotation center shaft 186 rotates clockwise, the driving force is transmitted to the second conveying roller 188.

Reference numeral 189 shown in FIG. 20 is a torque limiter which is provided at the second rotation center shaft 186 and which limits the transmission force when load is applied than necessary to the second driven roller 188.

Reference numeral 191 shown in FIG. 19 and FIG. 21 to FIG. 33 is a first micro switch serving as sensing means for sensing the presence/absence of the storage medium 15, and reference numeral 192 is a second micro switch serving as sensing means for sensing the presence/absence of the storage medium adapter 16 with respect. If both of the first micro switch 191 and the second micro switch 192 are turned off, it is sensed that anything is not mounted at the socket 141. In this case, the auto ejecting mechanism does not carry out the ejecting operations of both of the storage medium 15 and the storage medium adapter 16.

When the only storage medium adapter 16 is mounted as a unit at the information processing apparatus 11, when the storage medium adapter 16 is inserted from the opening portion 12 of the information processing apparatus 11, the first micro switch 191 is turned on. Thereafter, the storage medium adapter 16 further goes toward the inside of the information processing apparatus. At the position where the storage medium adapter 16 is mounted at the socket 141, because the first micro switch 191 is turned off and the second micro switch 192 is turned on at the opening accommodating portion 17 of the storage medium adapter 16 at which the storage medium 15 can be mounted (refer to FIG. 26), it is sensed that the storage medium adapter 16 is certainly mounted at the socket 141. In this case, the auto ejecting mechanism can carry out ejecting operation of the only storage medium adapter 16.

Further, when the only storage medium adapter 16 is ejected as a unit from the information processing apparatus 11, because turning-on and turning-off of the first micro switch 191 are carried out after the second micro switch 192 is turned off (refer to FIG. 27, FIG. 28), it is sensed that the storage medium adapter 16 is certainly ejected.

When the second micro switch 192 is in a state of being turned on, the presence/absence of the storage medium 15 is sensed due to the first micro switch 191 being turned on/off. Ejecting operation of the storage medium adapter 16 or the storage medium 15 is selectively carried out by the auto ejecting mechanism.

Even after turn-on and turn-off of the first micro switch 191 have been carried out, if the second micro switch 192 is turned off as is, the information processing apparatus 11 judges that the storage medium adapter 16 is not mounted, and the ejecting operation by the auto ejecting mechanism is not carried out.

When the first micro switch 191 is turned on, and the second micro switch 192 is turned on immediately after the first micro switch 191 is in this state as is, the information processing apparatus 11 judges that the storage medium adapter 16 at which the storage medium 15 is mounted or the PCMCIA card is inserted, and the ejecting operation by the auto ejecting mechanism is not carried out. However, by carrying out an access operation such as reading and writing of electronic data by the information processing apparatus 11, it can be judged whether a medium inserted in the information processing apparatus is the storage medium 15 or the PCMCIA card, and after the access processing of the electronic data, an ejecting operation of the storage medium 15, the storage medium adapter 16, or the PCMCIA card by the auto ejecting mechanism is selectively carried out.

When turn-on/turn-off of the second micro switch 192 is carried out in a state in which the first micro switch 191 is turned off, because there is no possibility of the PCMCIA card or the combination of the storage medium 15 and the storage medium adapter 16, the information processing apparatus 11 not only does not carry out the ejecting operation of the auto ejecting mechanism, but also does not carry out the access processing to electronic data.

Reference numeral 193 shown in FIG. 19 and FIG. 20 to FIG. 33 is a first sensor flag which is attached to the upper portion of the first conveying roller 178 and which is for sensing a rotation position of the first conveying roller 178. A notch in which the phase is adjusted to the central position of the semi-major axis portion of the first conveying roller 178 is provided at the first sensor flag 193. Reference numeral 194 is a first photo interrupter serving as means for sensing the rotation position of the first sensor flag 193, and is provided on the first rocking sheet metal 133.

In the same way, reference numeral 195 shown in FIG. 19 and FIG. 20 to FIG. 33 is a second sensor flag which is attached to the upper portion of the second conveying roller 180 and which is for sensing a rotation position of the second conveying roller 180. A notch in which a phase is adjusted to the central position of the semi-major axis portion of the second conveying roller 180 is provided at the second sensor flag 195. Reference numeral 196 is a second photo interrupter serving as means for sensing the rotation position of the second sensor flag 195, and is provided on the frame sheet metal 132.

It is defined that a case in which the central position of the arc portion of the first conveying roller 178 and the central position of the arc portion of the second conveying roller 180 are in a state (refer to FIG. 21) in which the arc portions are directed to the direction vertically going away from the storage medium 15 and the storage medium adapter 16 is standby position, and the standby position is 0°.

A radial dimension of the arc portion of the sector form body of the second conveying roller 180 is structured so as to be smaller than a radial dimension of the arc portion of the sector form body of the first conveying roller 178. This reason for this is that the force of pulling the storage medium adapter 16 out of the socket 141 is greater than the force of pulling the storage medium 15 out of the storage medium adapter 16, and it is arranged such that load applied to the driving motor 121 becomes the simultaneously same even if an ejection of the storage medium 15 or the storage medium adapter 16 (an ejection of pulling the storage medium 15 out of the storage medium adapter 16 and an ejection of pulling the storage medium adapter 16 out of the socket 141) is selected. Note that the same effect can be obtained if a gear reduction ratio is adjusted at the first transmission gear train 171.

Here, operations in which the storage medium 15 and the storage medium adapter 16 are ejected by the auto ejecting mechanism will be successively described. Note that operations of the respective members structuring the auto ejecting mechanism are clear from the descriptions described above.

First, the manipulator selects to automatically eject one of the storage medium 15 and the storage medium adapter 16 via the manipulation unit of the information processing apparatus 11, or the like, in a state in which the storage medium adapter 16 in which the storage medium 15 is mounted at and accommodated in the opening accommodating portion 17 is mounted at the information processing apparatus 11.

Figure 21:
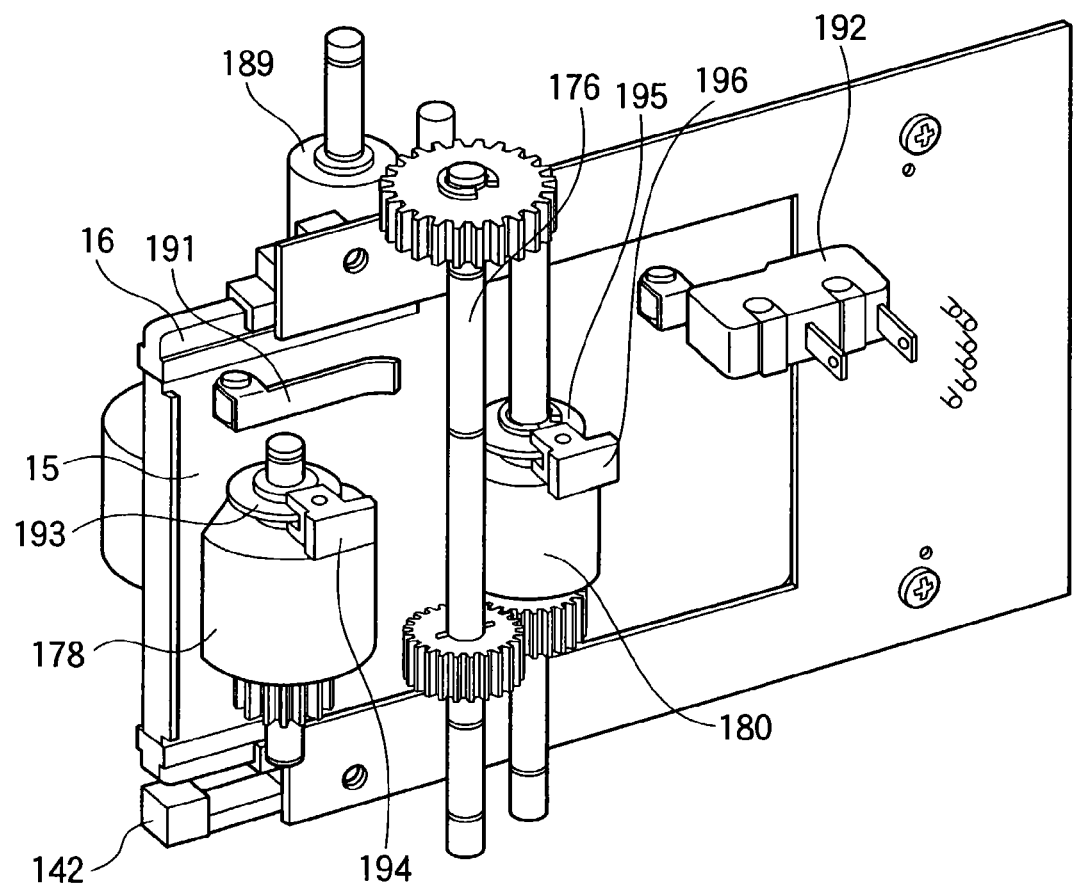
FIG. 21 is a perspective view showing a state in which an ejection of the storage medium from the storage medium adapter is on standby.

FIG. 21 to FIG. 25 are the perspective views showing a state in which the storage medium 15 is ejected from the storage medium adapter 16. FIG. 21 shows a state in which the storage medium adapter 16 in which the storage medium 15 is accommodated is mounted at the socket 141 (refer to FIG. 20), and the storage medium adapter 16 can be ejected if the manipulator manipulates the eject lever 142. The first conveying roller 178 and the second conveying roller 180 at this time are in the state of being at 0° which is the standby positions when the auto ejecting mechanism is viewed from the upper direction.

Figure 22:
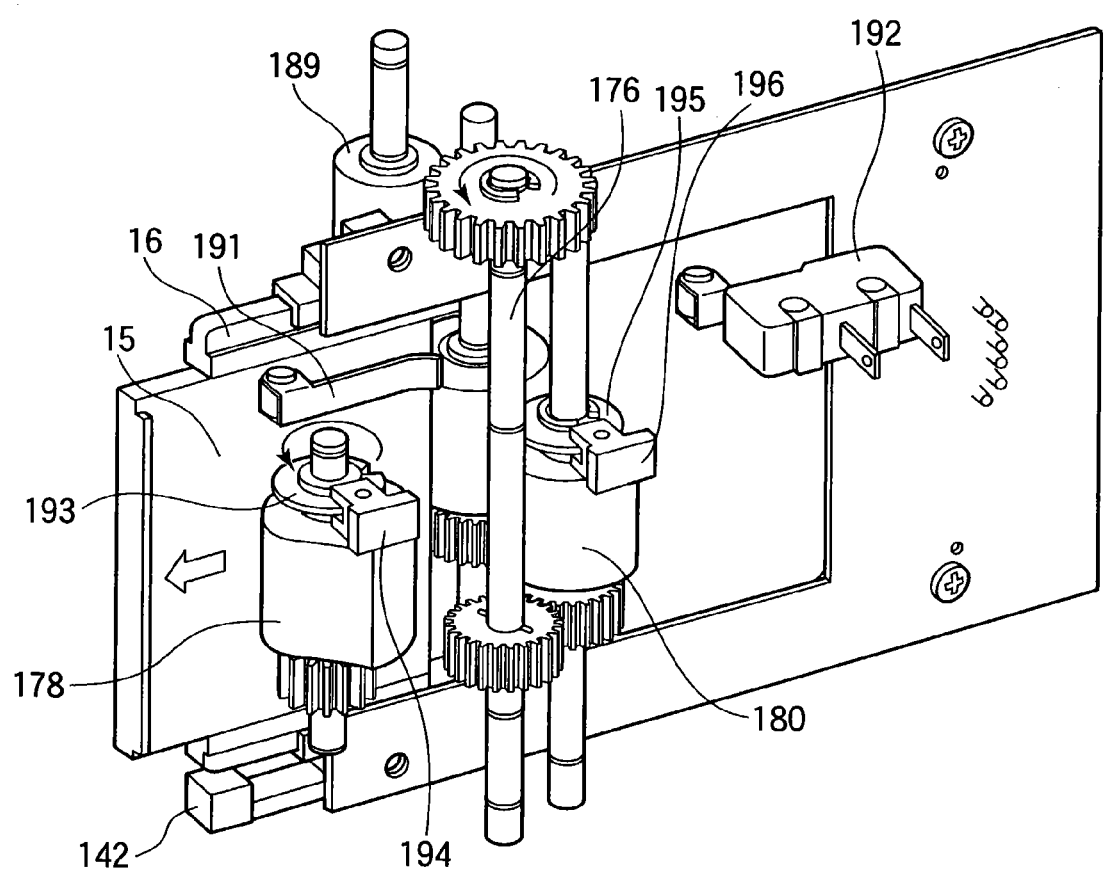
FIG. 22 is a perspective view showing a state in which the ejection of the storage medium from the storage medium adapter is started.

FIG. 22 shows a state in which an ejection of the storage medium 15 from the storage medium adapter 16 started. The first rotation center shaft 176 rotates 90° counterclockwise by the forward rotation of the driving motor 21 (refer to FIG. 19), and in accordance therewith, the first conveying roller 178 rotates 90° counterclockwise via the first transmission gear train 171 (refer to FIG. 19), and the arc portion of the sector form body of the first conveying roller 178 contacts the storage medium 15. At this time, a clockwise force is applied to the second conveying roller 180. However, the second conveying roller 180 does not rotate due to the built-in one-way clutch. The first driven roller 185 (refer to FIG. 20) rotates clockwise by rotating so as to follow in the ejecting direction of the storage medium 15.

Because the counterclockwise force is applied to the second driven roller 188 (refer to FIG. 20), the second driven roller 188 attempts to rotate by being energized in the inverse direction with respect to the ejecting direction of the storage medium 15. However, an energizing force which is greater than or equal to a given value is not applied by the torque limiter 189. Therefore, the storage medium adapter 16 is in a state of being pressed down by the socket 141, and pulling of the storage medium 15 from the storage medium adapter 16 is certainly started.

Figure 23:
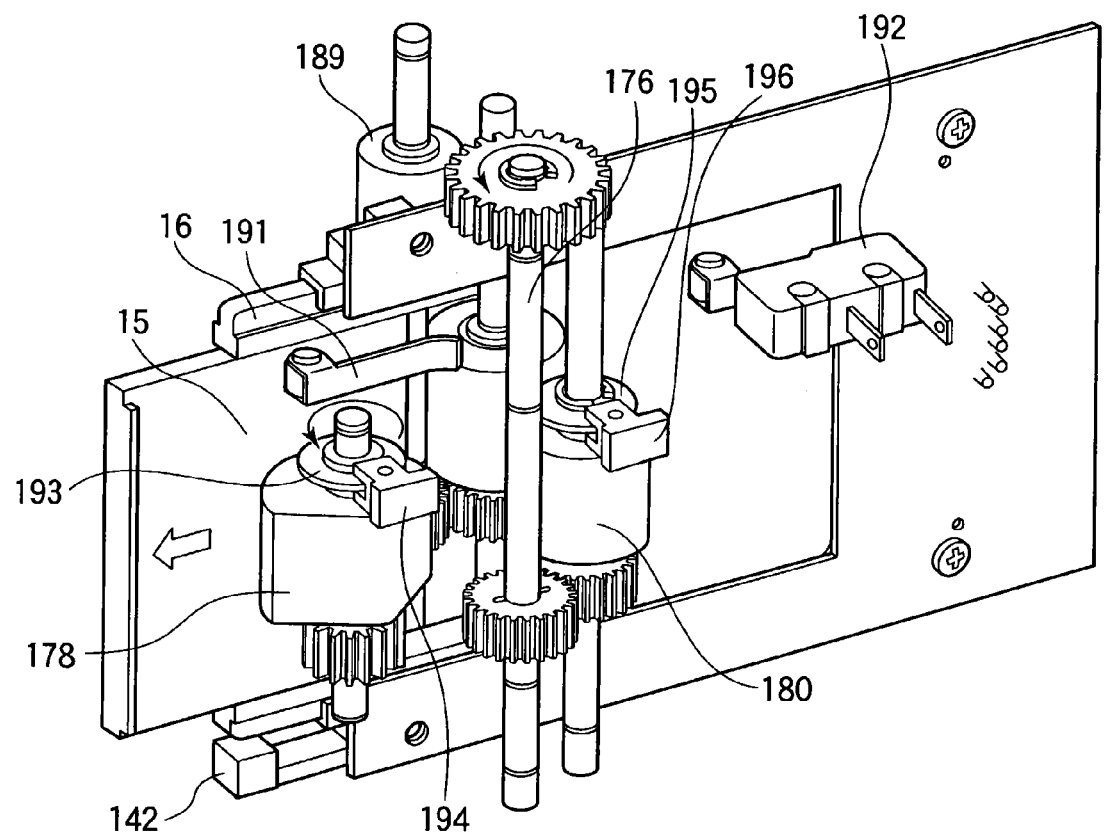
FIG. 23 is a perspective view showing a state in the middle of the ejection of the storage medium from the storage medium adapter.
Figure 24:
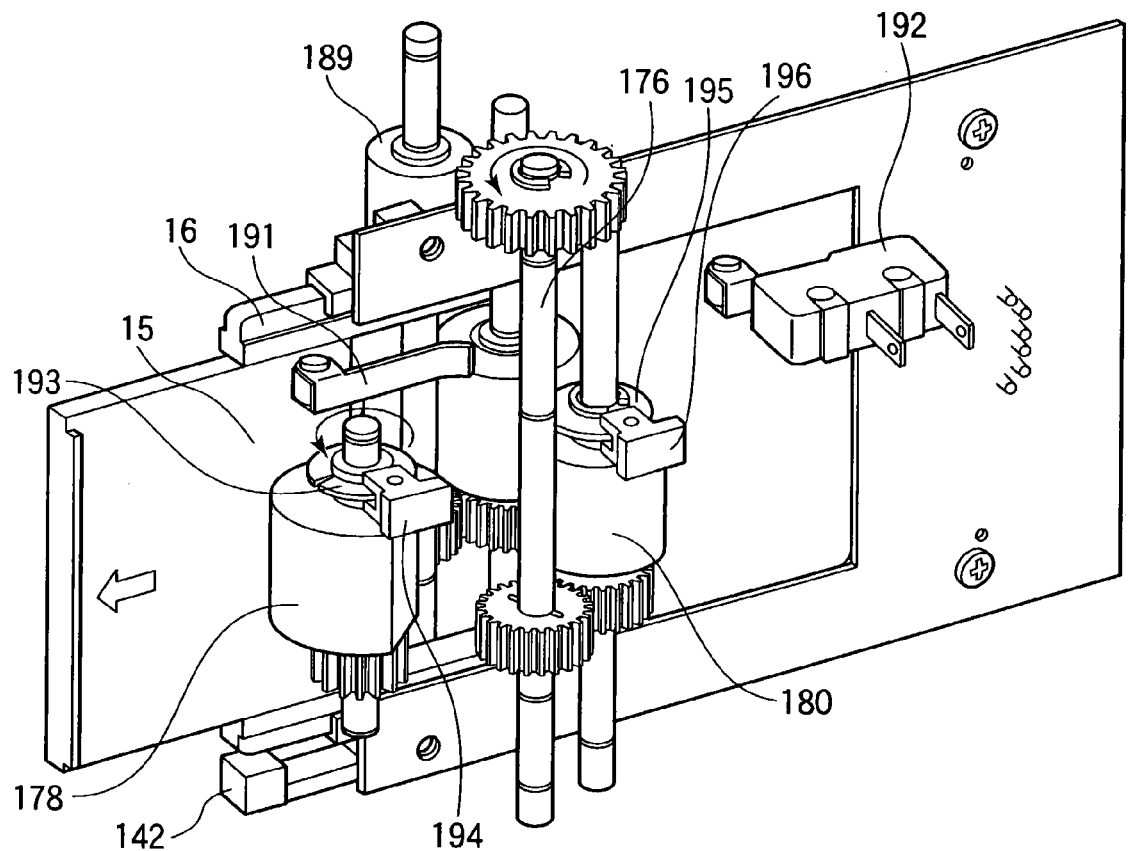
FIG. 24 is a perspective view showing a state in which the ejection of the storage medium from the storage medium adapter is further progressed.

FIG. 23 and FIG. 24 show a state in which the storage medium 15 is ejected from the storage medium adapter 16. The first conveying roller 178 rotates 180° counterclockwise (FIG. 23) from the state of FIG. 21, and next; the first conveying roller 178 rotates 270° counterclockwise (FIG. 24). Therefore, the storage medium 15 is ejected.

Figure 25:
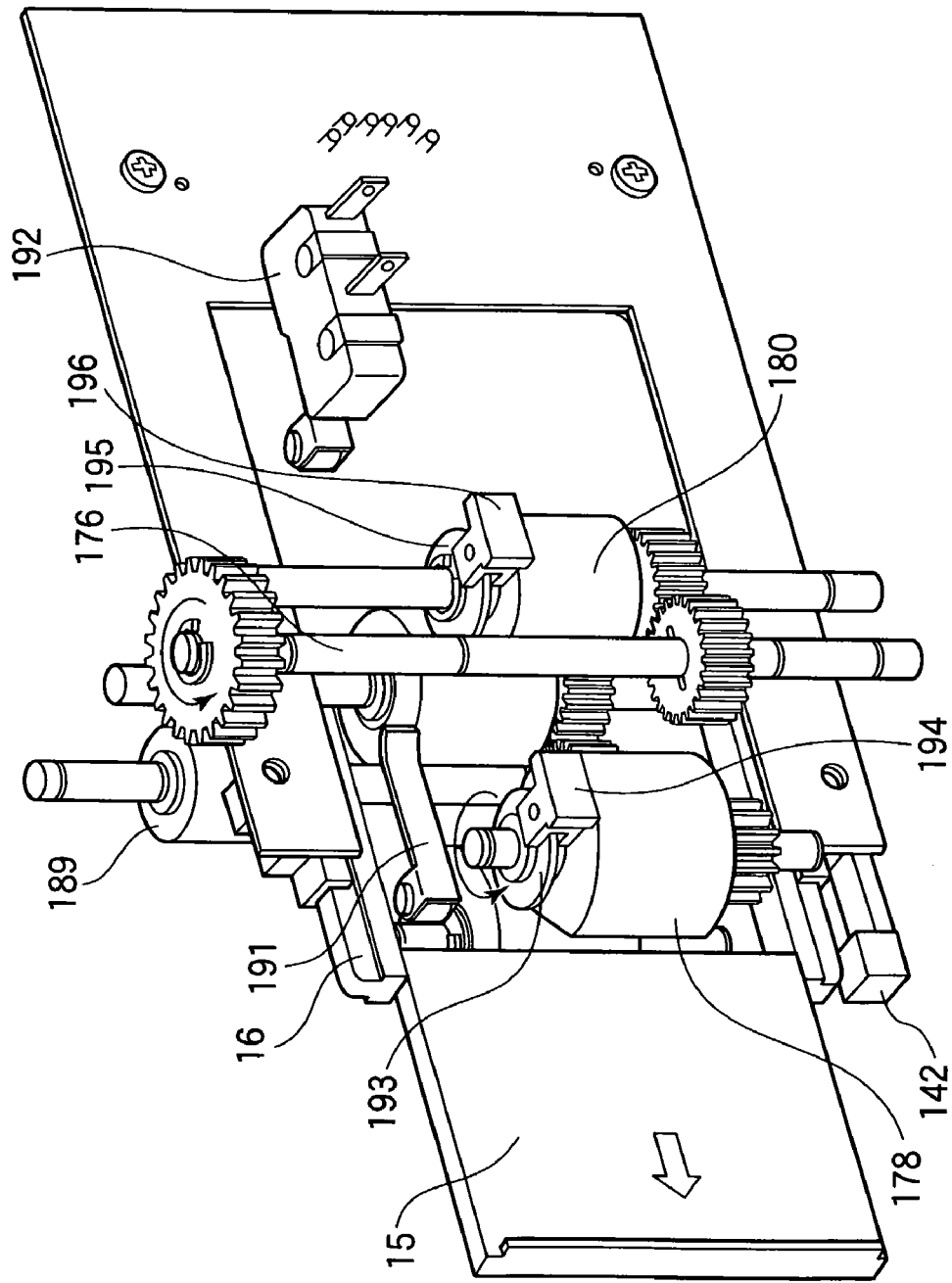
FIG. 25 is a perspective view showing a state in which the ejection of the storage medium from the storage medium adapter is completed.

FIG. 25 shows a state in which it is completed that the storage 15 is ejected from the storage medium adapter 16. The first conveying roller 178 rotates 360° counterclockwise from the state of FIG. 21, and returns to 0° which is the original standby position. The arc portion of the sector form body of the first conveying roller 178 is already separated from the storage medium 15, and the first micro switch 191 is turned off, and it can be sensed that the storage medium 15 has been ejected. In the state at this time, it is possible for the operation of mounting the storage medium 15 at the storage medium adapter 16 to be carried out again, and for the storage medium adapter 16 to be ejected from the socket 141 by the manipulation of the eject lever 142.

Figure 26:
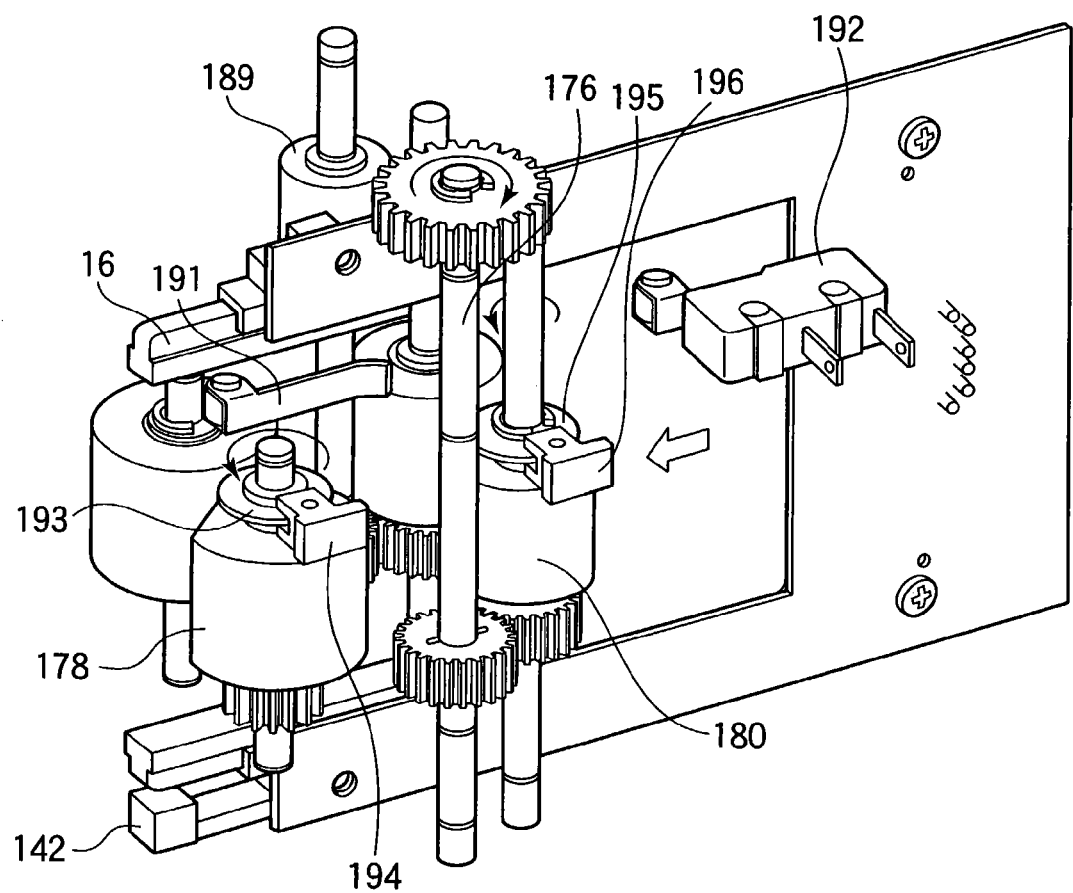
FIG. 26 is a perspective view showing a state in which an ejection of the storage medium adapter from a socket is on standby.

FIG. 26 to FIG. 30 are the perspective views showing a state in which the storage medium adapter 16 is ejected from the socket 141 of the auto ejecting mechanism. In FIG. 26, the only storage medium adapter 16 is mounted at the socket 141 successively following FIG. 25. The first conveying roller 178 and the second conveying roller 180 at this time are in the states of being at 0° which is the standby positions when the auto ejecting mechanism is viewed from the upper direction.

Figure 27:
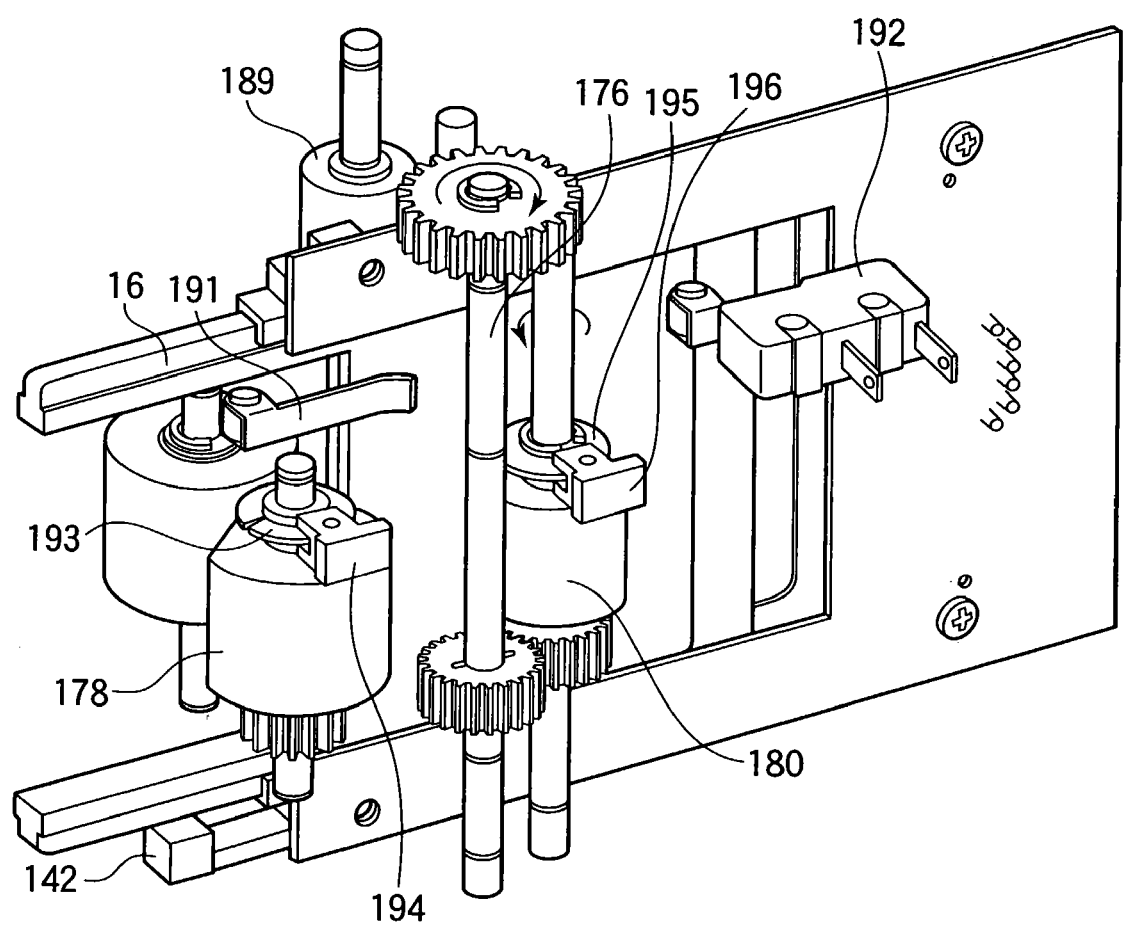
FIG. 27 is a perspective view showing a state in which the ejection of the storage medium adapter from the socket is started.

FIG. 27 shows a state in which an ejection of the storage medium adapter 16 from the socket 141 has been started. The first rotation center shaft 176 rotates 180° clockwise by the backward rotation of the driving motor 121 (refer to FIG. 19). In accordance therewith, the second conveying roller 180 rotates 180° counterclockwise via the first transmission gear train 171 (refer to FIG. 19), and the arc portion of the sector form body of the first conveying roller 178 contacts the storage medium 15. At this time, the clockwise force is applied to the first conveying roller 178. However, the first conveying roller 178 does not rotate due to the built-in one-way clutch.

Because the second driven roller shaft 187 (refer to FIG. 20) rotates clockwise in accordance with the ejecting operation of the storage medium adapter 16, the second driven roller 188 attached to the second driven roller shaft 187 rotates clockwise due to driving force being not transmitted by the action of the one-way clutch and by rotating so as to follow in the ejecting direction of the storage medium adapter 16. Consequently, pulling of the storage medium adapter 16 from the socket 141 is started.

Figure 28:
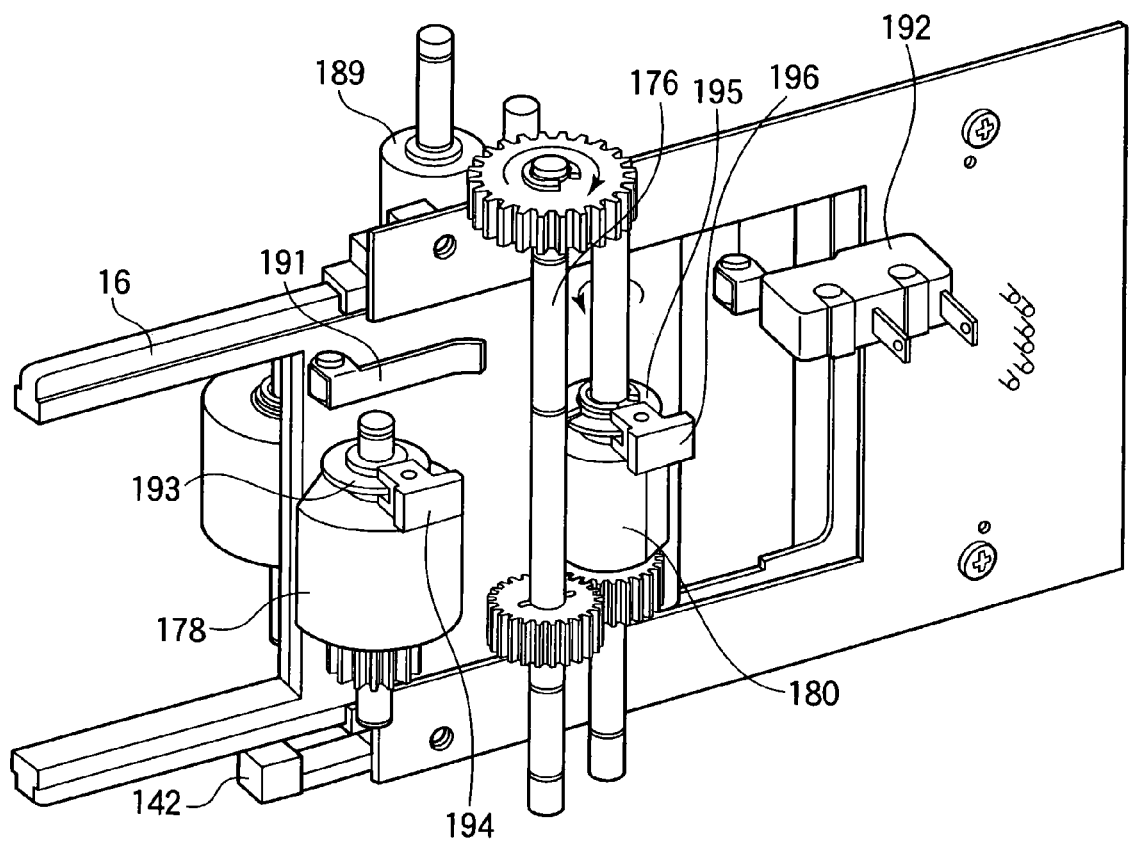
FIG. 28 is a perspective view showing a state in the middle of the ejection of the storage medium adapter from the socket.

FIG. 28 shows a state in which the storage medium adapter 16 has been conveyed from the state of FIG. 27 to the position facing the first conveying roller 178. Due to the second conveying roller 180 rotating 270° counterclockwise, the arc portions of the sector form body of the second conveying roller 180 is separated from the storage medium adapter 16. In accordance therewith, the second micro switch 192 is turned off, and on the other hand, the first micro switch 191 is turned on, and it can be sensed that the storage medium adapter 16 has been conveyed to the position facing the first conveying roller 178. Here, when a radial dimension of the ark portion of the sector form body of the second conveying roller 180 is set to be small, it may be structured such that the second conveying roller 180 is certainly conveyed to the position facing the first conveying roller 178, for example, by rotating the second conveying roller 180 twice.

Figure 29:
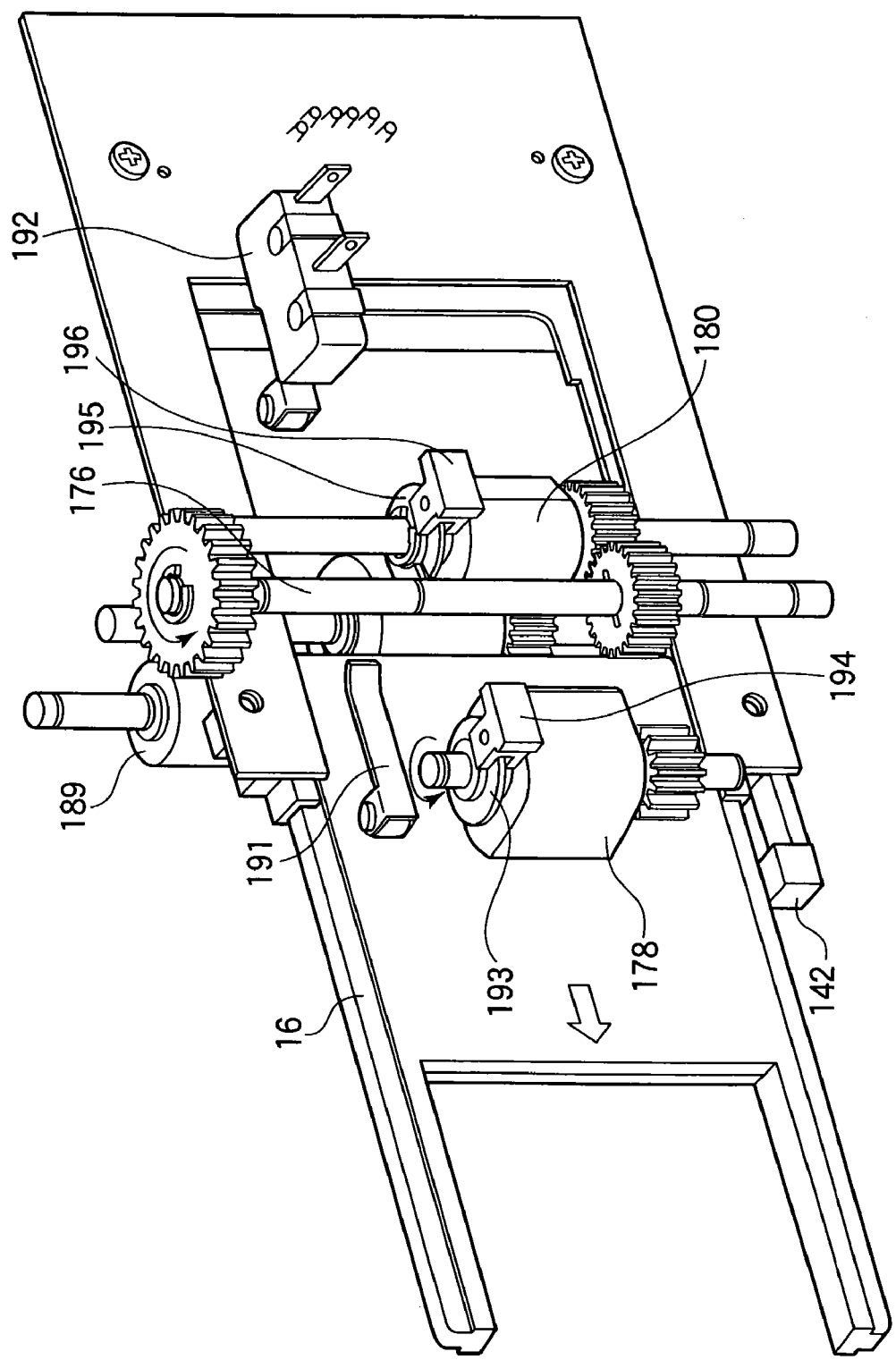
FIG. 29 is a perspective view showing a state in which the ejection of the storage medium adapter from the socket is further progressed.

FIG. 29 shows a state in which the storage medium adapter 16 is ejected by the first conveying roller 178. In the same way as in the case shown in FIG. 22, due to the first rotation center shaft 176 rotating counterclockwise by the forward rotation of the driving motor 121, and due to the first conveying roller 178 rotating counterclockwise as well via the first transmission gear train 171 (refer to FIG. 19), the storage medium adapter 16 conveyed to the position facing the first conveying roller 178 is further conveyed in the ejecting direction with the ark portion of the sector form body of the first conveying roller 178 contacting the storage medium adapter 16. The first driven roller 185 (refer to FIG. 20) rotates clockwise by rotating so as to follow in the ejecting direction of the storage medium adapter.

Figure 30:
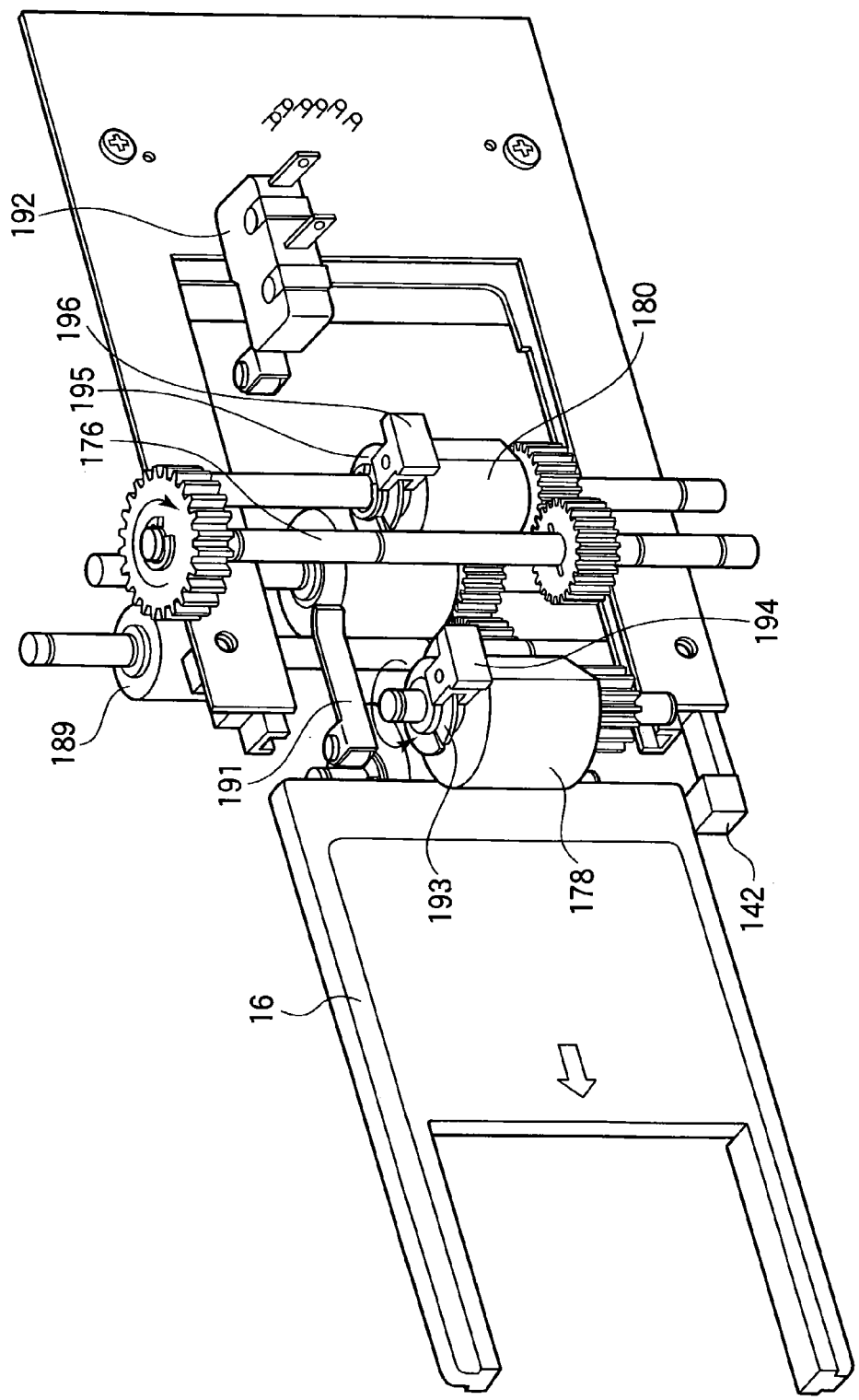
FIG. 30 is a perspective view showing a state in which the ejection of the storage medium adapter from the socket is completed.

FIG. 30 shows a state in which it is completed that the storage medium adapter 16 is ejected. The ark portion of the sector form body of the first conveying roller 178 is separated from the storage medium adapter 16. In accordance therewith, the first micro switch 191 is turned off, and it can be sensed that the storage medium adapter 16 has been ejected.

Here, the state in which the only storage medium adapter 16 is mounted at the socket 141 of the auto ejecting mechanism has been described. However, it can be understood that the ejecting operation can be realized even in a state in which the storage medium adapter 16 in which the storage medium 15 is accommodated is mounted at the socket 141.

Figure 31:
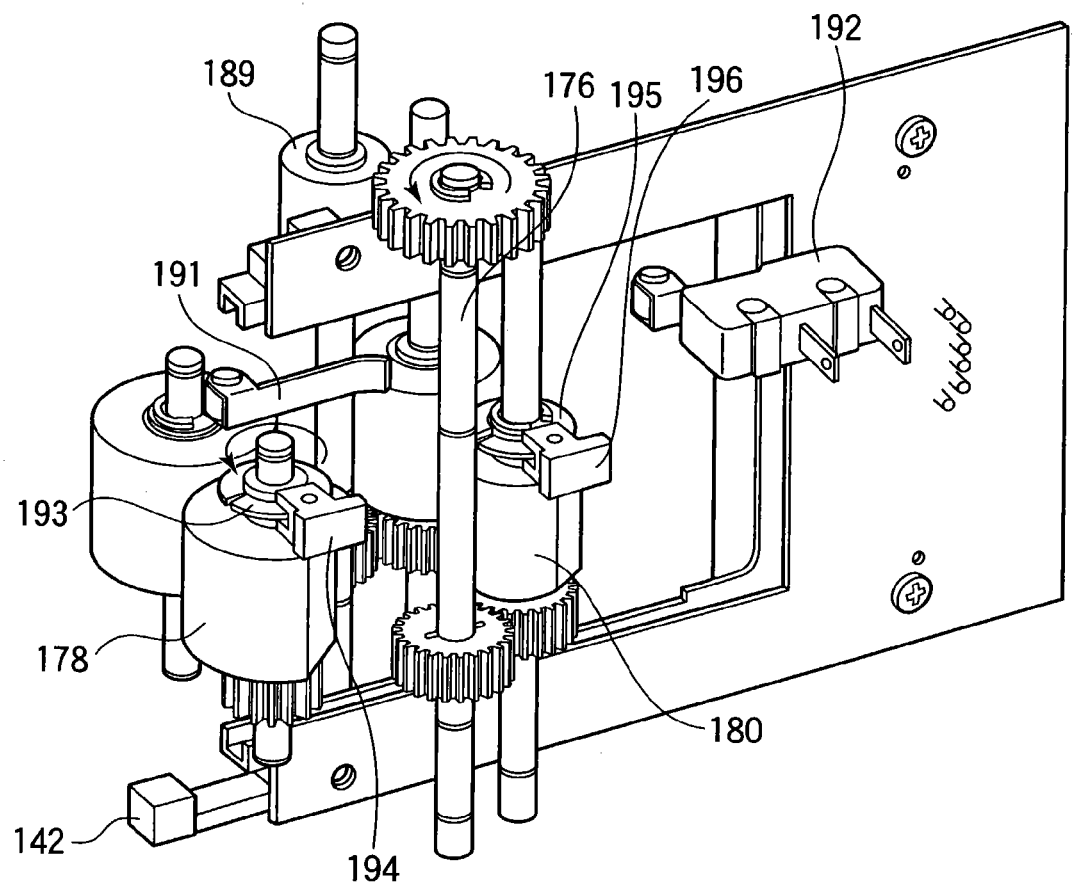
FIG. 31 is a perspective view showing a state in which a first conveying roller is returned to a standby position.
Figure 32:
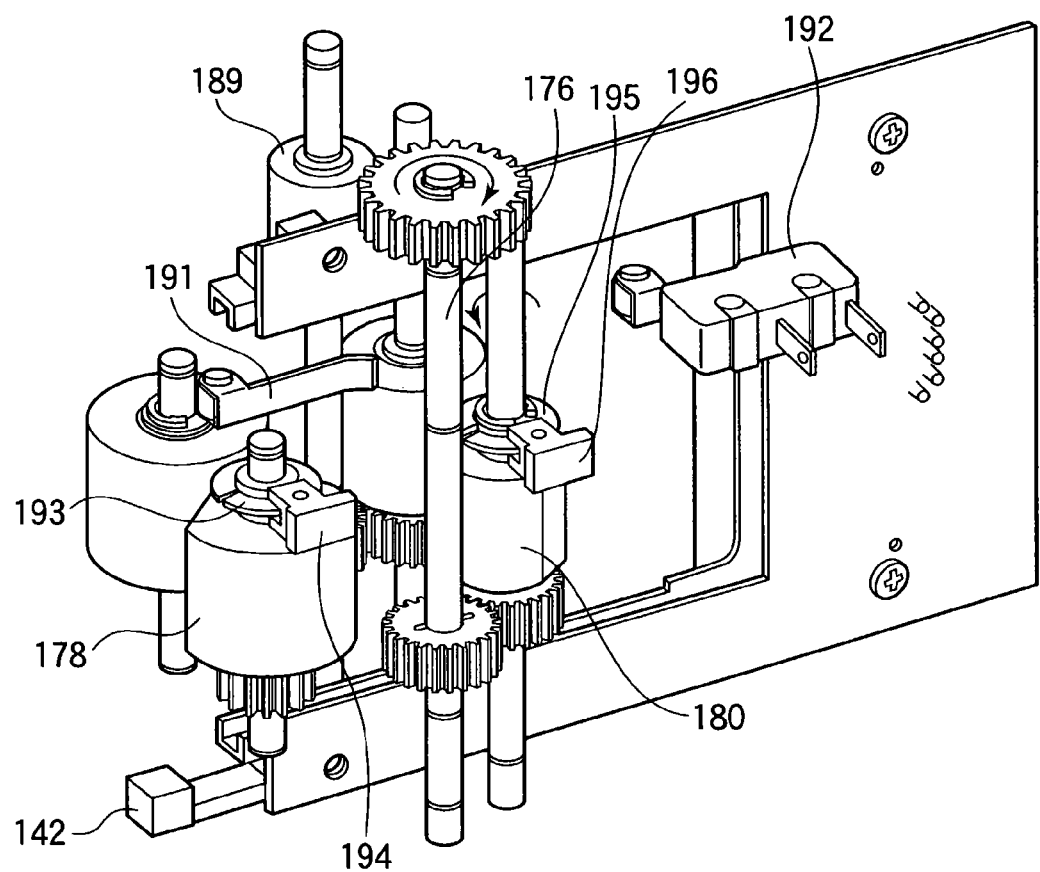
FIG. 32 is a perspective view showing a state in which a second conveying roller is returned to a standby position.
Figure 33:
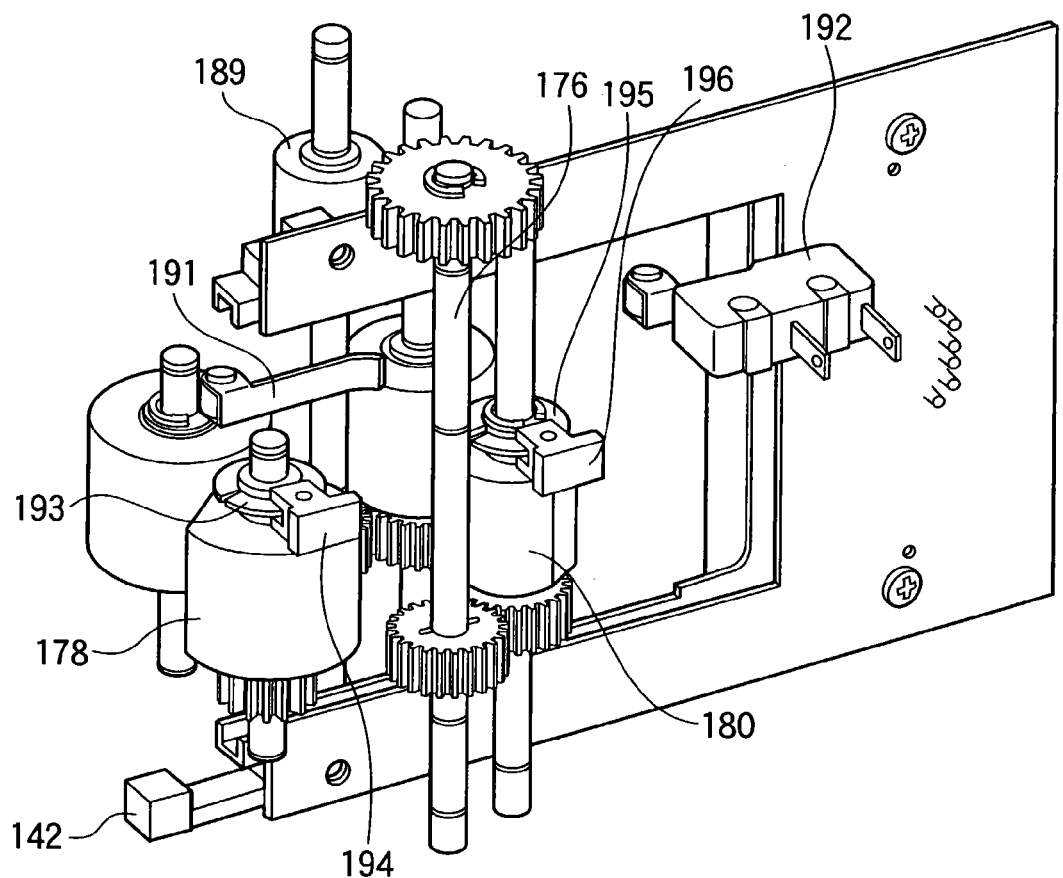
FIG. 33 is a perspective view showing a state in which the first conveying roller and the second conveying roller returned to the standby positions.

FIG. 31 to FIG. 33 are the perspective views showing a state in which the first conveying roller 178 and the second conveying roller 180 are returned to the standby states. In FIG. 31, due to 0° which is the standby position of the first conveying roller 178 being sensed by the first sensor flag 193 and the first photo interrupter 194 by making the first conveying roller 178 rotate counterclockwise, rotation of the first conveying roller 178 is stopped. In FIG. 32, due to 0° which is the standby position of the second conveying roller 180 being sensed by the second sensor flag 195 and the second photo interrupter 196 by making the second conveying roller 180 rotate counterclockwise, rotation of the second conveying roller 180 is stopped. In accordance therewith, the first conveying roller 178 and the second conveying roller 180 are in the standby states shown in FIG. 33 (the state in which the ark portions of the sector form bodies of the both rollers 178 and 180 direct to the side opposite to the conveying paths), and again, it is possible for the storage medium 15 and the storage medium adapter 16 to be mounted at the socket 141.

Note that, because the first conveying roller 178 and the second conveying roller 180 rotate so as to follow to some extent even in a case of the rotating direction in which driving force is not transmitted by the action of the one-way clutch, there are cases in which 0° which is the standby position is offset. In this case, in order for the first conveying roller 178 and the second conveying roller 180 not to rotate so as to follow at the time of fictitious rotation, it may be structured such that brake members are provided at the first conveying roller shaft 177 and the second conveying roller shaft 179 so as to have a little rotating load.

FIG. 34 shows a state in which the storage medium adapter 16 is mounted at the socket 141. The first driven roller 185 rotates counterclockwise by rotating so as to follow in the inserting direction of the storage medium adapter 16, and because the portions of the semi-minor axes (portions including the straight lines of the sector form bodies) of the first conveying roller 178 and the second conveying roller 180 (refer to FIG. 33) direct to the storage medium adapter 16 side, the first conveying roller 178 and the second conveying roller 180 do not contact the storage medium adapter 16. The second driven roller 188 rotates counterclockwise as well by rotating so as to follow in the inserting direction of the storage medium adapter 16 by the action of the one-way clutch.

FIG. 35 shows a state in which the storage medium 15 is mounted at the storage medium adapter 16. The first driven roller 185 rotates counterclockwise by rotating so as to follow in the inserting direction of the storage medium 15, and because the portion of the semi-minor axis of the first conveying roller 178 directs to the storage medium 15 side, the first conveying roller 178 does not contact the storage medium 15. It can be understood from FIG. 34 and FIG. 35 that the inserting operation can be realized even when the storage medium 15 in a state of being mounted at and accommodated in the storage medium adapter 16 is mounted at the socket 141.

Simple summaries of the operations of the auto ejecting mechanism described above will be shown in FIG. 36A to FIG. 36C, and FIG. 40A to FIG. 40C.

Figure 36A:
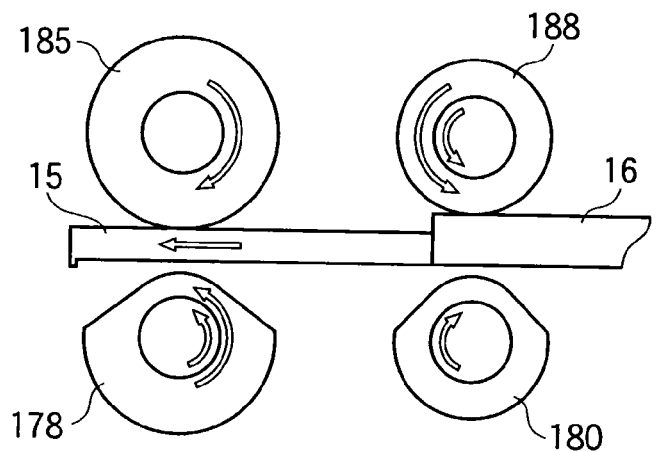
FIGS. 36A, 36B, and 36C are schematic diagrams showing states in which the only storage medium is ejected from the socket.
Figure 36B:
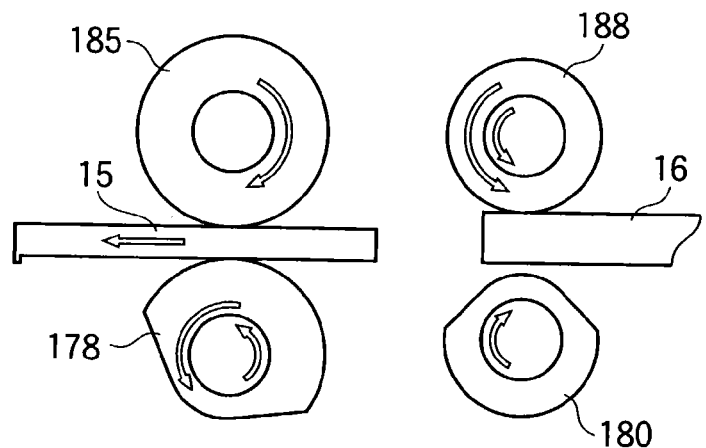
Figure 36C:
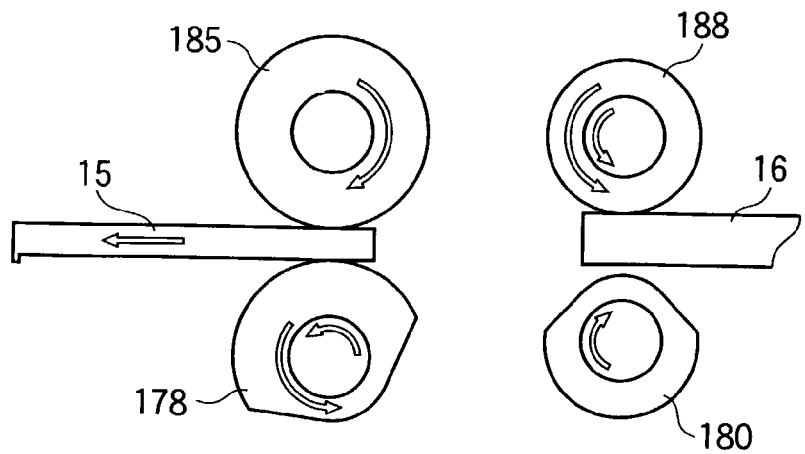

FIG. 36A to FIG. 36C are schematic diagrams showing a state in which the only storage medium 15 is ejected from the storage medium adapter 16 mounted at the socket 141, and show that the storage medium 15 moves from the state of FIG. 36A via the state of FIG. 36B to the state of FIG. 36C.

The first conveying roller 178 rotates counterclockwise by the forward rotation of the driving motor 121 (refer to FIG. 19), and the second conveying roller 180 does not rotate due to the one-way clutch. The first driven roller 185 rotates clockwise by rotating so as to follow the movement of the storage medium 15, and the second driven roller 188 attempts to rotate to the direction opposite to the ejecting direction of the storage medium adapter 16. However, the second driven roller 188 is stopped by a given energizing force by the torque limiter 189.

Figure 37A:
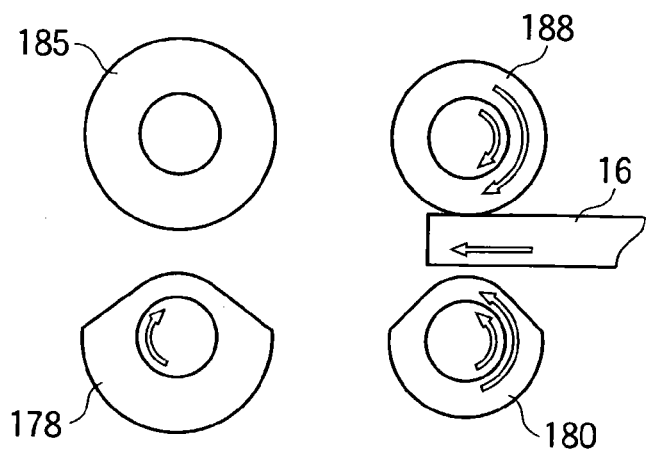
FIGS. 37A, 37B, and 37C are schematic diagrams showing states in which the only storage medium adapter is ejected from the socket.
Figure 37B:
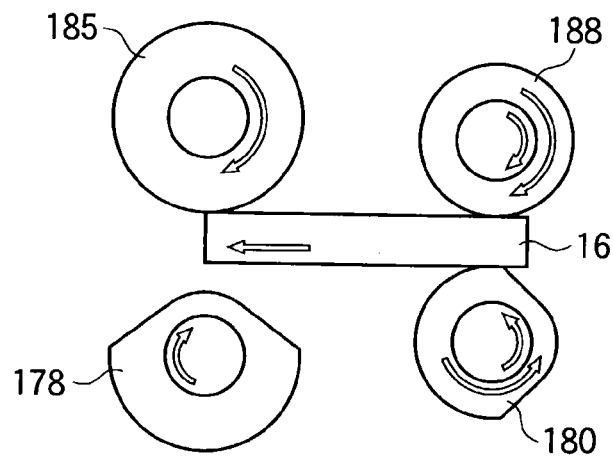
Figure 37C:
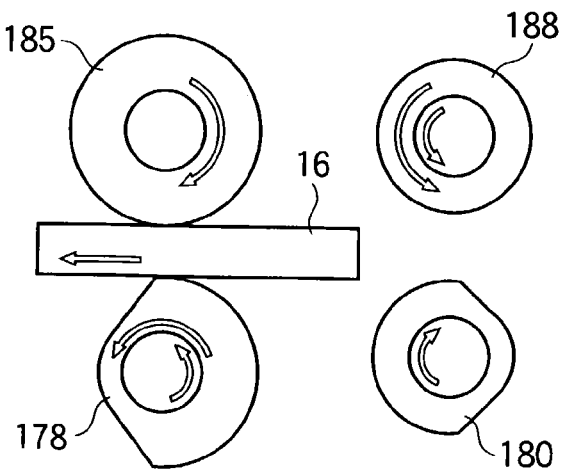

FIG. 37A to FIG. 37C are schematic diagrams showing a state in which the only storage medium adapter 16 is ejected from the socket 141, and show that the storage medium adapter 16 moves from the state of FIG. 37A via the state of FIG. 37B to the state of FIG. 37C.

The second conveying roller 180 rotates counterclockwise by the backward rotation of the driving motor 121, and the first conveying roller 178 does not rotate due to the one-way clutch. The second driven roller 188 rotates clockwise by rotating so as to follow the movement of the storage medium adapter 16 by the one-way clutch, and the storage medium adapter 16 is conveyed from the state of FIG. 37A to a position between the first conveying roller 178 and the first driven roller 185 as shown in FIG. 37B. Further, as shown in FIG. 37C, the storage medium adapter 16 is further conveyed with being held between the first conveying roller 178 and the first driven roller 185. In this case, the first conveying roller 178 rotates counterclockwise by the forward rotation of the driving motor 121, and the first driven roller 185 rotates clockwise by rotating so as to follow the movement of the storage medium adapter 16.

Figure 38A:
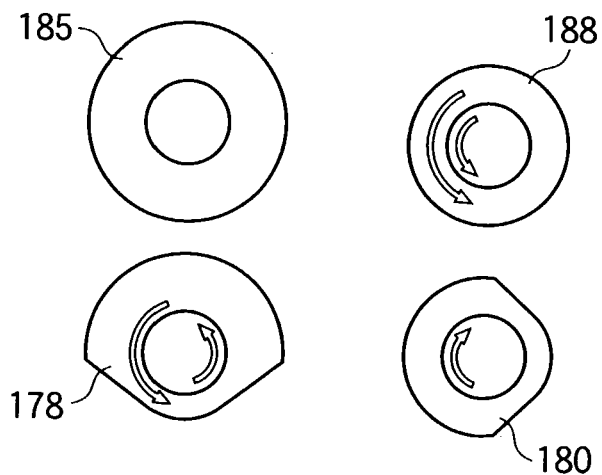
FIGS. 38A, 38B, and 38C are schematic diagrams showing states in which the first conveying roller and the second conveying roller are made to be in the standby states.
Figure 38B:
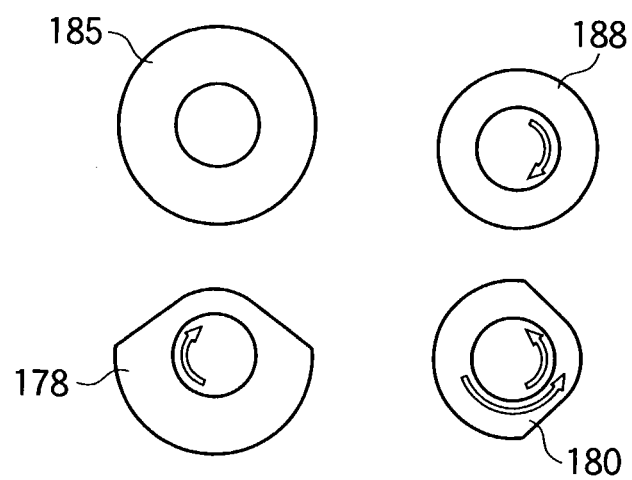
Figure 38C:
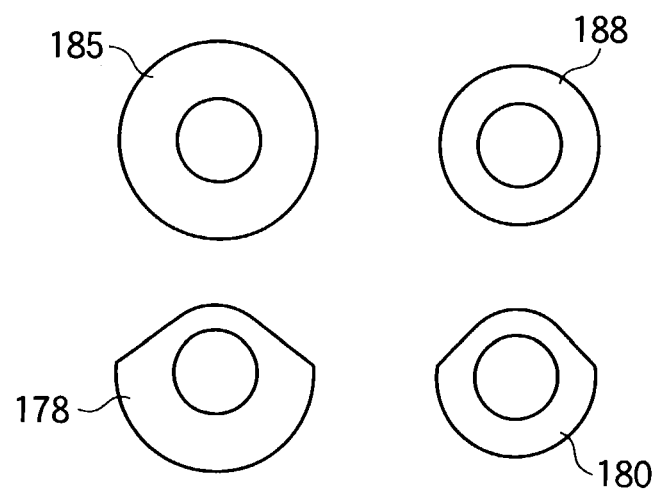

FIG. 38A to FIG. 38C are schematic diagrams showing a state in which the first conveying roller 178 and the second conveying roller 180 are made be in the standby states.

The first conveying roller 178 rotates counterclockwise from the state of FIG. 38A to the state of FIG. 38B, and is stopped at 0° which is the standby position. Further, the second conveying roller 180 rotates counterclockwise from the state of FIG. 38B to the state of FIG. 38C, and is stopped at 0° which is the standby position. In accordance therewith, again, the storage medium 15 and the storage medium adapter 16 can be mounted at the socket 141.

Figure 39A:
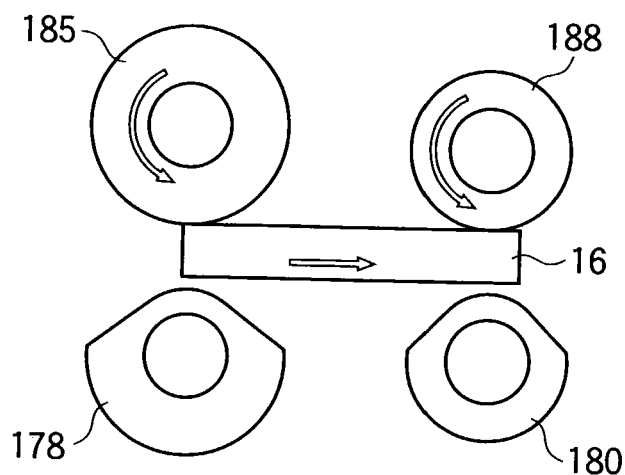
FIGS. 39A, 39B, and 39C are schematic diagrams showing states in which the storage medium adapter and the storage medium are respectively mounted at the socket.
Figure 39B:
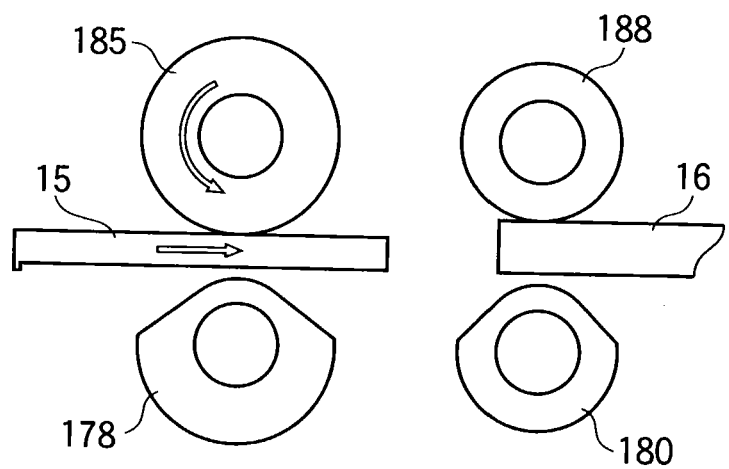
Figure 39C:
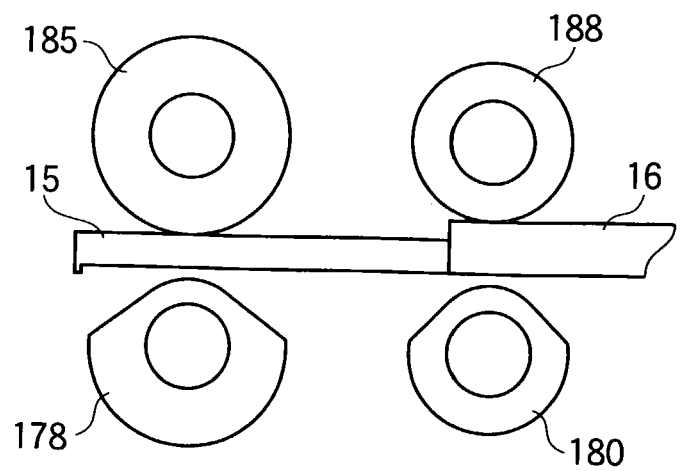

FIG. 39A to FIG. 39C are schematic diagrams showing a state in which the storage medium adapter 16 and the storage medium 15 are respectively mounted at the socket 141.

As shown in FIG. 39A, when the only storage medium adapter 16 exists between the first conveying roller 178 and the second driven roller 188, the first driven roller 185 rotates counterclockwise, and the first conveying roller 178 and the second conveying roller 180 do not contact the storage medium adapter 16. The second driven roller 188 rotates counterclockwise by rotating so as to follow the movement of the storage medium adapter 16 by the action of the one-way clutch. Further, as shown in FIG. 39B, when the storage medium 15 exists between the first conveying roller 178 and the first driven roller 185, the first driven roller 185 rotates counterclockwise by rotating so as to follow the movement of the storage medium 15, and the first conveying roller 178 does not contact the storage medium 15, and the storage medium 15 moves to the state of FIG. 39C. Further, it is in the same way as in the storage medium adapter 16 in which the storage medium 15 is mounted thereat and is accommodated therein.

Figure 40A:
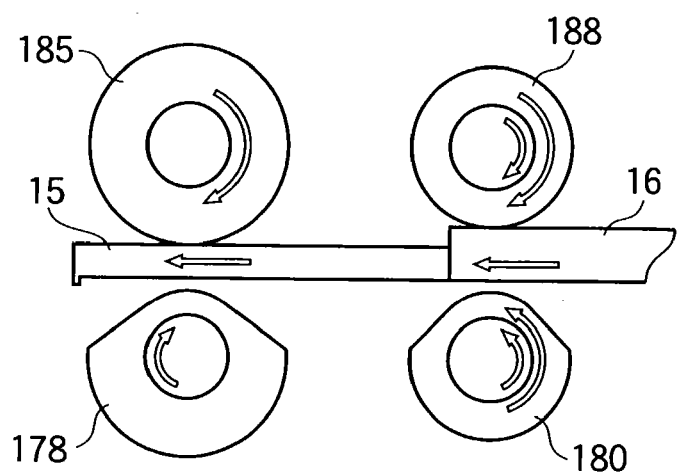
FIGS. 40A, 40B, and 40C are schematic diagrams showing states in which the storage medium in a state of being mounted at and accommodated in the storage medium adapter is ejected.
Figure 40B:
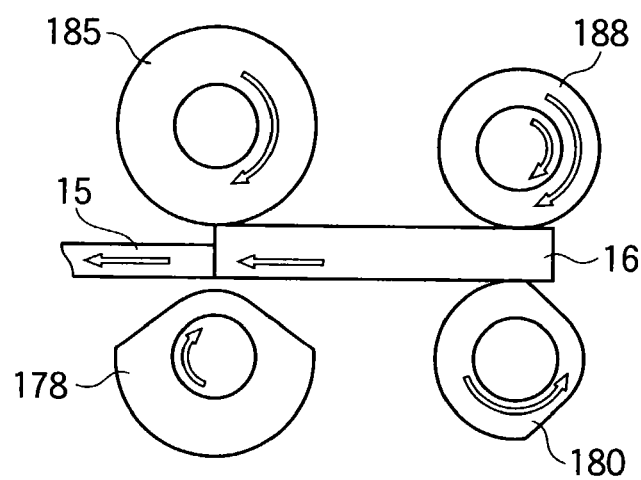
Figure 40C:
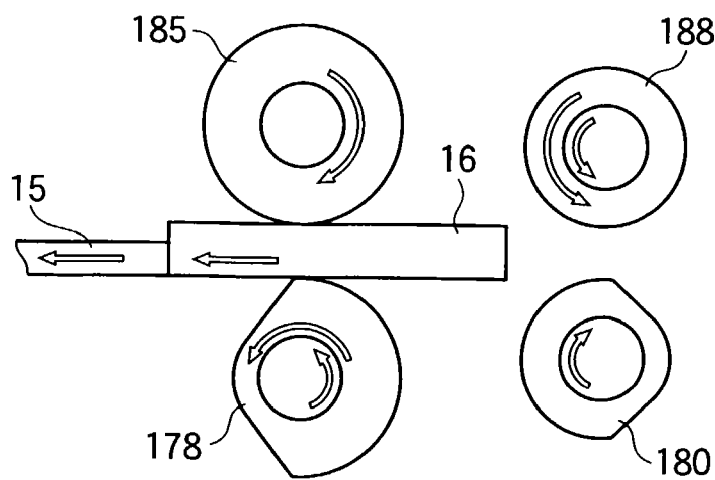

FIG. 40A to FIG. 40C are schematic diagrams showing a state in which the storage medium 15 in the state of being mounted at and accommodated in the storage medium adapter 16 is ejected from the socket 141, and FIG. 40A to FIG. 40C show that the storage medium adapter 16 moves from the state of FIG. 40A to the state of FIG. 40C (in the same way as in the case of the PCMCIA card).

In the simultaneously same way as in the above-described cases of FIGS. 37A to 37C, the second conveying roller 180 rotates counterclockwise by the backward rotation of the driving motor 121, and the first conveying roller 178 does not rotate due to the one-way clutch. The first driven roller 185 and the second driven roller 188 rotate clockwise by rotating so as to follow the movements of the storage medium 15 and the storage medium adapter 16, and the storage medium adapter 16 is conveyed from the state of FIG. 40A to a position between the first conveying roller 178 and the first driven roller 185 as shown in FIG. 40B. Further, as shown in FIG. 40C, the storage medium adapter 16 is further conveyed by being held between the first conveying roller 178 and the first driven roller 185. In this case, the first conveying roller 178 rotates counterclockwise by the forward rotation of the driving motor 121, and the first driven roller 185 rotates clockwise by rotating so as to follow the movement of the storage medium adapter 16.

As described above, in accordance with the present embodiment, when the storage medium 15 is mounted at and dismounted from the storage medium adapter 16 mounted at the information processing apparatus 11 without the storage medium adapter 16 being dismounted from the information processing apparatus 11, contact failure at an electric connection between a connector unit of a storage medium and a connector unit of a storage medium adapter does not arise as a conventional art in which the manipulator carries out the operation directly by hands. Further, because complication and unnecessary stress are not applied to the connector units, the reliability of the connectors is not lost. Therefore, the conventional problem that the reliability of the connectors deteriorates even between the connector unit of the storage medium adapter and a connector unit of an information processing apparatus as well can be solved.

Further, because the information processing apparatus 11 side has the structure in which mounting and ejection of the storage medium 15 with respect to the storage medium adapter 16 are carried out, and it is possible for the mounting and ejection of the storage medium 15 with respect to the storage medium adapter 16 to be carried out without a mechanism which mounts or ejects the storage medium 15 being provided at the storage medium adapter 16, and an object which is to mount/dismount the storage medium 15 at and from the information processing apparatus 11 can be achieved without using a special storage medium adapter or a dedicated storage medium adapter.

Further, because it becomes in a state in which it is impossible for the eject lever 42 to be operated during writing and reading of data with respect to the storage medium 15 at the information processing apparatus 11, there is no case in which the storage medium 15 and the storage medium adapter 16 are dismounted from the information processing apparatus 11 by a careless operation of the eject lever 42 during writing and reading of the data, and an object that writing operation and reading operation of data with respect to the storage medium 15 can be appropriately carried out can be achieved.

Further, when the storage medium adapter 16 is dismounted from the information processing apparatus 11, because the storage medium adapter 16 can be dismounted without a locking mechanism being especially cancelled, an object that the storage medium adapter 16 is easily pulled out can be achieved.

[Other Embodiments]

In the above-described embodiment, examples of the storage medium and the storage medium adapter based on the PCMCIA standard (or the PCMCIA card) has been described. However, the present invention is not limited thereto, and even other storage medium and storage medium adapters which are not based on the PCMCIA standard (or other card type storage medium), if the basic structure is made to be the same, the effects of the present invention can be obtained.

In the above-described embodiment, the example of the information processing apparatus in which the storage medium adapter at which a storage medium can be freely mounted and dismounted can be mounted and dismounted has been shown in FIG. 16. However, the present invention is not limited to a specific form and a specific application of the information processing apparatus, and can be applied to various forms of information processing apparatuses such as a desktop type computer, a note type computer, or the like, and information processing apparatuses for various applications, such as a personal computer, a work station, or the like.

[Effect of the Invention]

As described above, in accordance with the present embodiment, when the storage medium is mounted to and dismounted from the storage medium adapter mounted at the information processing apparatus without the storage medium adapter being dismounted from the information processing apparatus, contact failure at an electric connection between a connector unit of a storage medium and a connector unit of a storage medium adapter does not arise as a conventional art in which the manipulator carries out an operation directly by hands. Further, because complication and unnecessary stress are not applied to the connector units, reliability of the connector is not lost. Therefore, the conventional problem that the reliability of the connector deteriorates even between the connector unit of the storage medium adapter and a connector unit of an information processing apparatus as well can be solved.

Further, because the information processing apparatus side has the structure in which mounting and ejection of the storage medium with respect to the storage medium adapter are carried out, and it is possible for the mounting and ejection of the storage medium with respect to the storage medium adapter to be carried out without a mechanism mounting or ejecting the storage medium being provided at the storage medium adapter, and an object which is to mount/dismount the storage medium to and from the information processing apparatus can be achieved without using a special storage medium adapter or a dedicated storage medium adapter.

Further, because it is in a state in which it is possible for manual ejecting means to be operated during writing and reading of data with respect to the storage medium at the information processing apparatus, there is no case in which the storage medium and the storage medium adapter are dismounted from the information processing apparatus by a careless operation of the manual ejecting means during the writing and the reading of data, and an object that writing operation and reading operation of data with respect to the storage medium can be appropriately carried out can be achieved.

Further, when the storage medium adapter is dismounted from the information processing apparatus, because the storage medium adapter can be demounted without a locking mechanism being especially cancelled, an object that the storage medium adapter is easily pulled out can be achieved.

Moreover, in accordance with the present invention, a storage medium mounting/dismounting mechanism is structured so as to have mounting means in which a storage medium adapter accommodating a storage medium so as to be mountable/dismountable is mounted so as to be mountable/dismountable, and ejecting means for selectively ejecting one or both of the storage medium and the storage medium adapter in a state in which the storage medium adapter is mounted at the mounting means. That is, because mounting/dismounting of the storage medium with respect to the storage medium adapter is made to be possible, and it is possible for one or both of the storage medium and the storage medium adapter to be selectively ejected, without the storage medium adapter being dismounted from the mounting means, manipulating performance can be improved.

What is claimed is:

1. A mechanism having an inserting portion for receiving a card and an adapter, comprising:

driving means for providing power;

first driving force transmission means for receiving power from said driving means and applying force to said adapter;

second driving force transmission means for receiving power from said driving means and applying force to said adapter in an ejecting direction of said inserting portion;

selecting means for selecting either of said card or said adapter to be ejected from said inserting portion; and control means for controlling said first driving force transmission means and said second driving force transmission means to eject either of said card or said adapter from said inserting portion, in accordance with the selection by said selecting means, wherein said control means controls said first driving force transmission means so that said adapter is restrained from moving in the ejecting direction of said inserting portion, when ejecting said card from said inserting portion.

2. A mechanism according to claim 1, wherein said selecting means is also for selecting either to mount said card at said adapter or to mount said adapter in said mechanism, in the case where either of said card or said adapter is present in the inserting portion, and said control means controls said first driving force transmission means and said second driving force transmission means to mount either of said card or said adapter in said mechanism, in accordance with the selection by said selecting means.

3. A mechanism according to claim 2, wherein said selecting means does not select to mount said card at said adapter in the case where said adapter is not mounted in said mechanism.

4. A mechanism according to claim 2, wherein said selecting means does not select to mount said adapter in said mechanism in the case where said adapter is mounted in said mechanism.

5. A mechanism according to claim 1, wherein said selecting means does not select to eject said card or said adapter from said inserting portion in the case where said adapter is mounted in said mechanism.

6. A mechanism according to claim 1, wherein said selecting means does not select to eject said card or said adapter from said inserting portion in the case where said adapter is not mounted in said mechanism and said card is not mounted at said adapter.

7. A mechanism according to claim 1, wherein said second driving force transmission means has a roller for selectively applying force to said card or said adapter, and said roller contacts said card or said adapter to apply force to said card or said adapter.

8. A mechanism according to claim 1, wherein said first driving force transmission means comprises fixing means for fixing said adapter, and said fixing means fixes said adapter in said mechanism when ejecting said card from said inserting portion.

9. A mechanism according to claim 8, wherein, in the case where said selecting means selects to mount said card when said adapter is mounted in said mechanism, said control means controls said second drive force transmission means so that said second driving force transmission means applies force to said card in an inserting direction of said inserting portion.

10. A mechanism according to claim 2, wherein, in the case where said selecting means selects to eject said card from said adapter when said adapter in which said card is mounted is mounted in said mechanism, said control means controls said second driving force transmission means and said first driving force transmission means so that said second driving force transmission means applies force to said card in the ejecting direction of said inserting portion and said first driving force fixes said adapter.

11. A mechanism according to claim 8, further comprising ejecting means for ejecting said adapter by a user's manual operation.

12. A mechanism according to claim 1, further comprising connection means for electrically connecting to said card mounted at said adapter, wherein said selecting means does not select to eject said adapter when said connecting means accesses said adapter.

13. A mechanism according to claim 1, wherein said first driving force transmission means comprises a non-circle shaped roller for selectively applying force to said adapter, and
said roller connects to said adapter to apply force to said adapter.

14. A mechanism according to claim 1, wherein said first driving force transmission means applies force in the ejecting direction or an inserting direction of said inserting portion.

15. A mechanism according to claim 14, wherein, in the case where said selecting means selects to mount said adapter, said control means controls said first driving force transmission means and said second driving force transmission means so that said second driving force transmission means applies a force to said adapter in the inserting direction of said inserting portion and said first driving force transmission means applies force in the inserting direction of said inserting portion.

16. A mechanism according to claim 14, wherein, in the case where said selecting means selects to eject said card from said adapter when said adapter at which said card is mounted is mounted in said mechanism, said control means controls said first driving force transmission means and second driving force transmission means so that said second driving force transmission means applies force to the card in the ejecting direction of said inserting portion and said first driving force transmission means applies force to the adapter in the inserting direction of the said inserting portion.

17. A mechanism according to claim 1, wherein said power driving means for providing power is a motor, and said motor rotates in a normal direction so that said first driving force transmission means applies force to said card or said adapter in the ejecting direction of said inserting portion, and said motor rotates in an opposite direction so that said second driving force transmission means applies force to said card or said adapter in the inserting direction of said inserting portion.

18. An information processing apparatus having an inserting portion for receiving a card and an adapter, comprising:
an adapter at which said card is mounted;
a mount portion at which said adapter is mounted;
driving means for providing power;
first driving force transmission means for receiving power from said driving means and applying force to said adapter;
second driving force transmission means for receiving power from said driving means and applying to said adapter in an ejecting direction of said inserting portion;
selecting means for selecting either of said card or said adapter to be ejected from said inserting portion; and
control means for controlling said first driving force transmission means and said second driving force transmission means to eject either of said card or said adapter from said inserting portion, in accordance with the selection by said selecting means,
wherein said control means controls said first driving power transmission means so that said adapter is restrained from moving in the ejecting direction of said inserting portion, when ejecting said card from said inserting portion.

19. A mechanism having an inserting portion for receiving a card and an adapter, comprising:
a driving motor which provides power;
a first driving force transmission member which receives power from said driving member and applies force to said adapter;
a second driving force transmission member which receives power from said driving member and applies force to said adapter in an ejecting direction of said inserting portion;
a selecting member which selects either of said card or said adapter to be ejected from said inserting portion; and
a control member which controls said first driving force transmission member and said second driving force transmission member to eject either of said card or said adapter from said inserting portion, in accordance with the selection by said selecting member, wherein said control member controls said first driving force transmission member so that said adapter is restrained from moving in the ejecting direction of said inserting portion, when ejecting said card from said inserting portion.

20. An information processing apparatus having an receiving portion for inserting a card and an adapter, comprising:

an adapter at which said card is mounted;

a mount portion at which said adapter is mounted;

a driving motor which provides power;

a first driving force transmission member which receives power from said driving means and applies force to said adapter;

a second driving force transmission member which receives power from said driving motor and applies force to said adapter in an ejecting direction of said inserting portion;

a selecting member which select either of said card or said adapter to be ejected from said inserting portion; and a control member which controls said first driving force transmission member and said second driving force transmission member to eject either of said card or said adapter from said inserting portion, in accordance with the selection by said selecting member, wherein said control member controls said first driving power transmission member so that said adapter is restrained from moving in the ejecting direction of said inserting portion, when ejecting said card from said inserting portion.

* * * * *

UNITED STATES PATENT AND TRADEMARK OFFICE
CERTIFICATE OF CORRECTION

| | |
|---|---|
| PATENT NO. | : 7,021,540 B2 |
| APPLICATION NO. | : 10/618598 |
| DATED | : April 4, 2006 |
| INVENTOR(S) | : Koji Kimura et al. |

It is certified that error appears in the above-identified patent and that said Letters Patent is hereby corrected as shown below:

COLUMN 1:

Line 13, "stored" should read --stores--;
Line 42, "to use" should read --to be used--;
Line 46, "troublesome" should read --the inconvenience--; and
Line 66, "hands." should read --hand.--.

COLUMN 2:

Line 25, "general-purposed" should read --general-purpose--.

COLUMN 6:

Line 33, "an" should read --a--.

COLUMN 7:

Line 3, "FIG. 15" should read --FIGS. 15A to 15C--.

COLUMN 8:

Line 55, "a" should be deleted.

COLUMN 10:

Line 60, "interlocked" should read --interlocked with--.

COLUMN 11:

Line 2, "the gear" (first occurrence) should be deleted; and
Line 8, "equipped" should read --equipped at--.

COLUMN 16:

Line 24, "the-operation" should read --the operation--.

COLUMN 19:

Line 46, "the 183" should read --the gear 183--; and
Line 60, "contact" should read --contacts--.

UNITED STATES PATENT AND TRADEMARK OFFICE
CERTIFICATE OF CORRECTION

| | |
|---|---|
| PATENT NO. | : 7,021,540 B2 |
| APPLICATION NO. | : 10/618598 |
| DATED | : April 4, 2006 |
| INVENTOR(S) | : Koji Kimura et al. |

It is certified that error appears in the above-identified patent and that said Letters Patent is hereby corrected as shown below:

COLUMN 20:

Line 7, "rotate than" should read --rotate more than--;
    Line 31, "load" should read --more load--; and
    Line 38, "with respect" should be deleted.

COLUMN 21:

Line 65, "This" should read --The--.

COLUMN 22:

Line 56, "storage 15" should read --storage medium 15--.

COLUMN 23:

Line 52, "ark" should read --arc--; and
    Line 67, "ark" should read --arc--.

COLUMN 24:

Line 6, "ark" should read --arc--; and
    Line 34, "ark" should read --arc--.

COLUMN 25:

Line 51, "made be" should read --made to be--.

COLUMN 29:

Line 37, "claim 2," should read --claim 8,--.

COLUMN 31:

Line 8, "an" should read --a--.

UNITED STATES PATENT AND TRADEMARK OFFICE
CERTIFICATE OF CORRECTION

| | | |
|---|---|---|
| PATENT NO. | : 7,021,540 B2 | |
| APPLICATION NO. | : 10/618598 | |
| DATED | : April 4, 2006 | |
| INVENTOR(S) | : Koji Kimura et al. | |

It is certified that error appears in the above-identified patent and that said Letters Patent is hereby corrected as shown below:

COLUMN 32:

Line 5, "select" should read --selects--.

Signed and Sealed this

Fourteenth Day of November, 2006

JON W. DUDAS
*Director of the United States Patent and Trademark Office*